US009558454B2

(12) United States Patent
Strassner

(10) Patent No.: US 9,558,454 B2
(45) Date of Patent: Jan. 31, 2017

(54) SYSTEM AND METHOD FOR MODEL-BASED INVENTORY MANAGEMENT OF A COMMUNICATIONS SYSTEM

(71) Applicant: FutureWei Technologies, Inc., Plano, TX (US)

(72) Inventor: John Charles Strassner, North Barrington, IL (US)

(73) Assignee: Futurewei Technologies, Inc., Plano, TX (US)

(*) Notice: Subject to any disclaimer, the term of this patent is extended or adjusted under 35 U.S.C. 154(b) by 319 days.

(21) Appl. No.: 14/200,428

(22) Filed: Mar. 7, 2014

(65) Prior Publication Data
US 2014/0279747 A1  Sep. 18, 2014

Related U.S. Application Data

(60) Provisional application No. 61/785,004, filed on Mar. 14, 2013.

(51) Int. Cl.
G06N 5/02 (2006.01)
G06N 99/00 (2010.01)
G06F 9/44 (2006.01)
H04L 12/24 (2006.01)

(52) U.S. Cl.
CPC .............. G06N 99/005 (2013.01); G06F 8/35 (2013.01); G06N 5/02 (2013.01); H04L 41/085 (2013.01)

(58) Field of Classification Search
CPC .................................................... G06N 5/02
USPC ............................................................. 706/12
See application file for complete search history.

(56) References Cited

U.S. PATENT DOCUMENTS

| | | | |
|---|---|---|---|
| 7,464,145 B2 | 12/2008 | Strassner | |
| 7,542,956 B2 | 6/2009 | Strassner et al. | |
| 7,558,847 B2 | 7/2009 | Strassner | |
| 8,010,650 B2 | 8/2011 | Strassner | |
| 8,019,838 B2 | 9/2011 | Jiang et al. | |
| 8,078,553 B2 | 12/2011 | Strassner et al. | |
| 8,195,827 B2 | 6/2012 | Strassner | |
| 8,327,414 B2 | 12/2012 | Strassner et al. | |
| 2004/0230681 A1 | 11/2004 | Strassner et al. | |
| 2006/0109800 A1 | 5/2006 | Vaillant et al. | |
| 2007/0288419 A1 | 12/2007 | Strassner | |
| 2007/0288467 A1 | 12/2007 | Strassner et al. | |

(Continued)

FOREIGN PATENT DOCUMENTS

CN  1783813 A  6/2006
CN  1886935 A  12/2006
(Continued)

OTHER PUBLICATIONS

Knappmeyer et al ("Survey of Context Provisioning Middleware" Jan. 2013).*
PCT International Search Report and Written Opinion, International Application No. PCT/CN2014/073441, Applicant: Huawei Technologies Co., LTD., dated Jun. 16, 2014, 14 pgs.

Primary Examiner — Lut Wong
(74) Attorney, Agent, or Firm — Slater Matsil, LLP

(57) ABSTRACT

A method for management entity operations includes receiving a request to collect data for an entity in a communications system, collecting the data for the entity utilizing a set of protocols selected using knowledge defined by a first data model of a data model list derived from an information model of the communications system, and saving the data collected.

48 Claims, 55 Drawing Sheets

(56) References Cited

U.S. PATENT DOCUMENTS

| | | |
|---|---|---|
| 2008/0059613 A1 | 3/2008 | Strassner |
| 2008/0071714 A1 | 3/2008 | Menich et al. |
| 2008/0126287 A1 | 5/2008 | Cox et al. |
| 2008/0161941 A1 | 7/2008 | Strassner et al. |
| 2008/0271022 A1 | 10/2008 | Strassner et al. |
| 2008/0271111 A1 | 10/2008 | Cox et al. |
| 2009/0164499 A1 | 6/2009 | Samudrala et al. |
| 2009/0165078 A1 | 6/2009 | Samudrala et al. |
| 2009/0327172 A1 | 12/2009 | Liu et al. |
| 2009/0328133 A1 | 12/2009 | Strassner et al. |

FOREIGN PATENT DOCUMENTS

| | | |
|---|---|---|
| CN | 1984455 A | 6/2007 |
| WO | 2004008283 A2 | 1/2004 |
| WO | 2005053230 A2 | 6/2005 |
| WO | 2007143259 A2 | 12/2007 |
| WO | 2007146463 A2 | 12/2007 |
| WO | 2008024539 A2 | 2/2008 |
| WO | 2008082763 A2 | 7/2008 |
| WO | 2008082771 A1 | 7/2008 |
| WO | 2008134273 A1 | 11/2008 |
| WO | 2008134274 A1 | 11/2008 |
| WO | 2009002697 A1 | 12/2008 |
| WO | 2009158462 A2 | 12/2009 |

* cited by examiner

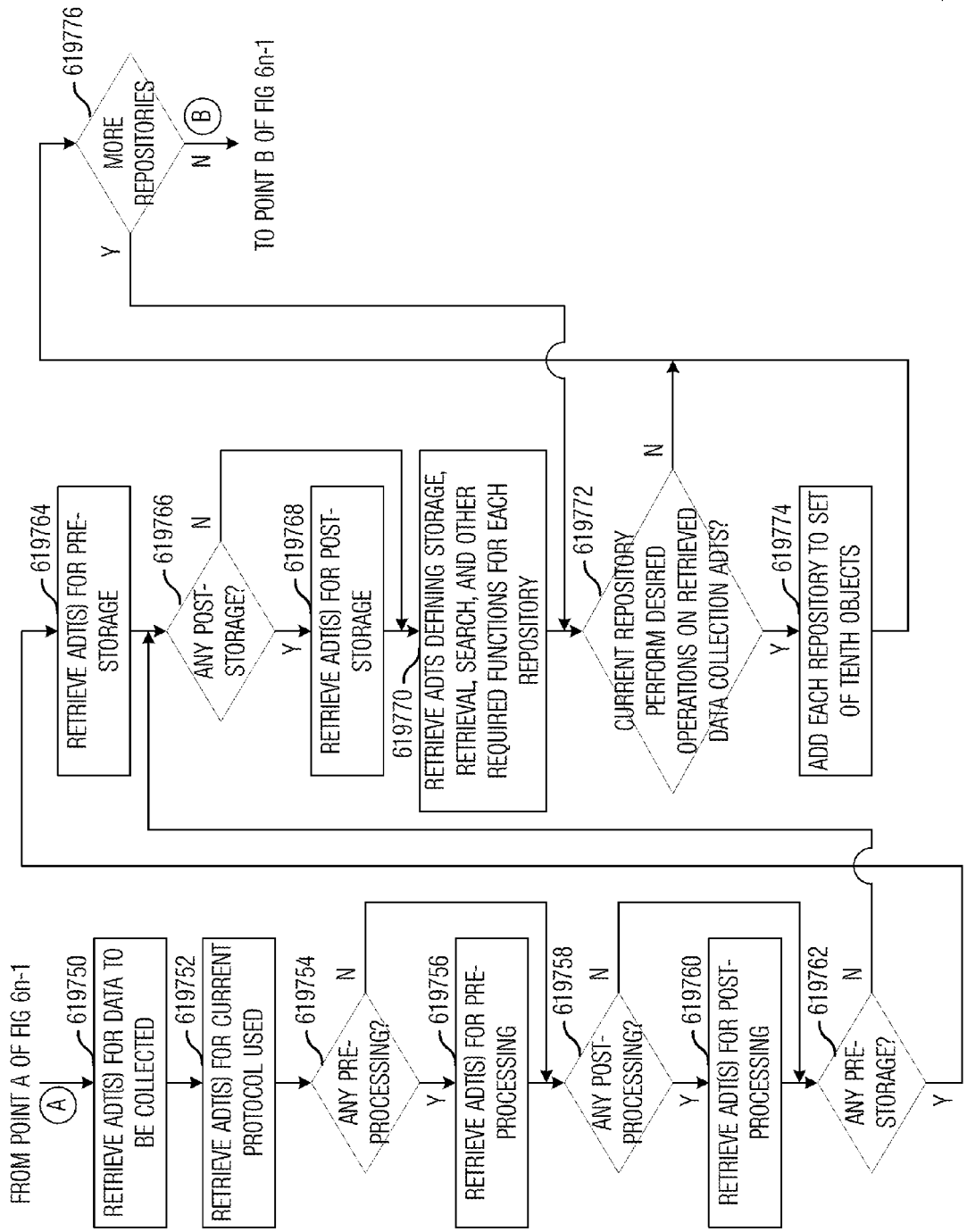

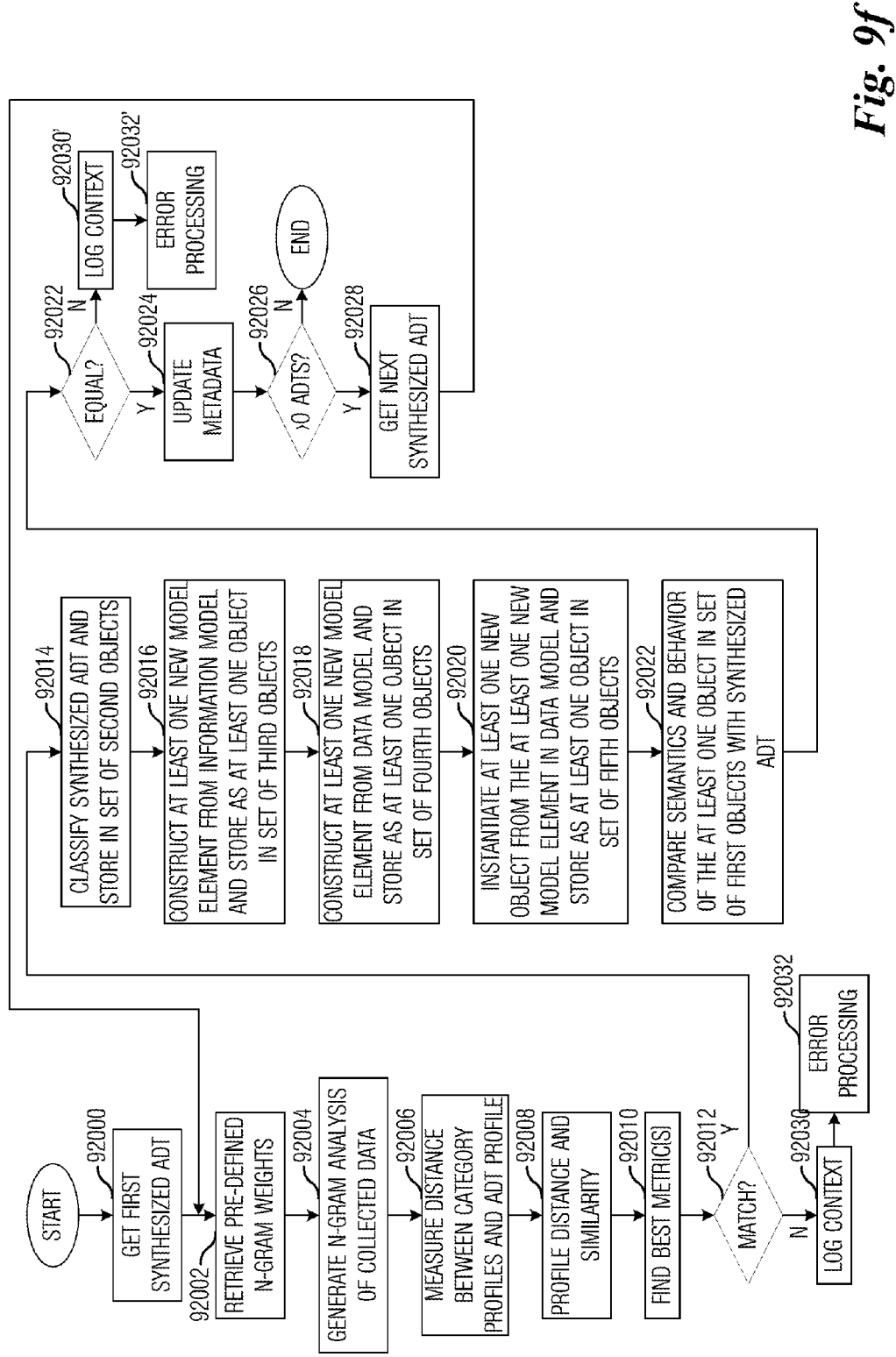

SYSTEM AND METHOD FOR MODEL-BASED INVENTORY MANAGEMENT OF A COMMUNICATIONS SYSTEM

TECHNICAL FIELD

The present disclosure relates generally to managing networked communications systems, and more particularly to a system and method for model-based inventory management of a communications system.

BACKGROUND

Communications systems have changed life in the modern world by enabling users access to a wide range of services. As an example, a first user may remotely access a work computer using a laptop from home or a conference room while on a business trip, a second user may visually verify that his children has arrived home safely from a day at school on his desktop computer at work, a third user may watch a favorite movie on a smart telephone, a fourth user may initiate the cooking of dinner from a digital tablet, and the like.

In order to support such a wide range of users, services, and access technologies, the communications systems have become increasingly complex. Additionally, the number of hardware and software components, as well as hardware and software types, making up the communications systems has also increased. The increased complexity of the communications systems, along with increased number and type of hardware and software components, help to make the configuration and management of the communications systems more difficult and potentially error prone.

SUMMARY OF THE DISCLOSURE

Example embodiments of the present disclosure which provide a system and method for model-based inventory management of a communications system.

In accordance with an example embodiment of the present disclosure, a method for management entity operations is provided. The method includes receiving, by a management entity, a request to collect data for an entity in a communications system, collecting, by the management entity, the data for the entity utilizing a set of protocols selected using knowledge defined by a first data model of a data model list derived from an information model of the communications system, and saving, by the management entity, the data collected.

In accordance with another example embodiment of the present disclosure, a management entity is provided. The management entity includes a receiver, and a processor operatively coupled to the receiver. The receiver receives a request to collect data for an entity in a communications system. The processor collects the data for the entity utilizing a set of protocols selected using knowledge defined by a first data model of a data model list derived from an information model of the communications system, and saves the data collected.

In accordance with another example embodiment of the present disclosure, a management system is provided. The management system includes a managed entity, and a management entity operatively coupled to the managed entity. The management entity including a receiver that receives a request to collect data for the managed entity in a communications system, and a processor operatively coupled to the receiver. The processor collects the data for the managed entity utilizing a set of protocols selected using knowledge defined by a first data model of a data model list derived from an information model of the communications system, and saves the data collected.

In accordance with another example embodiment of the present disclosure, a method for management entity operations is provided. The method includes receiving, by a management entity, a request to collect data for an entity in a communications system, collecting, by the management entity, data for the entity utilizing a set of protocols selected using knowledge defined by a first data model of a data model list derived from an information model of the communications system, and detecting, by the management entity, that the data collected includes an object that cannot be recognized. The method also includes replacing, by the management entity, the unrecognizable object in the data collected with an equivalent recognizable object thereby producing revised data collected, and saving, by the management entity, the revised data collected.

In accordance with another example embodiment of the present disclosure, a management entity is provided. The management entity includes a receiver, and a processor operatively coupled to the receiver. The receiver receives a request to collect data for an entity in a communications system. The processor collects data for the entity utilizing a set of protocols selected using knowledge defined by a first data model of a data model list derived from an information model of the communications system, detects that the data collected includes an object that cannot be recognized, to replace the unrecognizable object in the data collected with an equivalent recognizable object thereby producing revised data collected, and saves the revised data collected.

In accordance with another example embodiment of the present disclosure, a method for management entity operations is provided. The method includes receiving, by a management entity, a request to collect data for an entity in a communications system, collecting, by the management entity, data for the entity, and detecting, by the management entity, that the data collected contains an object that cannot be recognized. The method also includes determining, by the management entity, that the unrecognizable object is a new object not previously known to the management entity, defining, by the management entity, a new Abstract Data Type (ADT) to represent the behavior of the unrecognizable object, and mapping, by the management entity, the new ADT to a new model element in an information model. The method further includes mapping, by the management entity, the new model element in the information model to a new model element in a data model, and saving, by the management entity, the new model element in the information model.

In accordance with another example embodiment of the present disclosure, a management entity is provided. The management entity includes a receiver, and a processor operatively coupled to the receiver. The receiver receives a request to collect data for an entity in a communications system. The processor collects data for the entity, detects that the data collected contains an object that cannot be recognized, determines that the unrecognizable object is a new object not previously known to the management entity, defines a new Abstract Data Type (ADT) to represent the behavior of the unrecognizable object, maps the new ADT to a new model element in an information model, maps the new model element in the information model to a new model element in a data model, and saves the new model element in the information model.

One advantage of an embodiment is that the use of model driven techniques for data collection allows for a consistent and scalable approach to configuring and managing a communications system.

A further advantage of an embodiment is that the use of policy rules allow for efficient and easy deployment of the communications system, wherein changes to the communications system are detected and reflected in the configuring and managing of the communications system.

BRIEF DESCRIPTION OF THE DRAWINGS

For a more complete understanding of the present disclosure, and the advantages thereof, reference is now made to the following descriptions taken in conjunction with the accompanying drawing, in which:

FIG. 6b-2 illustrates an example dependency tuple according to example embodiments described herein;

FIGS. 6c-1 and 6c-2 illustrate an example flow diagram of operations occurring in data collection processing analysis according to example embodiments described herein;

FIG. 6e-1 illustrates an example flow diagram of operations occurring in a beginning of the data model determination process, showing how data and protocol ADTs are used to help determine dependencies between types of data and protocols as well as a set of data models that meet these requirements for this data collection request according to example embodiments described herein;

FIG. 6e-2 illustrates an example flow diagram of operations occurring in a continuation of the data model determination process, showing how data, protocol, and pre-processing ADTs are used to help determine dependencies between types of data, protocols, and pre-processing components as well as determine a set of data models that meet these requirements for this data collection request according to example embodiments described herein;

FIG. 6e-3 illustrates an example flow diagram of operations occurring in a continuation of the data model determination process, showing how data, protocol, and pre- and post-processing ADTs are used to help determine dependencies between types of data, protocols, pre-processing, and post-processing components, as well as determine a set of data models that meet these requirements for this data collection request according to example embodiments described herein;

FIG. 6e-4 illustrates an example flow diagram of operations occurring in a continuation of the data model determination process, showing how data, protocols, post-processing, and pre-storage ADTs are used to help determine dependencies between types of data, protocols, post-processing, and pre-storage, as well as determine a set of data models that meet these requirements for this data collection request according to example embodiments described herein;

FIG. 6e-5 illustrates an example flow diagram of operations occurring in a continuation of the data model determination process, showing how data, protocols, pre-storage, and post-storage ADTs are used to help determine dependencies between types of data, protocols, pre-storage, and post-storage, as well as determine a set of data models that meet these requirements for this data collection request according to example embodiments described herein;

FIG. 6e-6 illustrates an example flow diagram of operations occurring in a continuation of the data model determination process, showing how data and protocol ADTs, as well as pre-processing, post-processing, pre-storage, and post-storage ADTs, are used to help determine dependencies between types of data, protocols, and optionally, pre-processing, post-processing, pre-storage, and post-storage components, as well as a set of data models that meet these requirements for this data collection request according to example embodiments described herein;

FIG. 6e-7 illustrates an example flow diagram of operations occurring in a detailed sub-process that was launched by an affirmative response to the test of block 6185 of FIG. 6e-3, showing additional detail in the processing of pre-processing dependencies according to example embodiments described herein;

FIG. 6e-8 illustrates an example flow diagram of operations occurring in a detailed sub-process that was launched by an affirmative response to the test of block 6196 of FIG. 6e-3, showing additional detail in the processing of post-processing dependencies according to example embodiments described herein;

FIG. 6e-9 illustrates an example flow diagram of operations occurring in a detailed sub-process that was launched by an affirmative response to the test of block 6207 of FIG. 6e-4, showing additional detail in the processing of pre-storage dependencies according to example embodiments described herein;

FIG. 6e-10 illustrates an example flow diagram of operations occurring in a detailed sub-process that was launched by an affirmative response to the test of block 6258 of FIG. 6e-5, showing additional detail in the processing of post-storage dependencies according to example embodiments described herein;

FIG. 6k-1 illustrates an example flow diagram of operations occurring in the beginning of the determining of Abstract Data Types according to example embodiments described herein;

FIG. 6k-2 illustrates an example flow diagram of operations occurring in the ending of the determining of Abstract Data Types according to example embodiments described herein;

FIG. 6m-1 illustrates an example flow diagram of operations occurring in the beginning of the determining of a dependency list that enumerates the different dependencies between type of data, protocol used to collect the data, pre- and post-processing, and pre- and post-storage according to example embodiments described herein;

FIG. 6m-2 illustrates an example flow diagram of operations occurring in the ending of the determining of a dependency list that enumerates the different dependencies between type of data, protocol used to collect the data, pre- and post-processing, and pre- and post-storage according to example embodiments described herein;

FIGS. 6n-1, 6n-2, and 6n-3 illustrate an example flow diagram of operations occurring in the validating of data using information and data model elements according to example embodiments described herein;

FIG. 6o illustrates an example flow diagram of operations occurring in the analysis of the data collected according to example embodiments described herein;

FIG. 7a-1 illustrates an example flow diagram of operations occurring in a management entity as the management entity determines needed data model(s) to satisfy type of data and protocol dependencies according to example embodiments described herein;

FIG. 7a-2 illustrates an example flow diagram of operations occurring in a management entity as the management entity determines needed data model(s) to satisfy pre- and post-processing dependencies according to example embodiments described herein;

FIG. 8 illustrates an example device according to example embodiments described herein;

FIGS. 9a-1, 9a-2, and 9a-3 illustrate a second example flow diagram of operations occurring in a management entity where, while performing the collection, analysis, saving, and/or transformation of data for one or more entities in a communications system, the management entity employs additional operations to enable the management entity to identify unrecognizable data and replace said data with corrected data, according to example embodiments described herein;

FIG. 9c-1 illustrates an example flow diagram of operations occurring in a management entity as the management entity initializes itself for collecting data and recovering from various problems with the data, according to example embodiments described herein;

FIG. 9c-2 illustrates an example flow diagram of operations occurring in a management entity as the management entity begins to collect data, wherein during the data collection process, the management entity provides the ability to identify unrecognizable data and replace said data with corrected data, according to example embodiments described herein;

FIG. 9c-3 illustrates an example flow diagram of operations occurring in a management entity as the management entity completes the data process, wherein during the data collection process, the management entity provides the ability to identify unrecognizable data and replace said data with corrected data, according to example embodiments described herein;

FIG. 9d-1 illustrates an example flow diagram of operations occurring in a management entity as the management entity determines that parts of the collected data are in error, not complete, or suffer from other problems, according to example embodiments described herein;

FIG. 9d-2 illustrates an example flow diagram of operations occurring in a management entity as the management entity performs various tests on the collected data in order to ascertain how to fix the problems with the collected data, according to example embodiments described herein;

FIG. 9d-3 illustrates an example flow diagram of operations occurring in a management entity as the management entity replaces unknown or incomplete data, or data having errors, with corrected data, according to example embodiments described herein;

FIGS. 9e-1, 9e-2, and 9e-3 illustrate an example flow diagram of operations occurring in a management entity as the management entity creates a new object from existing data from the information and data models and the collected data using one or more of several processes, according to example embodiments described herein; and FIG. 9f illustrates an example flow diagram of operations occurring in a management entity as the management entity performs n-gram analysis to identify unknown or incomplete data, or data with errors, according to example embodiments described herein.

DETAILED DESCRIPTION OF ILLUSTRATIVE EMBODIMENTS

Figure 1A:
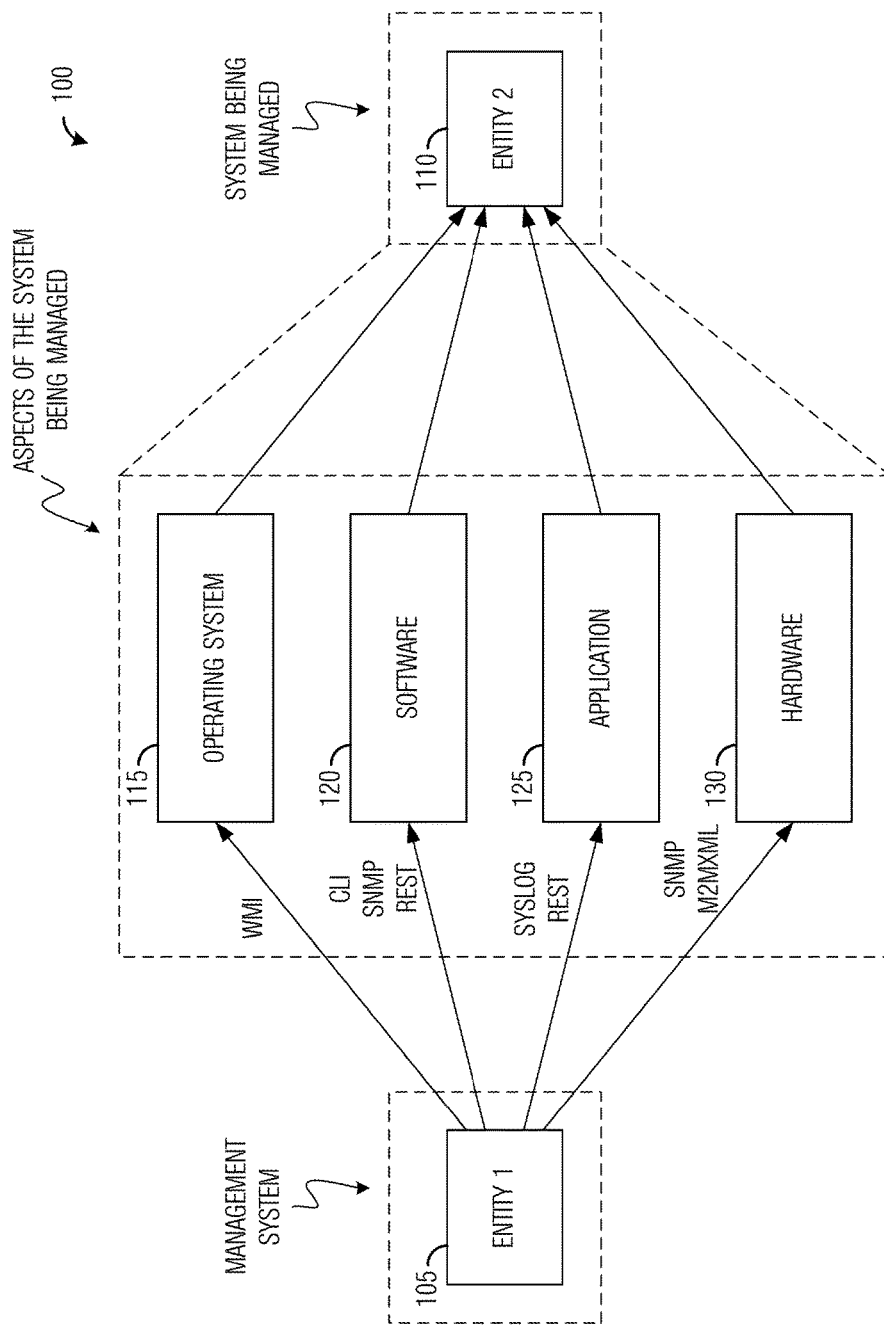
FIG. 1a illustrates an example high-level view of a first entity in a managed environment managing a second entity by using a set of management protocols to obtain information about various aspects of the second entity according to example embodiments described herein.

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

Introduction

One embodiment of the disclosure relates to inventory management of a communications system. For example, in a management system, a management entity receives a request to collect data for one or more entities in a communications system. The management entity collects the data for the one or more entities utilizing a set of protocols selected using knowledge defined by one or more data models in a data model list derived from an information model of the communications system. The management entity saves the data collected. As another example, the management entity collects data for one or more entities in a communications system, and generates a function to transform the collected data from a first schema into a second schema, wherein the collected data is in the first schema defined by one or more data models derived from an information model of the communications system. The management entity applies the function to the collected data.

The present disclosure will be described with respect to example embodiments in a specific context, namely a model-based management system for a communications system, wherein the management system utilizes models to drive the collection of data for the communications system. The data being collected may be categorized as operational, administrative, management, and performance data. The communications system may be a standards compliant communications system, such as 3GPP LTE, WiMAX, IEEE 802.11, IEEE 802.16, and the like, a non-standards compliant communications system, or a combination of one or more technical standards compliant communications system with one or more non-standards compliant communications system.

Communications systems are generally dynamic. Not only do their logical topologies change dynamically, new physical devices are added, while existing physical devices are moved or removed. The dynamic nature of communications systems makes maintaining a real-time list of network devices, along with one or more attributes that can be used to identify them (e.g., Internet Protocol (IP) addresses, port information, and the like) challenging. Additionally, new applications, modules, or versions of software (including both operating systems and software applications) may be downloaded, and hardware (e.g., RAM, CPUs, hard drives, solid state memories, network cards, and the like) may be changed.

Network discovery may be scheduled to occur at predefined times and/or intervals; it may also be performed on an as-needed basis. Since a typical communications system is large, such network discovery operations usually involve a large amount of processing. Typically, network discovery is collector-based and multiple scanning methods (such as, ping sweeps, port scans, simple network management protocol (SNMP) scans searching for different types of SNMP attributes, and the like) may be utilized.

However, applications for network inventory vary. High end applications utilize network discovery and generate open systems interconnection (OSI) level 1, 2, and 3 topological views of the communications system. Higher end applications include network devices, operating systems, high-level application data (e.g., CPU, disk, memory uptime, utilization, and the like). Once the views of the communications systems are generated, changes to the communications system can be quickly detected.

There may be dependencies between the type of data being discovered and/or inventoried and the type of protocols being used to discover and/or report the data. There may be an important dependency between the type of protocol used to collect the data and the type of data to be collected. As an example, if SNMP is used, then there are various management information base (MIB) objects defined that differentiate between hosts and "devices that forward datagrams" (e.g., a device that acts as a router). It is noted that this does not mean that the device is a router; for example, a layer three switch may also act as a router. More importantly, (a) other protocols may not have this capability defined, (b) other protocols may define a set of capabilities that have more or less functionality than this capability, and/or (c) this differentiation may not be enough to accurately classify a particular network entity.

As another example, the type of ManageableEntity may have specific attributes and/or behavior that dictate the need to use a specific type of protocol. For example, a port that is defined as a bridge sends bridge packet data units (BPDUs), whereas the same port may send different PDUs for communication at different layers. This is made more complex because higher layers, such as layers 5-7, do not refer to a PDU per se, but rather to the actual data (or transfer of the data).

As yet another example, the selection of the type of data to collect affects the type of protocol to use when looking for specific types of neighbors for a specific entity type. For example, if discovery is performed on a port whose role is a "Provider Edge" role, then in some circumstances, that port can connect to other ports with a role of "Customer Edge", "Provider Edge", or "Provider Core". While in other circumstances, it may be limited to only looking for ports whose role is "Provider Edge". Furthermore, if that same port was using multiprotocol label switching (MPLS), then it could also look for Label Switching Routers as well as ingress, egress, and other types of MPLS routers.

As yet another example, the type of attributes that an entity has when looking for specific types of functionality that a device or port has can also dictate the use of a specific protocol to use, because the data to be retrieved may be very specific. For example, a device may be interested in determining if a node supports neighbor discovery, such as active reservation protocol (ARP) or neighbor discovery protocol (NDP), capability, or how a node obtains its address(es) (e.g., by using bootstrap protocol (BOOTP) or dynamic host configuration protocol (DHCP)).

The above discusses several types of dependencies between protocols used to collect data and the data to be collected. There may also be relationships between the data to be collected and the type(s) of pre- and post-processing operations that should be performed on the collected data to make said data more useful to the management system, and which data (if any) should be stored in what type of repository at what step in the above operations, e.g., preprocessing or post-processing. The set of these dependencies and relationships require coordination and optimization of computational and storage resources. The example embodiments presented herein may use the knowledge represented in an information model to define the characteristics and behavior of model elements that represent ManageableEntities, as well as to represent different types of decision-making and reasoning processes and rules to govern the application of said processes.

FIG. 1a illustrates a managed environment 100, in which a first entity 105 is managing a second entity 110. The first entity is part of a management system, and the second entity is part of a system being managed. It is noted that without loss of generality, the term managing (or management) may refer to both monitoring and/or configuring. It is also noted that although shown as single entities, first entity 105 and second entity 110 may each represent multiple entities.

First entity 105 may manage as well as interact with second entity 110 through one or more levels. As an example, management may occur at an operating system level 115, where first entity 105 may utilize a protocol, such as web management interface (WMI), to manage second entity 110. Management may also occur at a software level 120, where first entity 105 may utilize a protocol, such as command line interface (CLI), SNMP, representation state transfer (REST), and the like, to manage second entity 110. Management may also occur at an application level 125, where first entity 105 may utilize a protocol, such as system log (SYSLOG), REST, and the like, to manage second entity 110. Management may also occur at a hardware level 130, where first entity 105 may utilize a protocol, such as SNMP, machine to machine extensible markup language (M2MXML), and the like, to manage second entity 110. Entities 115, 120, 125, and 130 are aspects of the system being managed; the management system may obtain their current state, values, and/or configuration information from second entity 110, and may then change one or more of these aspects (i.e., entities 115, 120, 125, and 130) as part of its management processes.

The example embodiments presented herein uses an object-oriented information model to define managed entities (e.g., entities in a communications system) of interest. The discussion presented herein will make use of the following terminology:

- An information model is an abstraction and representation of the entities in a managed environment. This includes definition of their attributes, operations and relationships. It is independent of any specific type of repository, software usage, or access protocol;
- A data model is a concrete implementation of an information model in terms appropriate to a specific type of repository that uses a specific access protocol or protocols. It includes data structures, operations, and rules that define how the data is stored, accessed and manipulated;
- A model mapping is a translation from one type of model to another type of model. Model mapping changes the representation and/or level of abstraction used in one model to another representation and/or level of abstraction in another model;
- The term model element is a generic term that defines abstractions that can be represented in an information model. Examples include class, attribute, different types of relationships (e.g., associations, aggregations, and compositions), and other constructs;
- A PolicyRule is an intelligent container. It contains data that define how the PolicyRule is used in a managed environment as well as a specification of behavior that dictates how the managed entities that it applies to will interact. The contained data is of four types: (1) data and metadata that define the semantics and behavior of the policy rule and the behavior that it imposes on the rest of the system, (2) a set of events that can be used to trigger the evaluation of the condition clause of a policy rule, (3) an aggregated set of policy conditions, and (4) an aggregated set of policy actions;
- A ManageableEntity is defined as any entity of interest in a managed environment that can perform and/or respond to management functions. Examples of a ManageableEntity include devices (e.g., routers, switches, host computers), entities that are part of a device (e.g., physical ports and logical device interfaces), as well as protocols, applications, servers, and services—in short, anything that can respond to management requests;
- A Behavior or Behaviors is represented as a set of model elements that capture four different aspects of managing behavior: (1) a means to uniquely identify the ManageableEntity as a function of context; (2) to manage the functions and roles that a ManageableEntity can produce and consume a set of mechanisms based on different types of policy rules and state automata that execute in a management domain (and between federated management domains), (3) the ability to orchestrate and/or choreograph the behavior of one or more ManageableEntities (orchestration defines the behavior of a set of ManageableEntities from their own point-of-view, while choreography defines the behavior of a set of ManageableEntities from the point-of-view of other ManageableEntities), and (4) the definition of a set of roles (human and machine) that can interact with, use, and/or operate on the ManageableEntity;
- Network-based data collection may be defined as the ability to efficiently collect information regarding ManageableEntities accessible in a network. This specifically refers to ManageableEntities at the "parent" as well as "child" levels (e.g., a device and its ports, or an application and the services that it provides);
- Agent-based data collection involves using dedicated software running locally on a managed device as part of the management infrastructure; the agent-based software is solely devoted to management (which includes, but may not be limited to, data collection);
- Agentless data collection involves collecting data from ManageableEntities without installing any new software on the device that hosts the ManageableEntities on them; the key difference between it and agent-based data collection is that agentless data collection does not involve installing any new software on any machines to be monitored; and
- Data collection management approach is defined as the combination of a set of data models, protocols, and software that enable collected data to be analyzed, processed, and understood, so that the ManageableEntities that produced the collected data can be monitored and managed.

Figure 1B:
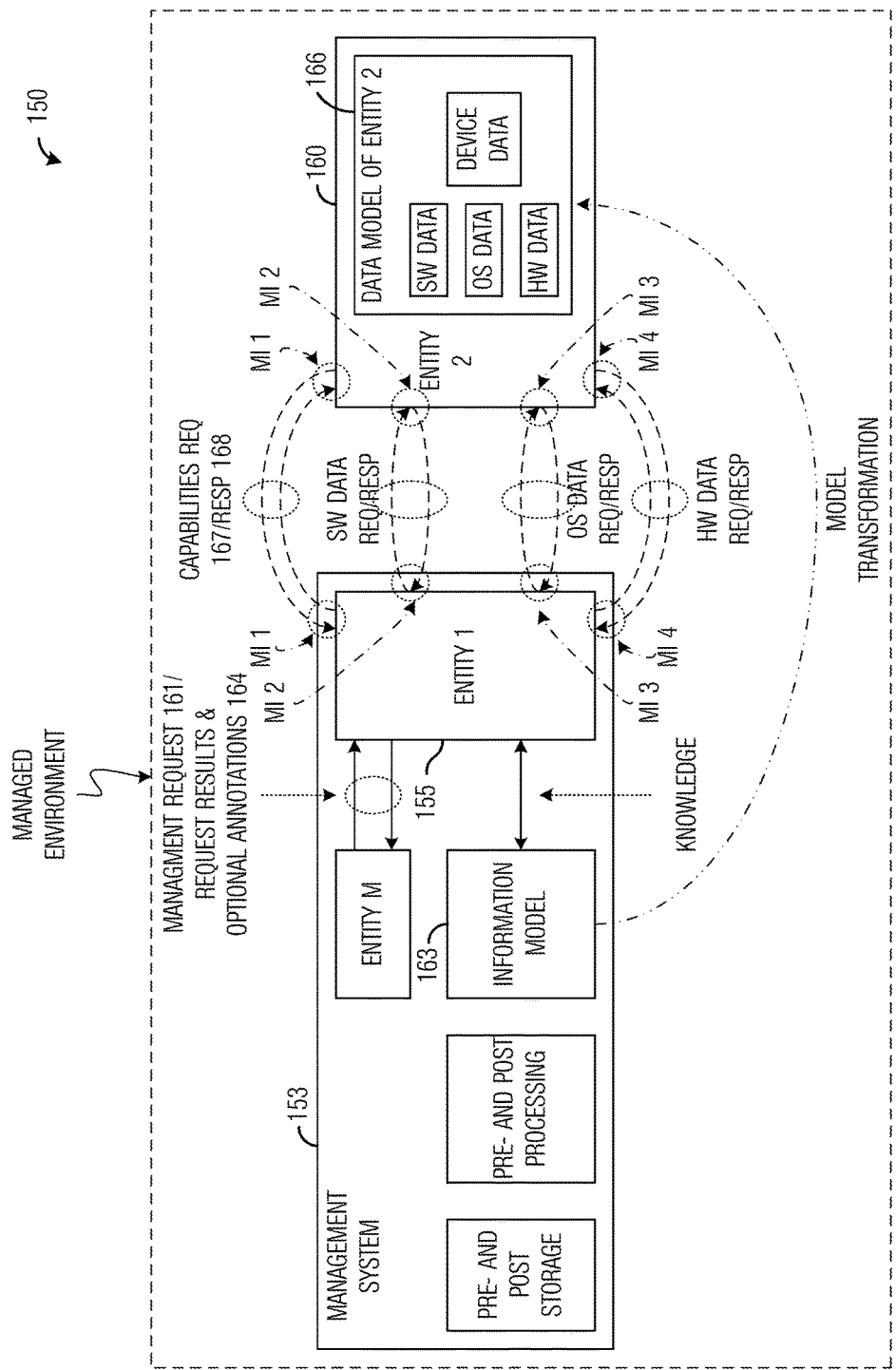
FIG. 1b illustrates an example high-level view of a managed environment, in which a first entity, which is part of a management system, is managing a second entity, according to example embodiments described herein.

FIG. 1b illustrates an example of a managed environment 150, consisting of a management system 153 and a second entity 160. A first entity 155 is a part of management system 153, and is managing second entity 160, which is a part of managed environment 150. Managed environment 150 may receive a management request 161 by first entity 155 to collect data from second entity 160. First entity 155 may consult an information model 163 to determine if any information about second entity 160 is available. Information model 163 defines archetypal information and behavior, in an object-oriented form, that may be thought of as a set of model elements that represent the functionality and behavior of second entity 160. Annotations 164 may also be defined and are used to describe the time, version, and other metadata that define the appropriate set of objects that represent the appropriate instance of second entity 160, and whether such objects have already been defined in one or more data models 166. If insufficient knowledge exists about second entity 160 (e.g., what version of which operating system is it currently running), then first entity 155 may need to exchange one or more messages, e.g., capabilities request 167 and capabilities response 168 messages, with second entity 160 to determine the functionality and behavior that second entity 160 supports. The capabilities request 167 and capabilities response 168 messages may be based on the knowledge contained in information model 163. The exchange of any data, including those shown in this exchange, may comprise two uni-directional exchanges, one for requesting data, and one for returning the data requested.

First entity 165 may examine the data that is requested to be collected from management request 161, and compares this request with the capabilities of second entity 160 in order to determine how best to obtain the data requested. A problem is that many elements in the data collection process may be dependent on each other. As an example, the type of protocol used can affect which data can be collected, and at what frequency, granularity, and other factors. These and other dependencies are modeled using Information Model 163. As an example, the exchange of capabilities request 167 and capabilities response 168 messages define which protocols are supported by both first entity 155 and second entity 160. Using the protocols, first entity 155 may then issue a set of data requests to appropriate ManageableEntities that comprise second entity 160, where each ManageableEntity in second entity 160 may use the same or a separate protocol.

As an illustrative example, a Hypertext Transfer Protocol (Secure) (HTTP(S)) capability request may be sent by first entity 155 to second entity 160 to provide various performance metrics, such as the time since its last reboot, the amount of memory currently being used, and so forth. Such metrics may typically be supported by multiple protocols (e.g., Simple Network Management Protocol (SNMP), System Log (Syslog), Command Line Interface (CLI), and others); however, each protocol may use a different set of resources and have a different accuracy. It is possible that first entity 155, through use of information model 163, will first optimize the request for data from second entity 160 by optimizing the use of the same protocol, where possible, to get the best data possible. The set of ManageableEntities that comprise second entity 160 may be defined by data model 166 of second entity 160 and data model 166 may be derived from information model 163.

Hence, first entity 155 may use a particular protocol with a specific management interface to request specific data from second entity 160 (e.g., WMI for Operating System data, CLI for software, SNMP for hardware, and the like). It is noted that a protocol may be used to support one or more types of data, and that a particular type of data may require multiple protocols to obtain all of the information that constitute a particular type of data (for example, this is illustrated in FIG. 1*a* by using the combination of CLI, SNMP, and REST to retrieve all of the Software information from second entity 110). These requests then query the appropriate ManageableEntities that are part of second entity 160. Replies to the query or queries may come back through the same management interface of second entity 160 that the requests were received. First entity 155 may then read the collected data, optionally process and store it, and then either notify a requestor of the data that the data is ready or directly send the data to the requestor.

Figure 2A:
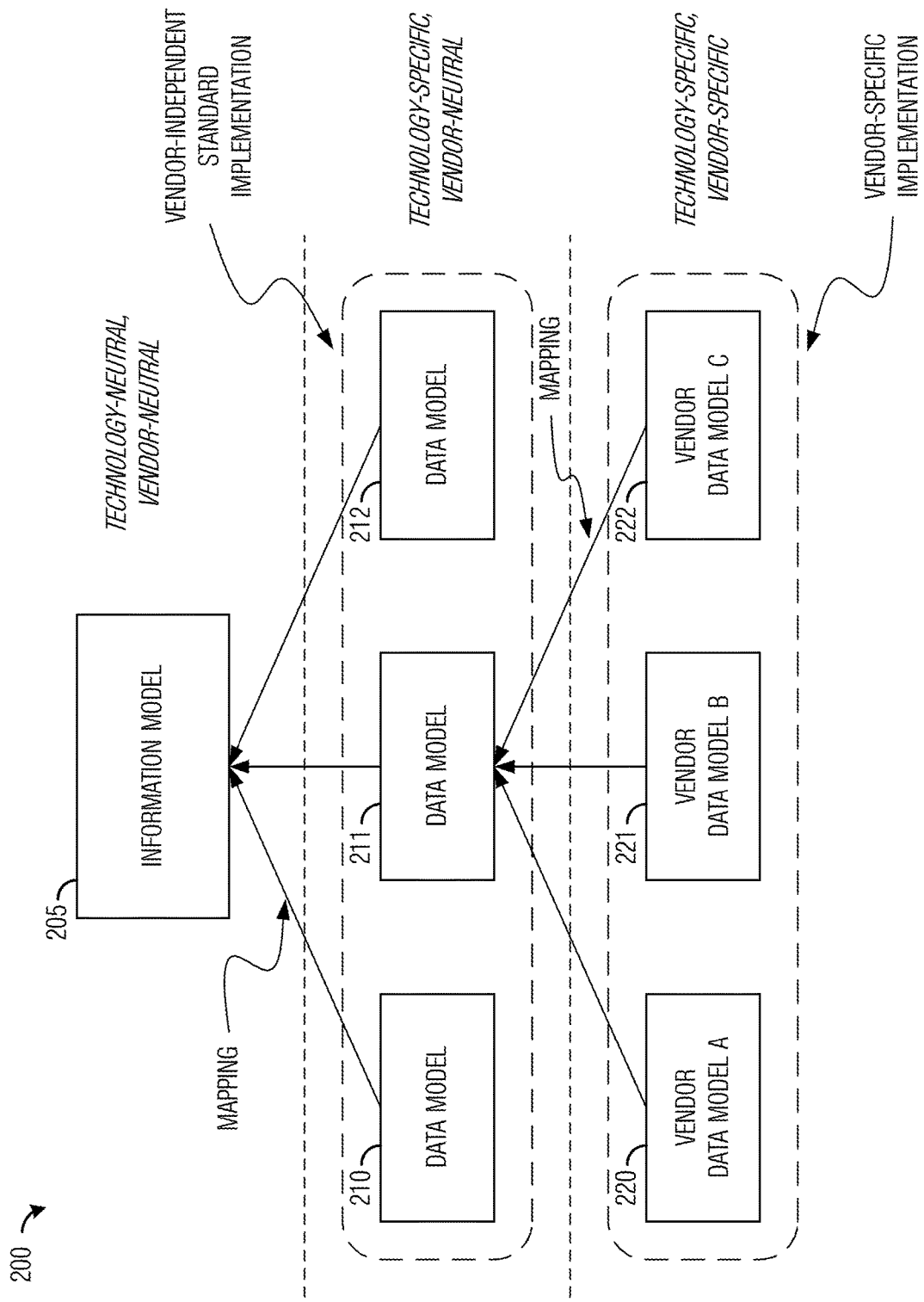
FIG. 2a illustrates an example relationship and mapping between an information model and data model(s) according to example embodiments described herein.

FIG. 2*a* illustrates a relationship and mapping between an information model 205 and a set of data models. Conceptually, information model 205 provides a view of the inherent connectedness between data and a managed communications system. Information model 205 enables information, knowledge, wisdom, and the relations, patterns, and principles that they represent to be modeled in a technology-neutral manner. In contrast, data models, such as data models 210-212 and data models 220-222, may be considered to be instances of information model 205. The data models may be derived from information model 205 and can be related to each other, since they share the concepts that are defined in the information model. A difference between an information model and a data model that define the same concepts is the realization of those concepts using technologies, languages, and/or protocols. In general, the information model does not use any platform-, language-, and/or protocol-specific definitions. On the other hand, data models are typically tightly bound to at least one, and usually all, of these three features (platform, language, and protocol).

There may be several types of data models. A first data model type may be a technology-specific but vendor-neutral instantiation of information model 205. As an example, data models 210-212 are technology-specific but vendor-neutral instantiations of information model 205, and could represent concepts using a directory, a relational database, and a flat file. A second data model type is a technology-specific and vendor-specific instantiation of information model 205. As an example, data models 220-222 are technology-specific and vendor specific instantiations of information model 205 as well as data model 211.

Figure 2B:
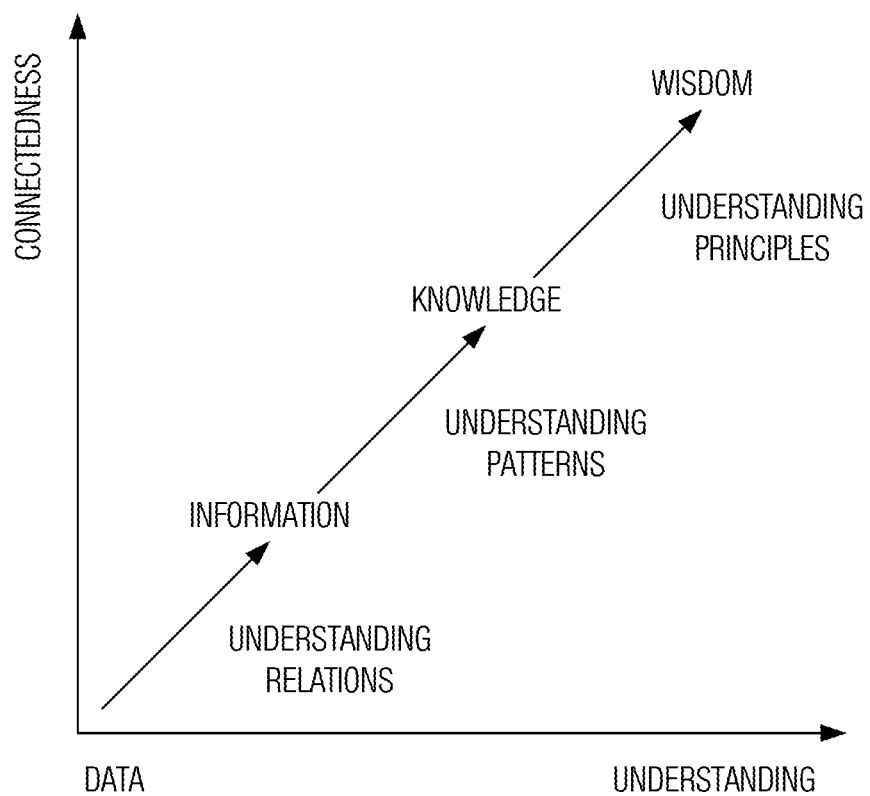
FIG. 2b illustrates an example relationship between understanding and connectedness for data according to example embodiments described herein.

FIG. 2*b* illustrates a relationship 250 between understanding and connectedness for data. Typically, raw data becomes information when relationships between the raw data are known. Once patterns are known, information may be come knowledge, which in turn, becomes wisdom once principles are known. The information model may be used to define a set of methods that may be used to transform data into information, knowledge, and wisdom.

In general, an information model may:
contain different types of knowledge that can be collectively organized according to different parameters (e.g., policy, context, and the like); these parameters can be used as context-defined filters to interpret the collected data;
help to organize relationships between data inferable from collected data with sufficient supporting data;
organize knowledge by views rather than just a parameter(s);
define patterns that can be used to define how to collect, aggregate, filter, match, correlate, and other processing operations on network data; the operations are possible due to object-oriented class and relationship definitions present in the information model;
enable different types of protocols to be used that can reveal different types of data about a single network entity or a set of network entities;
be independent of technology, platform, and protocol; enabling the information model to be used to support multiple data models through a set of mappings, making it superior to starting with a particular data model since it abstracts the specification of the network objects and their relationships from how they are to be collected and the implementation of the collection;
abstract both the specification of the network objects and their relationships from additional enhancements, such as implementation of metadata, reasoning using first order logic, and additional mechanisms;
enable the collection process to be separated from additional post-collection processing tasks for verifying further behavior that a given network entity has; and
enable behavior to be defined as a set of concepts, contained in the information model, that define the syntax and static semantics of behavior (static semantics refers to those aspects of behavior that may be defined at design time that affect the state of a ManageableEntity), which may be performed by a set of concepts that can also be defined in the information model, including but not limited to policy rules and state automata.

A benefit of using the information model is that it provides a self-describing set of mechanisms that define how knowledge can be used to describe the semantics of characteristics and behavior of a ManageableEntity, including its attributes and relationships.

Figure 3:
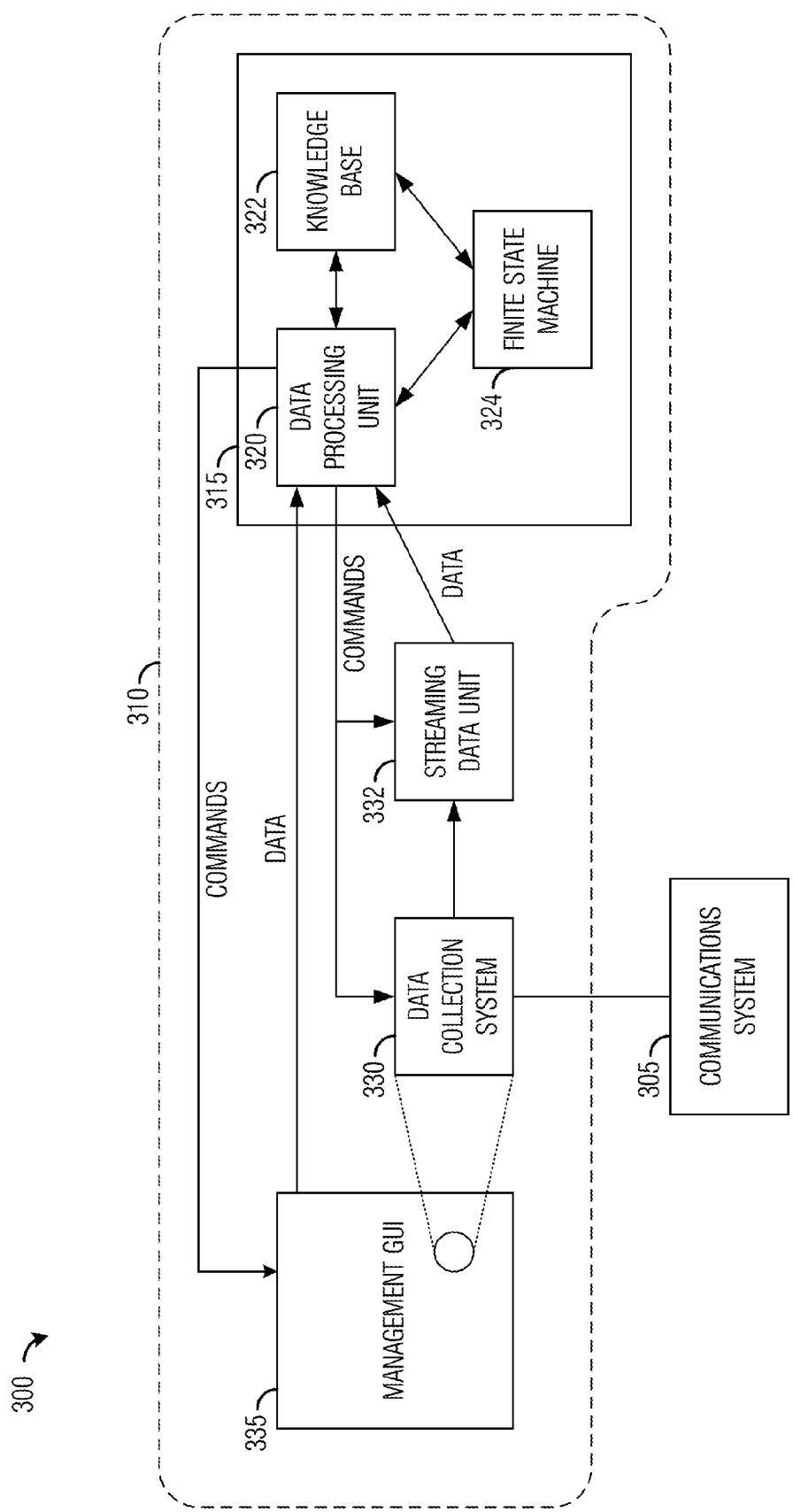
FIG. 3 illustrates an example system including a communications system with an information model based management system according to example embodiments described herein.

FIG. 3 illustrates an example system 300 including a communications system with an information model based management system. System 300 includes a communications system 305 and a management system 310 that may be used to manage communications system 305. Management system 310 includes a management entity 315 that may process data collected from communications system 305 using data processing unit 320, provide a knowledge base 322 for the data collected and processed from communications system 305, and the like. Knowledge base 322 may implement an information model of communications system 305, as well as one or more data models thereof. A finite state machine 324 may be used to control the operation of management entity 315.

Management system 310 may also include a data collection system 330 to collect data from entities in communications system 305. Data collection system 330 may make use of one or more protocols as specified by management entity 315 to collect data from communications system 305. Data collection system 330 may stream data using a streaming data unit 332 to management entity 315. The streamed data may be delivered out of order, fragmented, with some data missing, and the like. Some data may be retrieved using specific protocols under specific conditions. A management graphical user interface (GUI) 335 may allow users, such as operators, managers, and the like, to interact with management entity 315, as well as communications system 305.

Dependency Analysis

Figure 4:
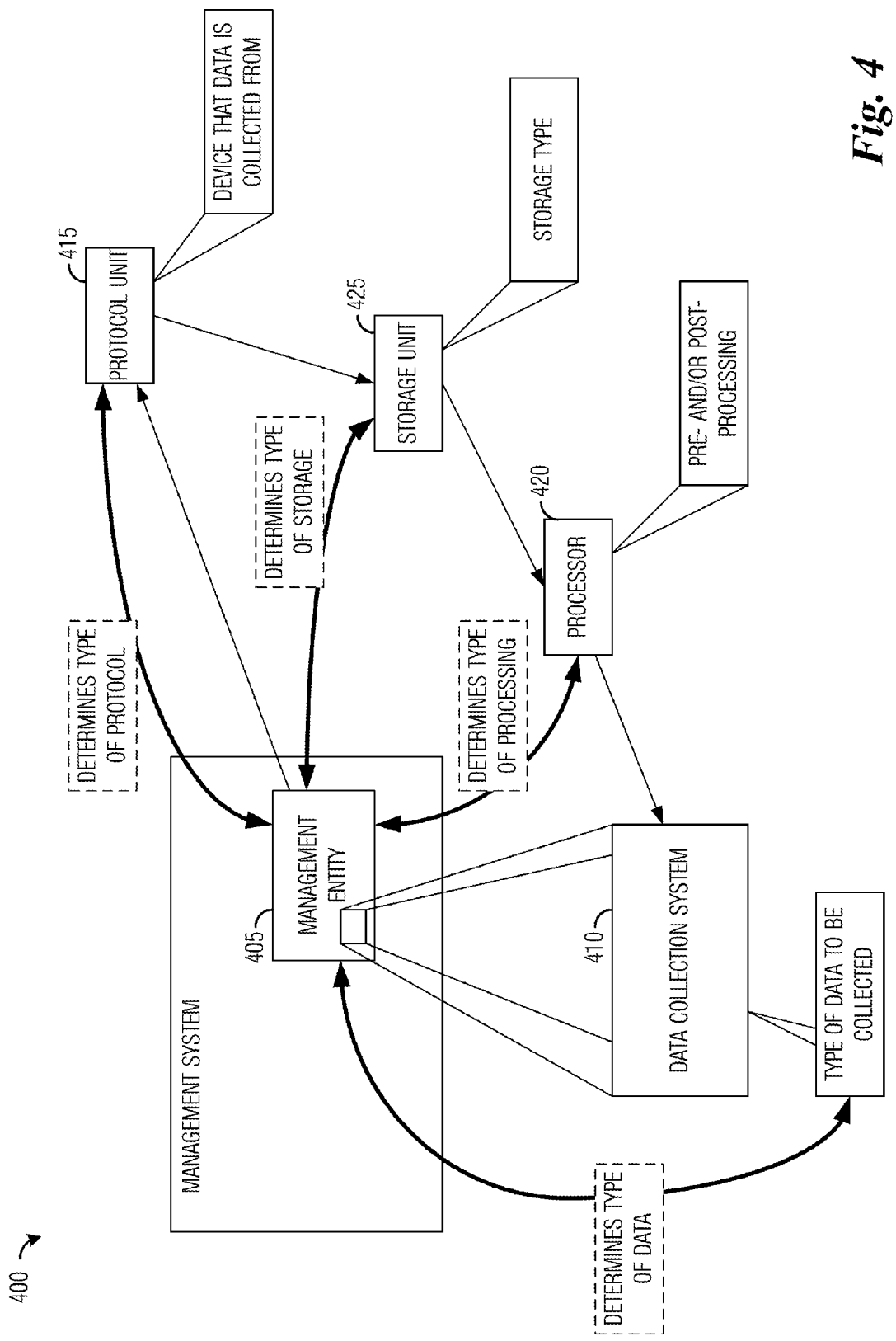
FIG. 4 illustrates an example management system that may determine a set of data collection, processing, and storage components to use, and their inter-dependencies, according to example embodiments described herein.

FIG. 4 illustrates an example management system 400 with detail provided for a portion of the management system. Management system 400 includes a management entity 405 that may determine the type of data to be collected (via a data collection system 410), determine the type of protocol used to collect the data (via a protocol unit 415), determine the type of processing (e.g., pre-processing occurring during the collection of the data and/or post-processing occurring after the collection of the data has been completed) to be provided to the collected data (via a processor 420), and determine a type of storage (e.g., pre-storage, which is temporary storage that is used during the collection of the data, and/or post-storage, which is temporary and/or permanent storage that is used after the collection of the data has been completed) to be used to store the collected data (via a storage unit 425). As discussed previously, an information model of a communications system may be used by management system 400, specifically, management entity 405, to determine the type of data, the type of protocol, the type of processing, and the type of storage required for a given data collection task.

Using an information model of a communications system allows for a common set of model elements that can be used to define interrelated semantics that exist between the type of data to be collected, the type of protocols used to collect the data, the type of pre-processing and post-processing operations that are to be performed on the collected data, which data (if any) should be stored in what type of data repository, and the like. Each of these interrelated semantics may represent dependencies between these fundamental portions of the data collection process. Furthermore, each are uni-directional. For example, the type of data that is to be collected restricts the type of protocol that can be used, since the type of protocol may need to satisfy a number of requirements, including: (1) the protocol may need to be able to transport the data reliably (and possibly securely), meaning that the accuracy of each datum, as well as the entire data set, should not be altered), and (2) the protocol may need to be able to support appropriate operations (e.g., create, read, update, delete, and the like) on the data. Similarly, the protocol constrains the type of data, in that the protocol (1) may need to be able to support the data structures that are used by the data to be collected, and (2) the protocol may need to be semantically compatible with the use of the data. For example, while directories can theoretically store and retrieve any type of data structure, their protocol (e.g., the Lightweight Directory Access Protocol (LDAP) or even its stronger and more robust version, X.500 (a set of standards defining directory services by the ITU-T)) was designed primarily to be used with simple textual search applications. This may place a fundamental limitation on how data can be searched, created, edited, and retrieved in a directory.

If the above dependencies are understood and satisfied, then a unified platform may be built, i.e., a platform that is independent of the technology used to implement the type of protocol, the type of ManageableEntity, the type of data to be collected, the types of pre-processing and post-processing operations to be performed, the types of storage operations and storage to be performed, and the like. In particular, the unified platform allows for:

a set of reusable abstractions—since protocols, data, pre-processing functions, post-processing functions, data repositories, and storage operations may all be represented as model elements, all exist as reusable objects in the management system;

a set of patterns to create the reusable abstractions as provided by the information model, which may simplify the resulting design and implementation;

an extensible set of mechanisms to identify a ManageableEntity, as well as its attributes and behavior since a ManageableEntity may be identified by a set of attributes, relationships, metadata, behavior, and/or structure;

the ability to direct the collection of data based on intrinsic and extrinsic model elements that represent the ManageableEntity or set of ManageableEntities that data is being collected for;

the ability to determine whether any additional data should be collected from ManageableEntities that have already been visited (allowed by the virtue of comparing the MangeableEntity data collected to the representation of the ManageableEntity in the information model and determining if data is missing);

the ability to define which collected data should be stored in which type of data repository (if any) after which type of pre-processing operation and/or post-processing operation (if any) are performed; and the ability to define which of the above discussed features (if any) is affected by which types of changes in the context of the environment.

High-Level Overview of the Management System for Collecting Data

Figure 5:
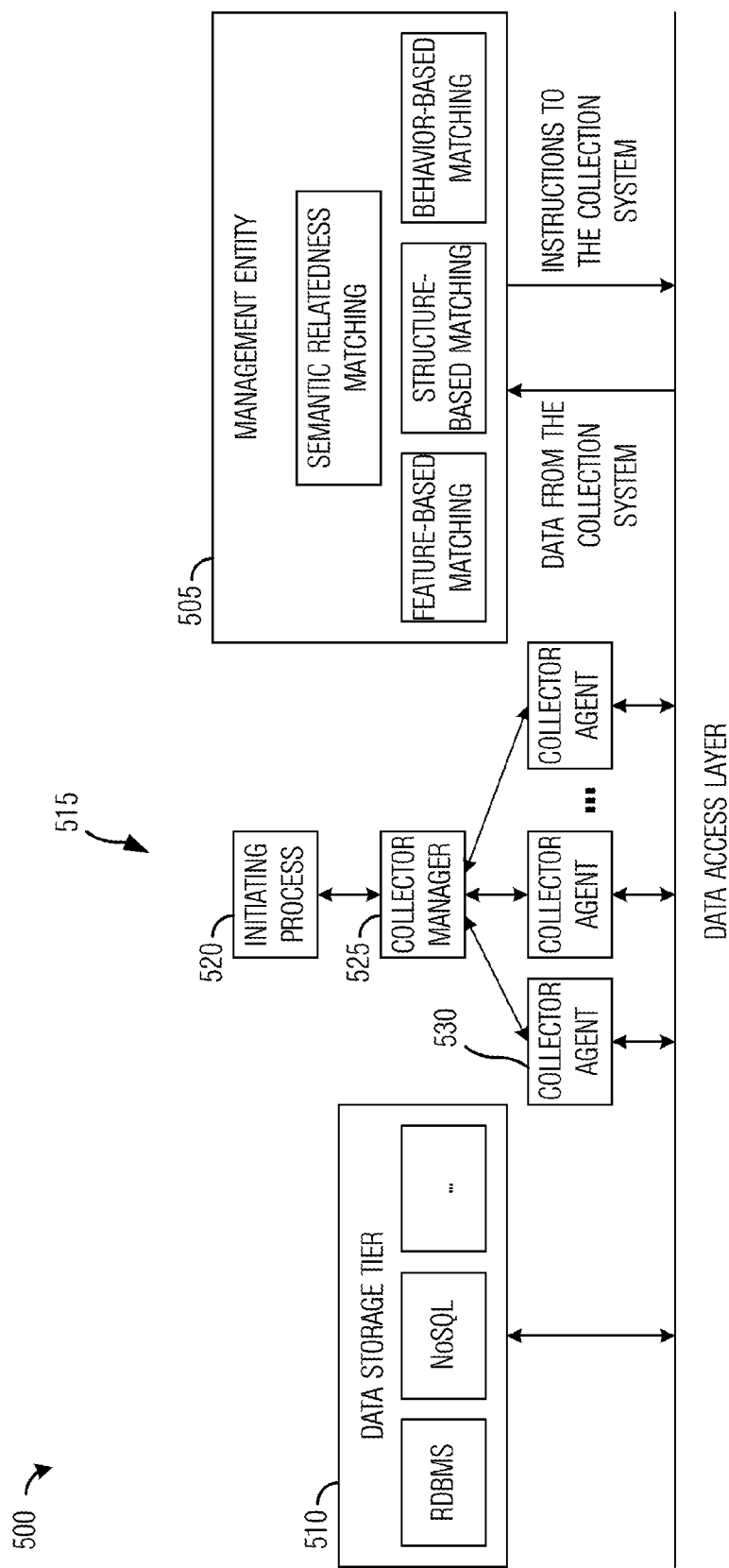
FIG. 5 illustrates an example detailed view of components of an example management system according to example embodiments described herein.

FIG. 5 illustrates a detailed view of components of an example management system 500. As shown in FIG. 5, management system 500 includes a management entity 505, a data storage tier 510, and a detailed view of a data collection system 515. Management system 500 includes a plurality of class identification units that identify classes of objects, e.g., a ManageableEntity, using a variety of matching techniques, including feature-based matching, structure-based matching, behavior-based matching, semantic relatedness matching, and the like. Data storage tier 510 may provide storage and/or management for the collected data. Examples of collected data storage management include a relational database management system (RDBMS), not only structured query language (NoSQL), and the like.

Data collection system 515 may include an initiating process 520 that controls the collection of the data, including starting and/or stopping the collection of the data. Also included may be a collector manager 525 that is responsible for collecting the data provided by a plurality of collector agents (such as collector agent 530). Since the data provided by the plurality of collector agents may be fragmented, out of order, lost, and the like, collector manager 525 may unfragment (or equivalently, defragment), reorder, correct, and/or recover the collected data. The collected data may be provided to management entity 505. Data collection system 515 may receive instructions on the data to be collected from management entity 505.

The data collected, i.e., the data collected from the ManageableEntity or set of ManageableEntities, may be used to discover if new capabilities have been added to an existing ManageableEntity (e.g., a new card was added having additional ports), or if new ManageableEntities have been added to the communications system (e.g., a new Virtual LAN (VLAN) was created). These two examples correspond to the management system 500 being able to detect the addition of new physical and logical (or virtual) capabilities of the system being managed. Similarly, data collection may be used to discover if existing ManageableEntities and/or their capabilities have been removed from the system or are no longer functioning properly. The data collected may also be used for collecting metrics usable in calculating and/or estimating a performance level of a ManageableEntity. The metrics may also be used to generate alarms and/or faults, optimize the performance of the ManageableEntity, perform maintenance operations, execute additional management operations, and the like. These operations, commonly referred to as operational and/or management operations, may be more complex since different types of ManageableEntities have different types of characteristics and behavior. Furthermore, a single instance of a ManageableEntity may exhibit different behavior in different contexts. Therefore, a robust mechanism may be needed to relate the impact of a context on the collection of the data.

Data collection may also be used to query existing parent and/or child nodes to determine additional information about each node. Generally, given a set of known ManageableEntities (referred to herein as parent nodes), each parent node may have a set of child ManageableEntities (e.g., ports of a ManageableEntity, or services of an application). As an example, the type of node will often determine the type(s) of ManageableEntity that may be related to that node, as well as protocol, media layer, and other physical and/or logical characteristics that form semantics of those relationships. Examples include port bonding and link aggregation (which are a function of the type of port, type of media, and the type of protocol being used). Different types of VLANs and Virtual Private Networks (VPNs) have similar semantics. Similarly, services may also be found from parent nodes and/or child nodes using several different protocols (e.g., simple service discovery protocol (SSDP), service location protocol (SLP), universal plug and play (UPnP), and the like). These protocols have different applications, and hence different semantics. Hence, the information model provides a single source for representing different types of ManageableEntities, and their relationships, using a common set of model elements with a common set of semantics.

Usually, data collected from ManageableEntities attached to one or more communications systems will be intermingled, making it difficult to associate data with a specific ManageableEntity to which it belongs. This may be exacerbated by change, e.g., ManageableEntities can join or leave communications systems without the management system being informed. Furthermore, ManageableEntities may be changed. As an example, the configuration of a ManageableEntity's configuration may be changed, which alters the functionality that the ManageableEntity provides. The information model of the communications system provides the knowledge needed to recognize one or more capabilities of a ManageableEntity or a set of ManageableEntities. Management of heterogeneous entities may therefore be normalized by matching common aspects of different capabilities of each of the different ManageableEntities. Once a set of common capabilities is determined, further processing may continue (if needed) across applicable sets of ManageableEntities.

An information model may be used to optimize the data collection process or set of processes for obtaining data from all or a subset of ManageableEntities. The optimization may be based on optimization factors, including the nature of the data to be collected, the type of ManageableEntities involved, the type of protocols that are used, the context of the communications system, needs of users and/or applications of the collected data, and the like. Optimizations may include determining which users and/or applications need the same data and optimizing the collection of the data so that the data is queried as few times as possible; use the same protocol and optimizing the collection of the data so that the number of protocol connections is minimized; and use the same commands (e.g., vendor-specific CLI, vendor neutral scripting languages, and the like) to query different attributes of the same or different ManageableEntities and optimizing the collection of the data (optionally with different attributes being filtered differently).

The behavior of a ManageableEntity A may be defined as a set of intrinsic attributes and/or relationships that involve ManageableEntity A, and/or a set of extrinsic classes, attributes, and/or relationships between the ManageableEntity A and a set of model elements that represent one or more ManageableEntities $B_1 \ldots B_n$. It is noted that the definition also holds when the single ManageableEntity A is replaced with a set of ManageableEntities $A_1 \ldots A_m$. The use of an information model may enable behavior to be statically defined and managed through a set of mechanisms that are themselves expressed in the information model (e.g., by using a dedicated set of model elements) such as policy rules and/or state automata. It may also be possible to dynamically define behavior, as well as enable changes in behavior.

The use of the information model may allow the management entity to be independent of technology-specific implementation. This is applicable to the protocols used as well as the type of data to be collected, the type of ManageableEntity that is the target for the data collection operations (e.g., storage device vs. network device vs. server vs. application), how that data is collected, the type of pre- and post-processing done on the collected data, the type of storage used for the collected data, how the ManageableEntities themselves are represented, and the like. Furthermore, the management entity is independent of data collection mechanism, e.g., collection agents, agentless collection, or a combination thereof.

Overview of the Model-Based Inventory Management Process

Figure 6A:
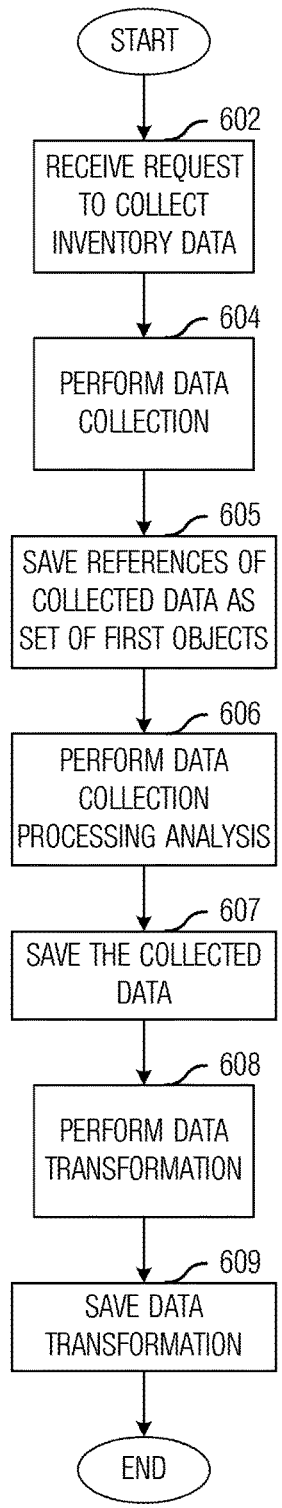
FIG. 6a illustrates an example flow diagram of operations occurring in a management entity as the management entity directs the collection of data, analysis, saving, and transformation for one or more entities in a communications system according to example embodiments described herein.

FIG. 6a illustrates a flow diagram of operations 600 occurring in a management entity as the management entity directs the collection of data for one or more entities in a communications system. Operations 600 may be indicative of operations occurring in a management entity, such as management entity 315, management entity 405, and management entity 505, as the management entity directs the collection of data, such as inventory data, for one or more entities, e.g., ManageableEntity or ManageableEntities, in a communications system.

Operations 600 may be partitioned into two distinct operations. A first operation may involve collecting the data, which may be referred to as data collection 604, and a second operation may involve transforming the collected data into a form compliant with a specified schema, which may be referred to as data transformation 608.

Operations 600 may begin with the management entity receiving a request to collect inventory data (block 602). The request may be in the form of input from a user of the management entity, an application executing in the management entity or another management entity, an external management entity, another instantiation of the management entity (such as in a distributed inventory management system), and the like.

The management entity may perform data collection based upon the request to collect inventory data (block 604). Data collection is described in additional detail in FIG. 6b-1. Referencing forward to FIG. 6b-1, which illustrates a high-level overview of the principal operations required to collect data, the request to collect inventory data may be parsed to determine dependencies present in the request and to form a dependency list (block 610). Parsing the request to determine dependencies is explained in greater detail below.

Figures 1, 6B:
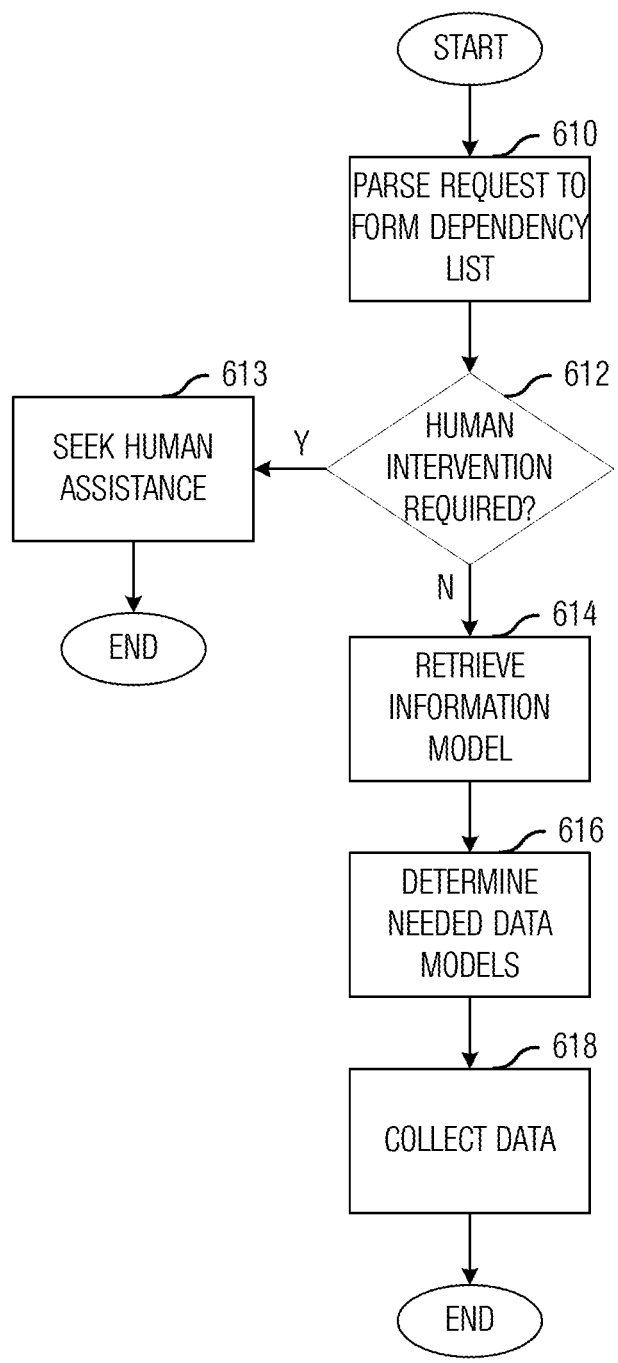
FIG. 6b-1 illustrates an example high-level overview of the principal operations required to collect data according to example embodiments described herein.
Figures 2, 6B:
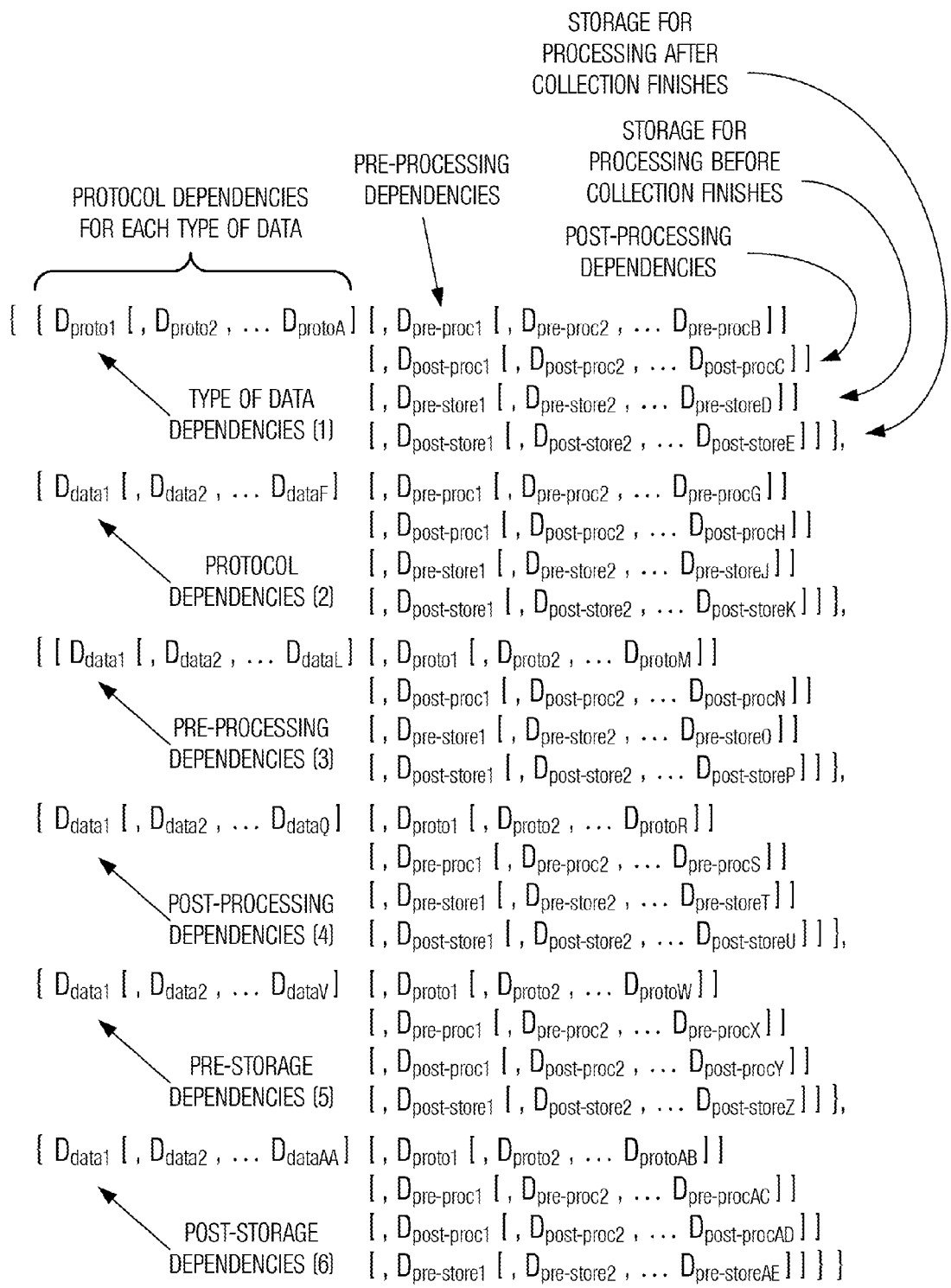
Figures 1, 6C:
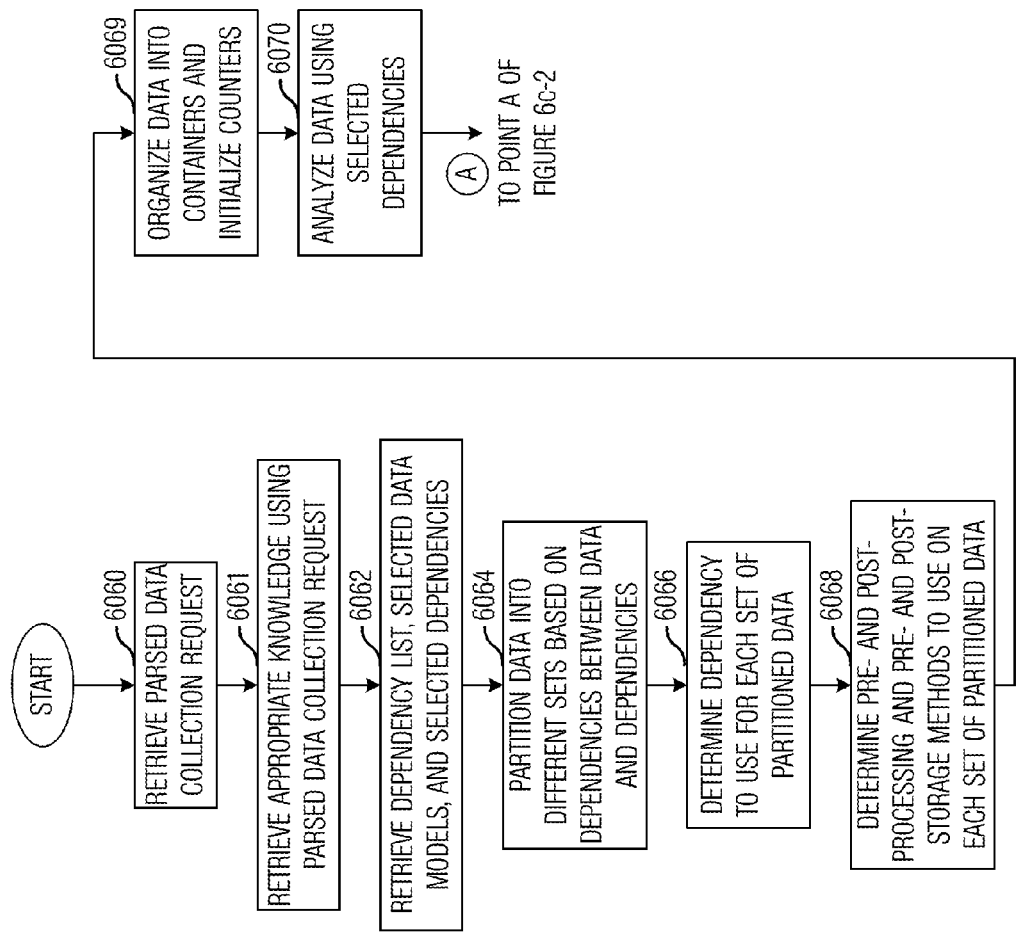
Figures 2, 6C:
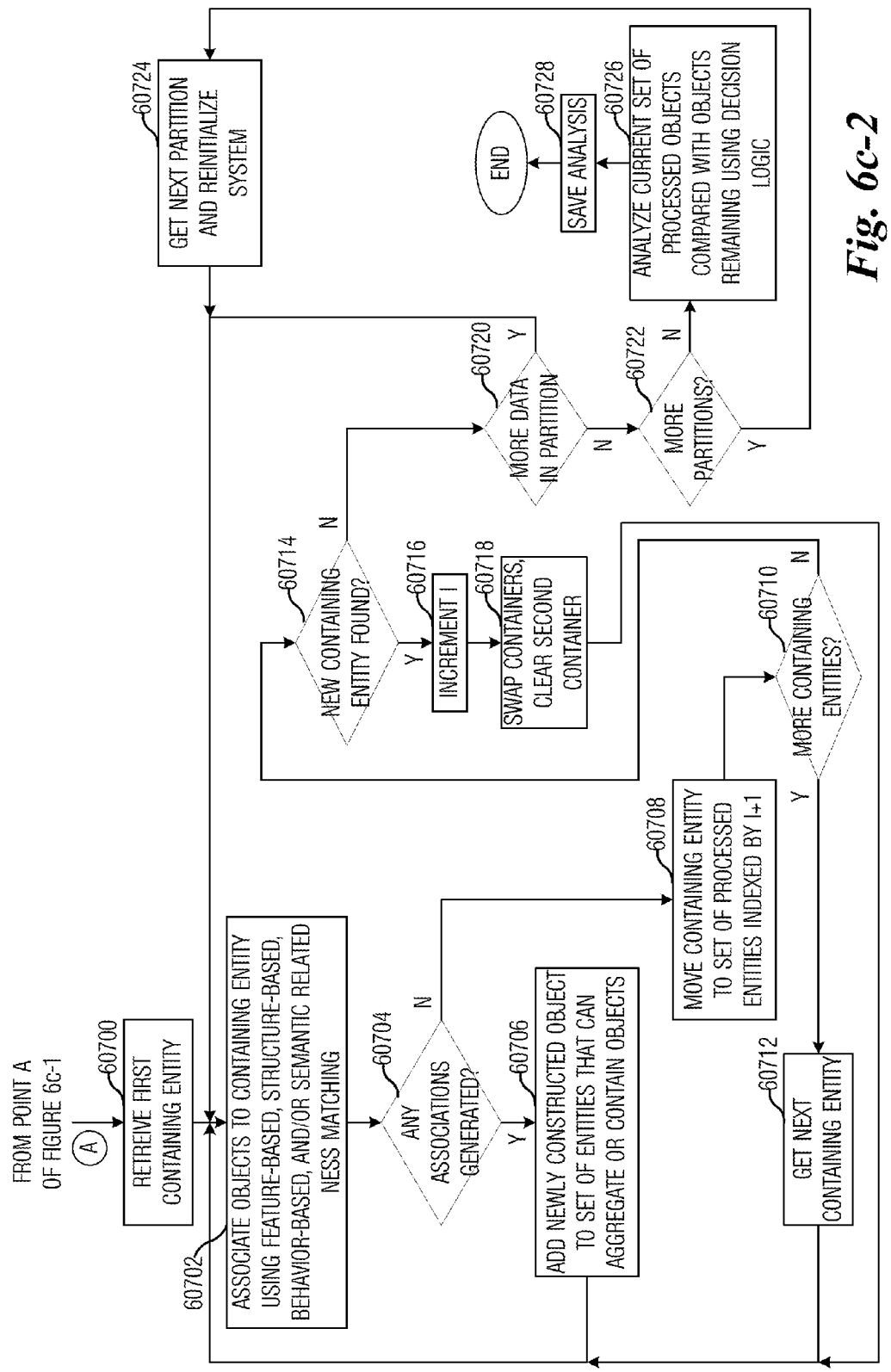
Figure 6D:
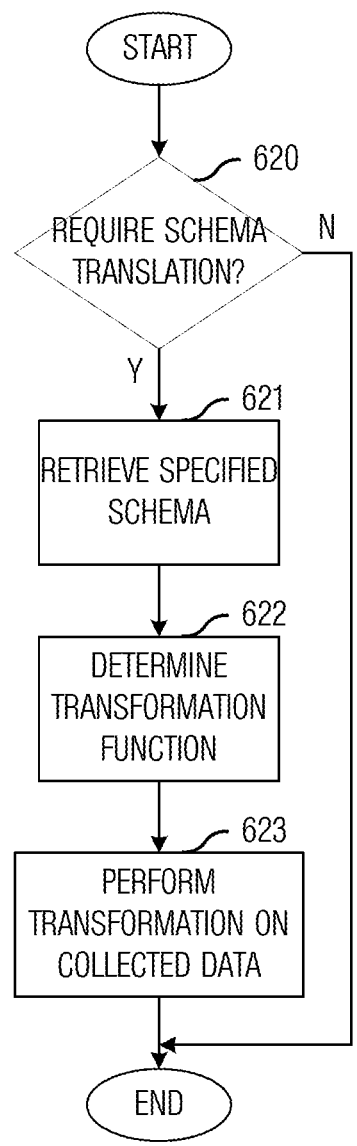
FIG. 6d illustrates an example flow diagram of operations occurring in data transformation function according to example embodiments described herein.
Figures 1, 6E:
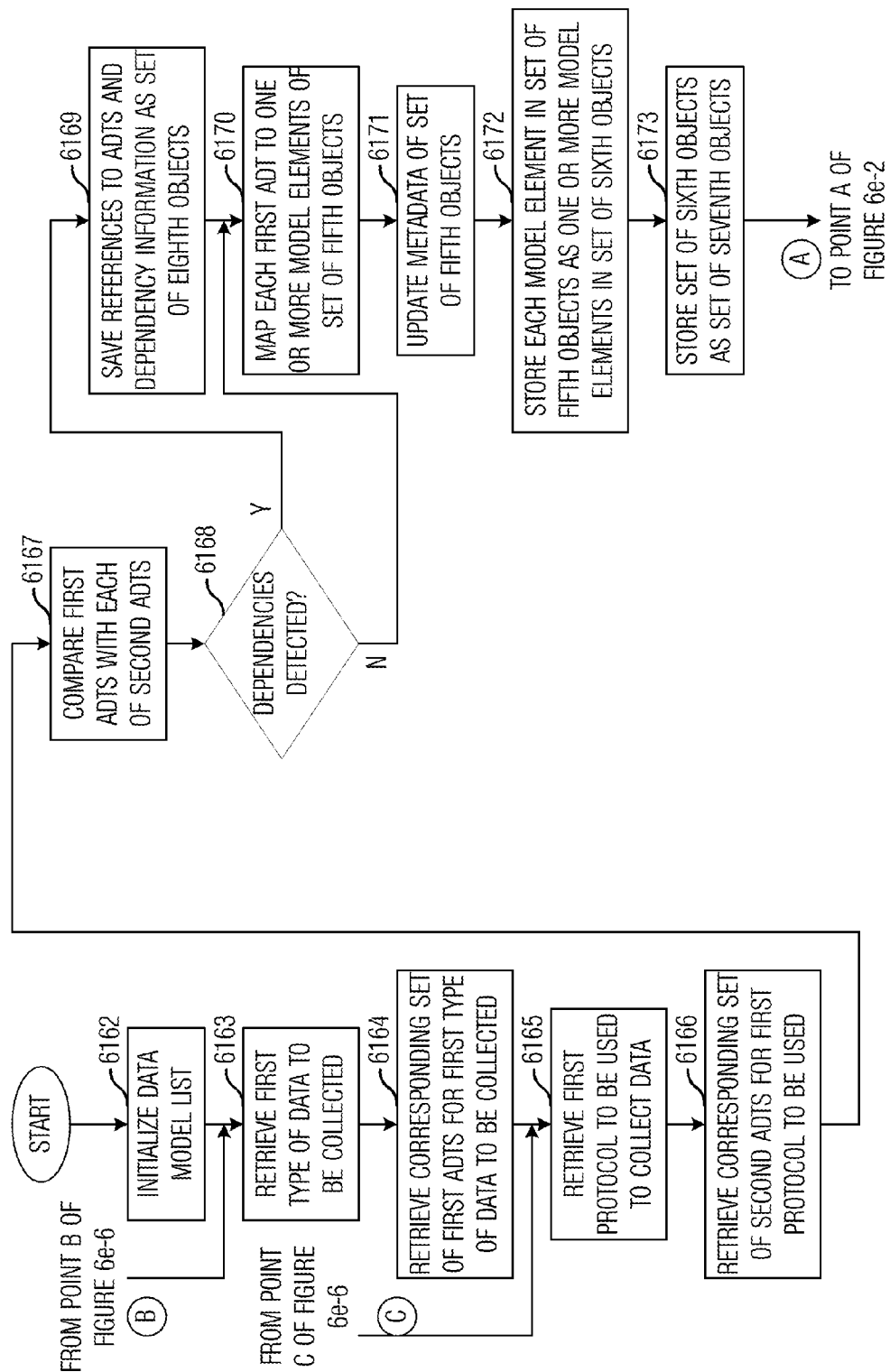
Figures 2, 6E:
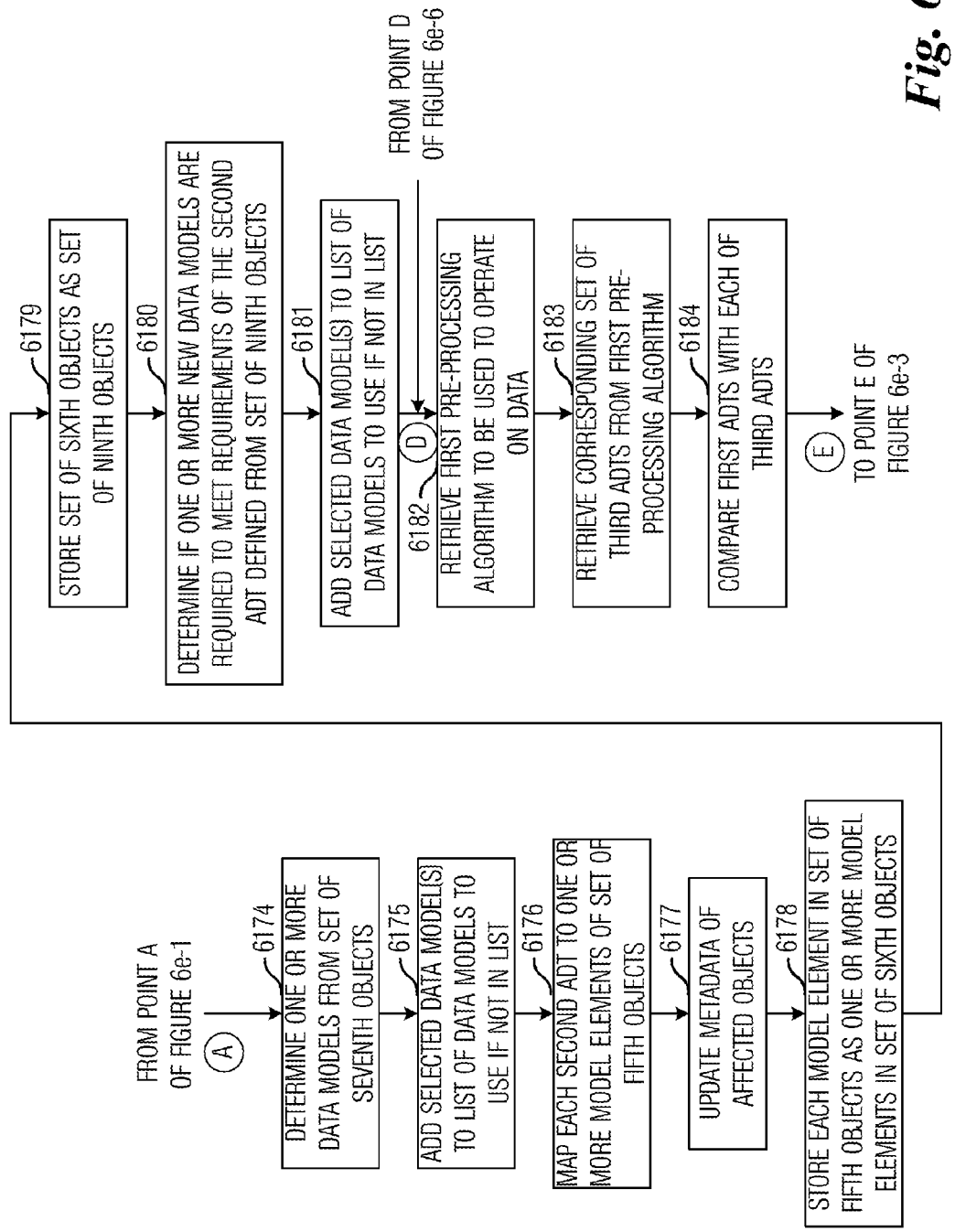
Figures 3, 6E:
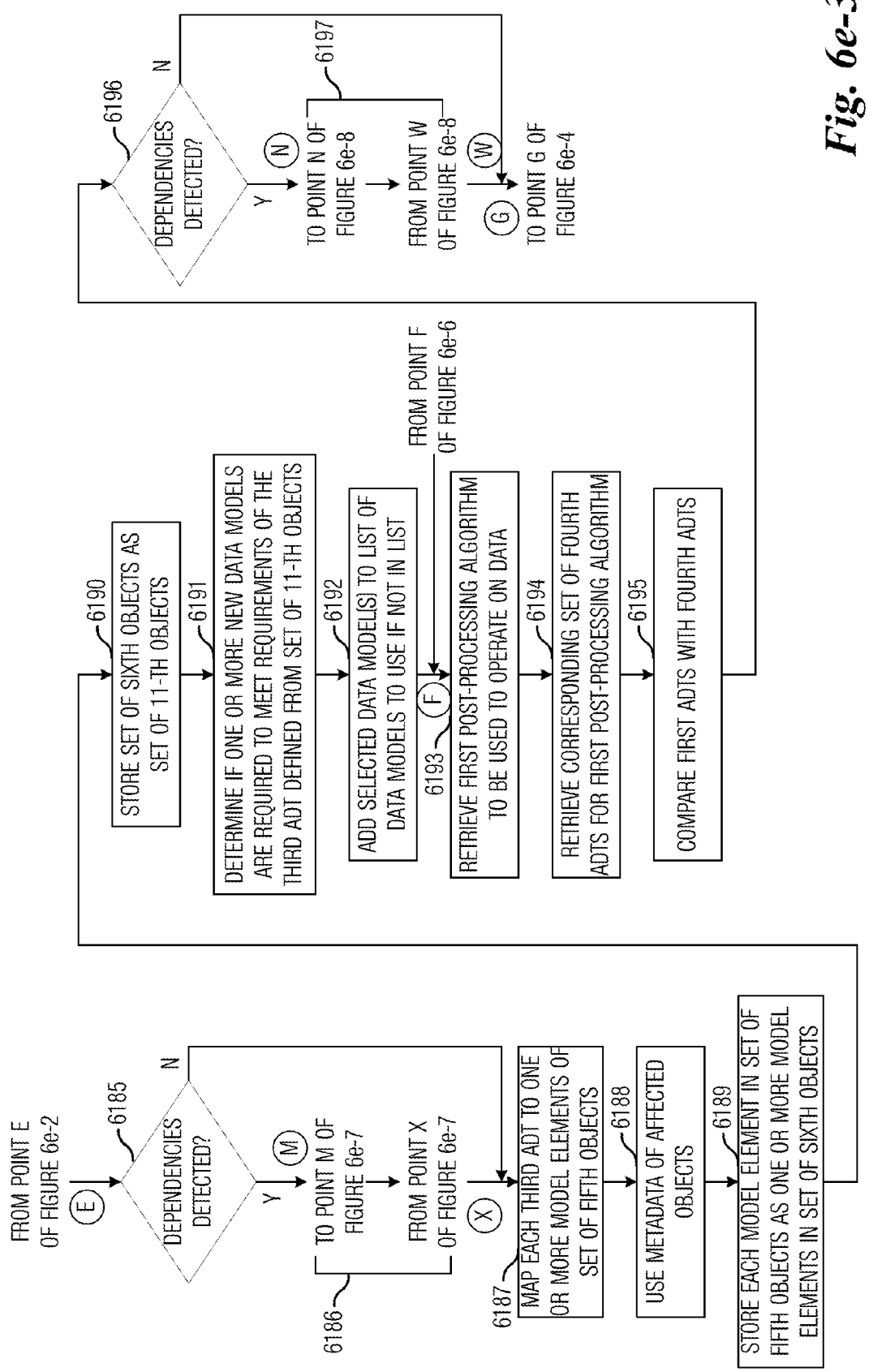
Figures 4, 6E:
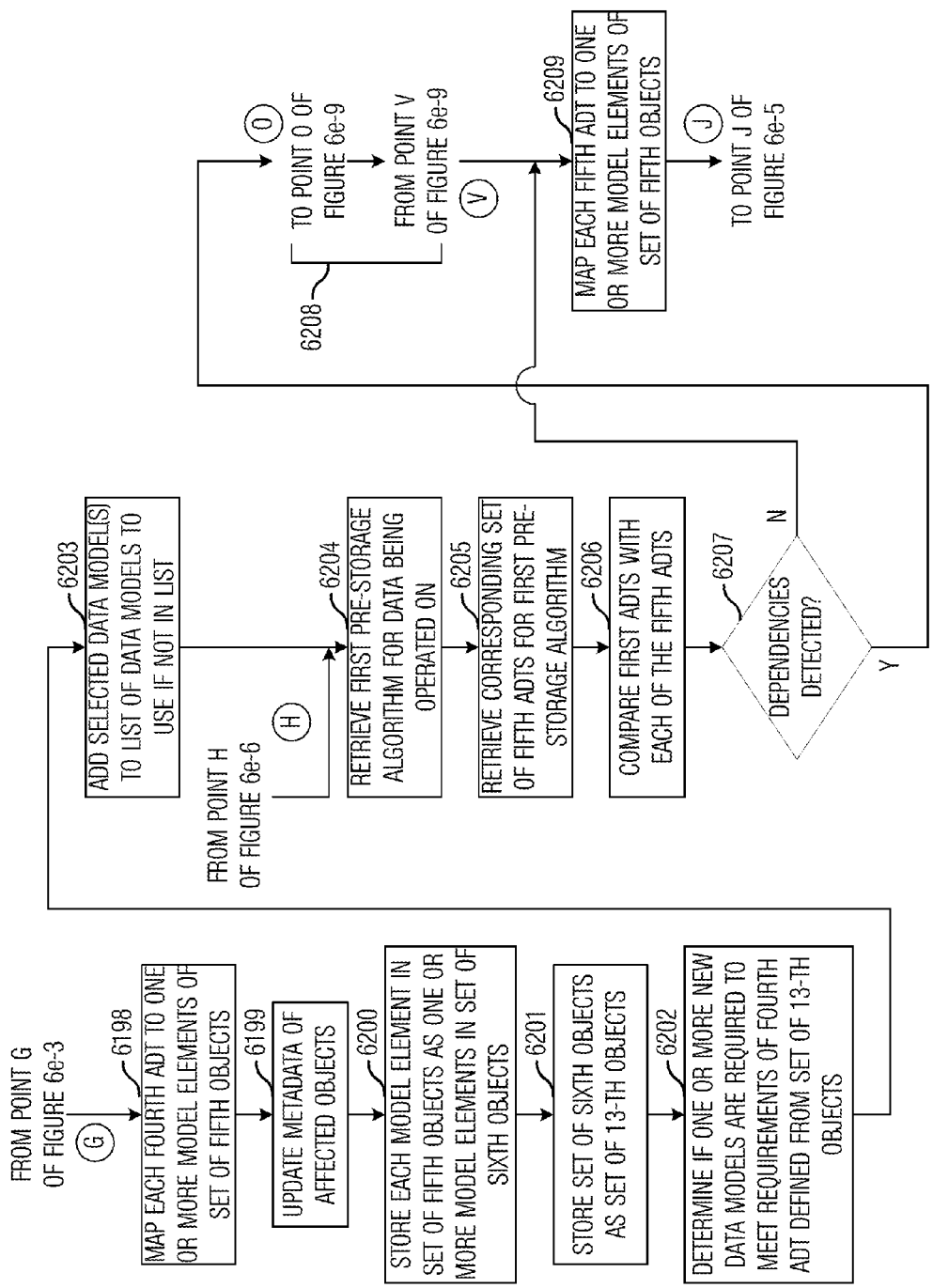
Figures 5, 6E:
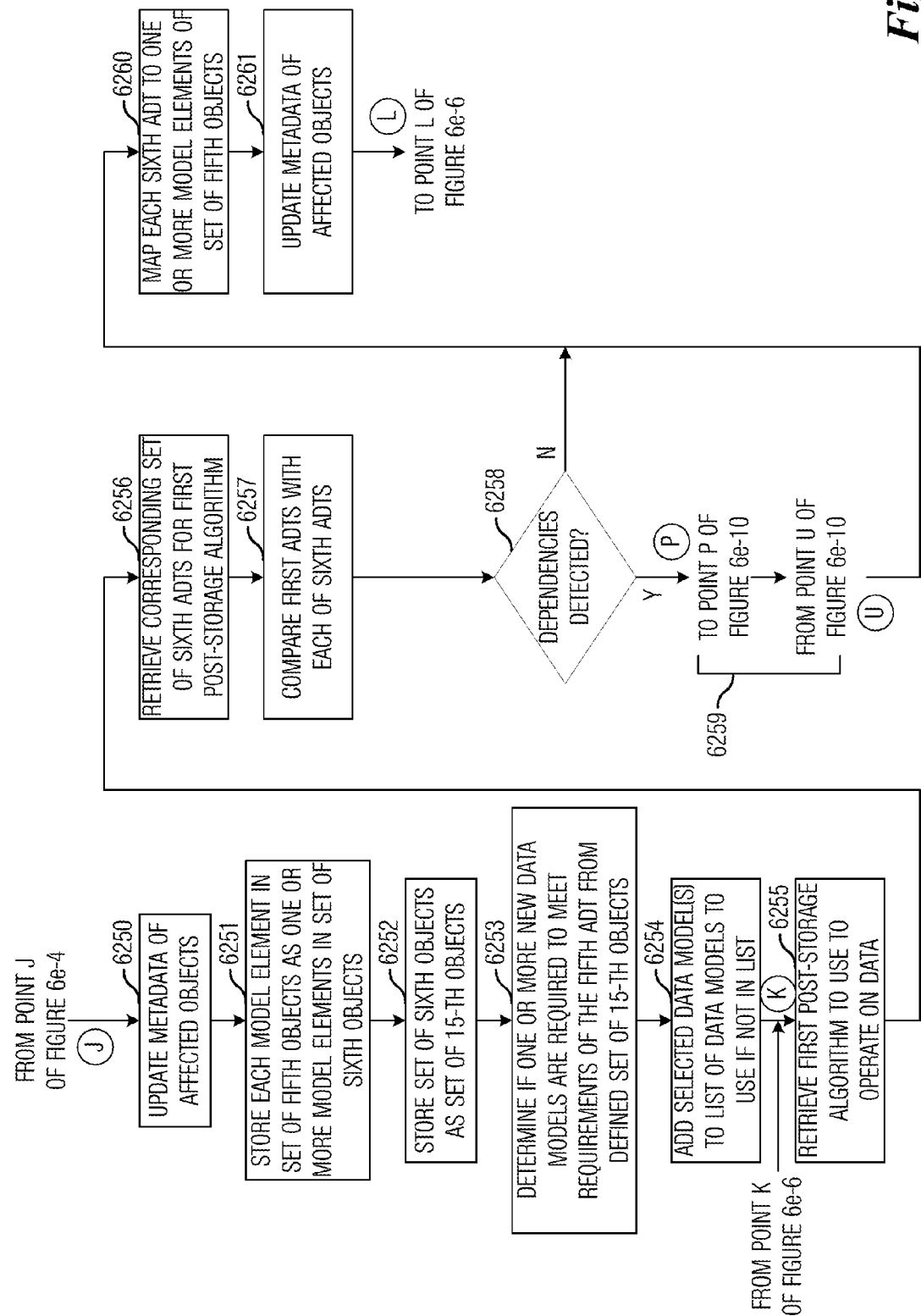
Figures 6, 6E:
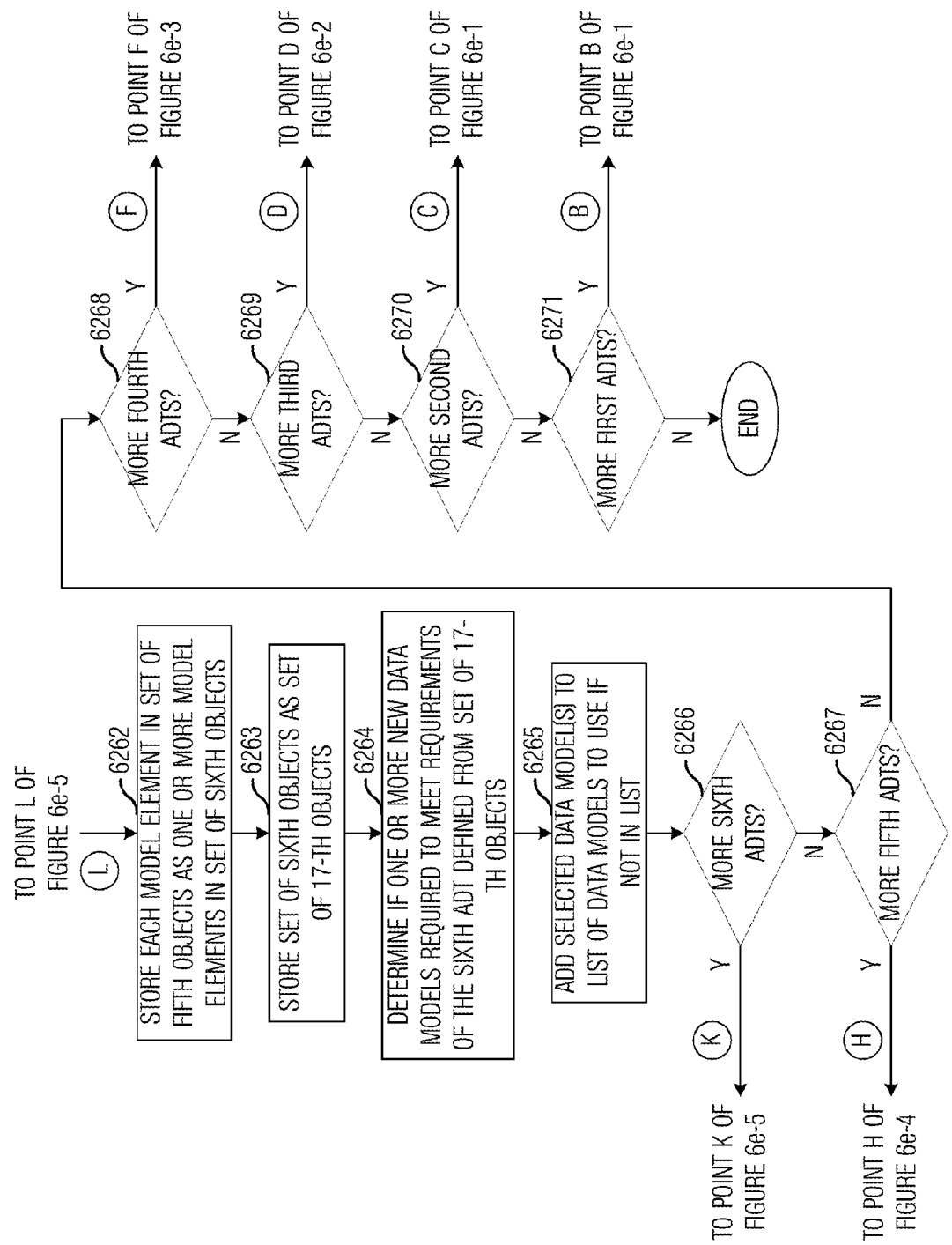
Figures 6, 6E, 7:
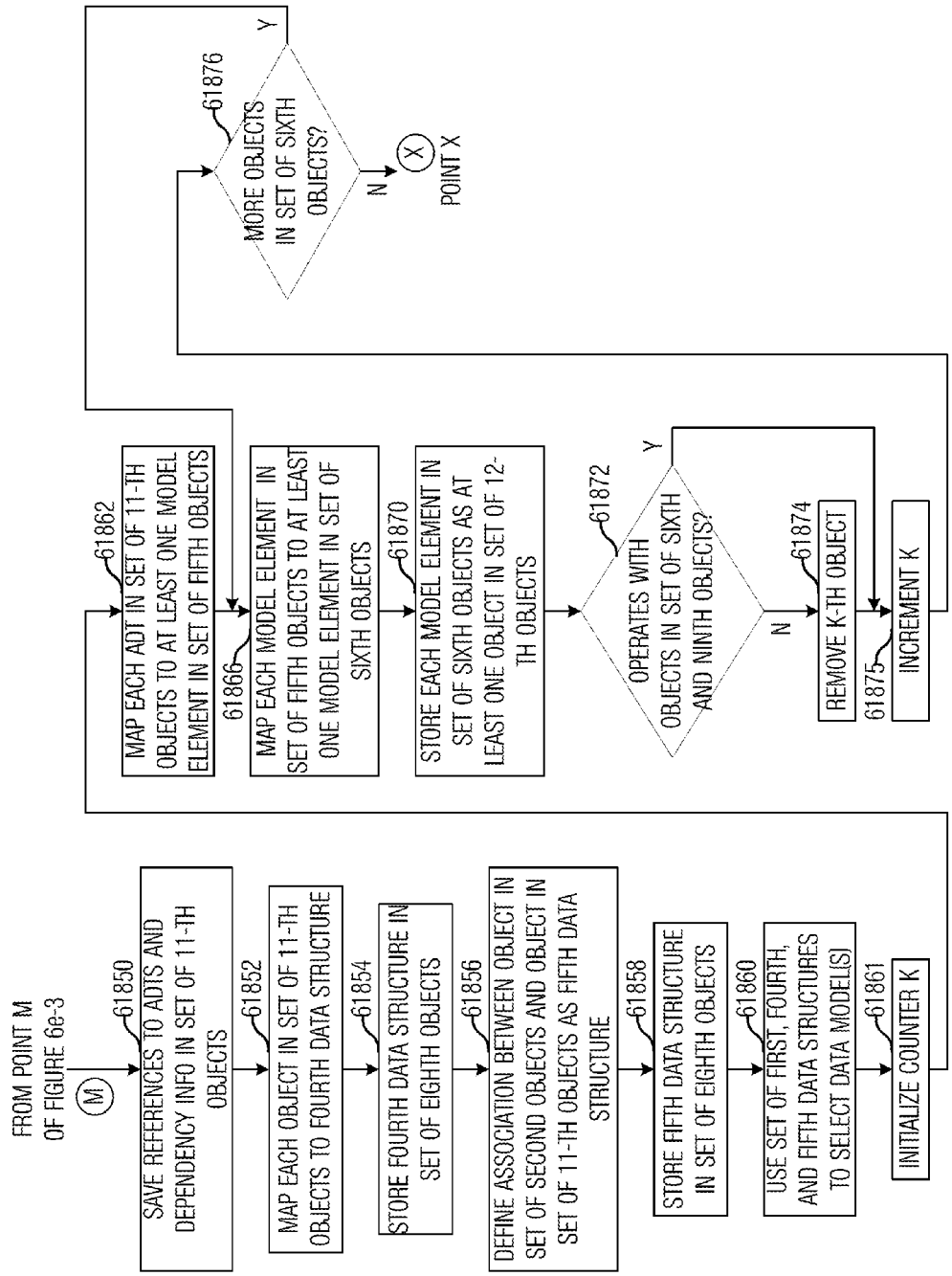
Figures 6, 6E, 7, 8:
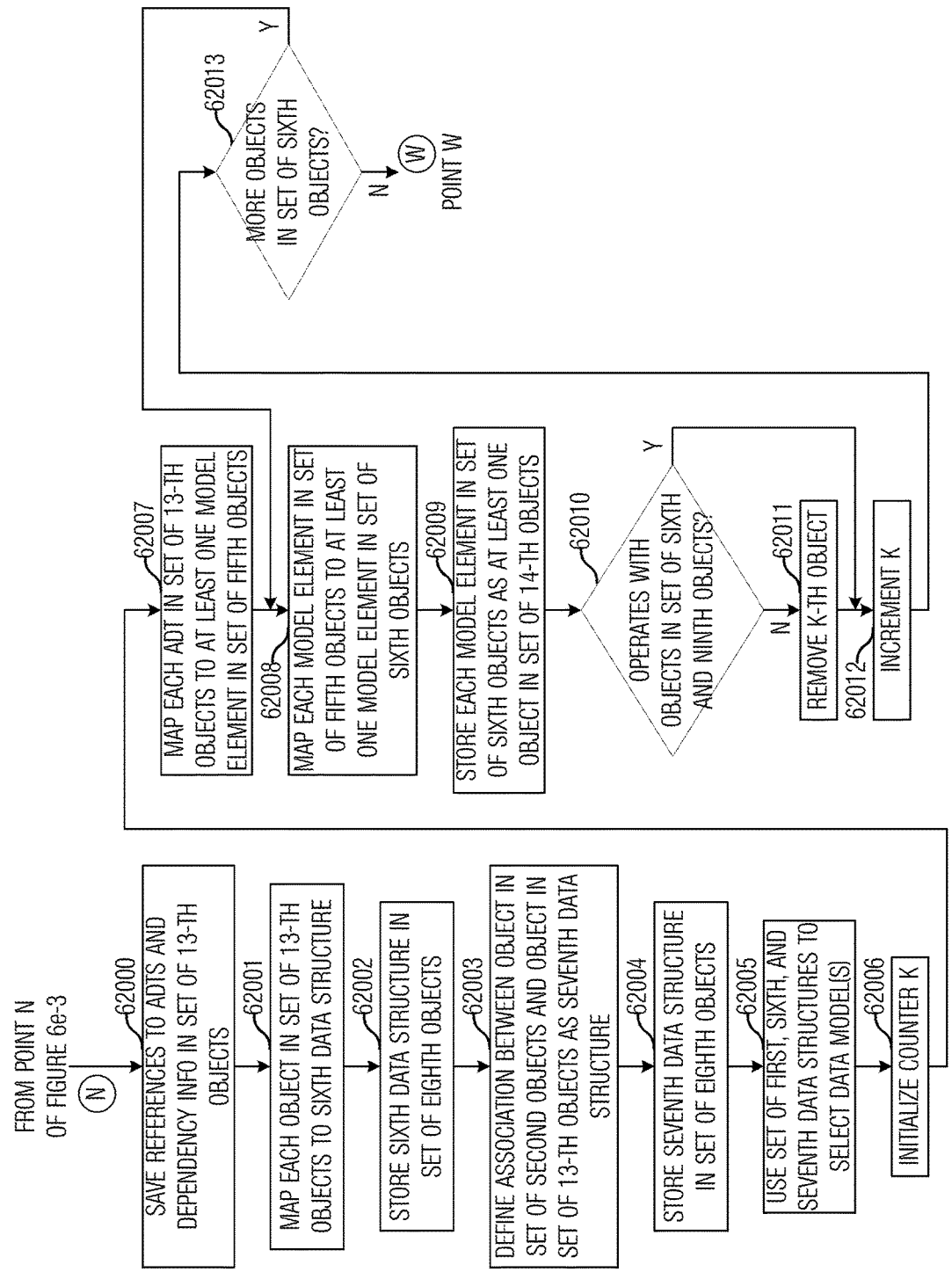
Figures 6, 6E, 7, 8, 9:
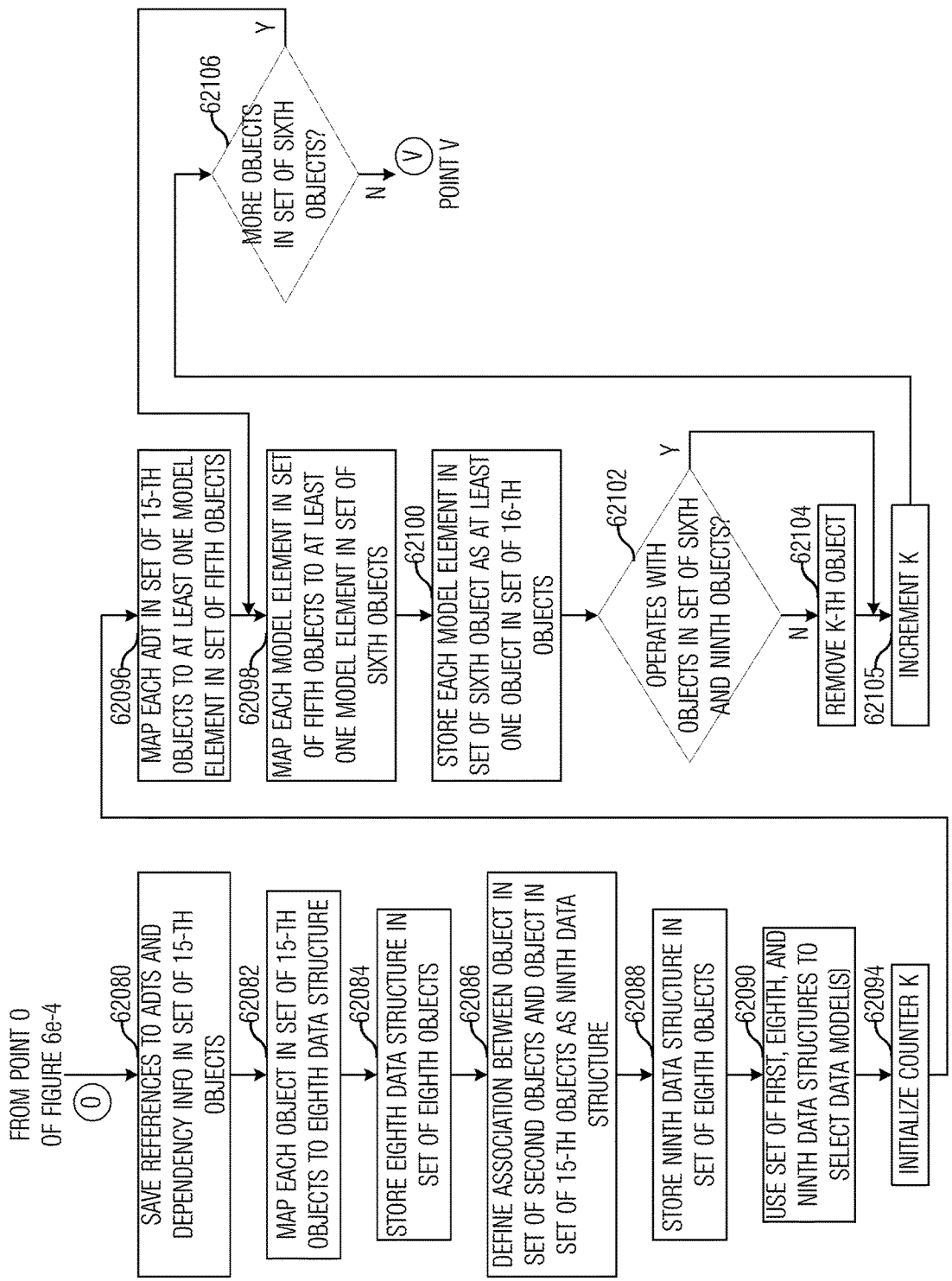
Figures 6, 6E, 7, 8, 9, 10:
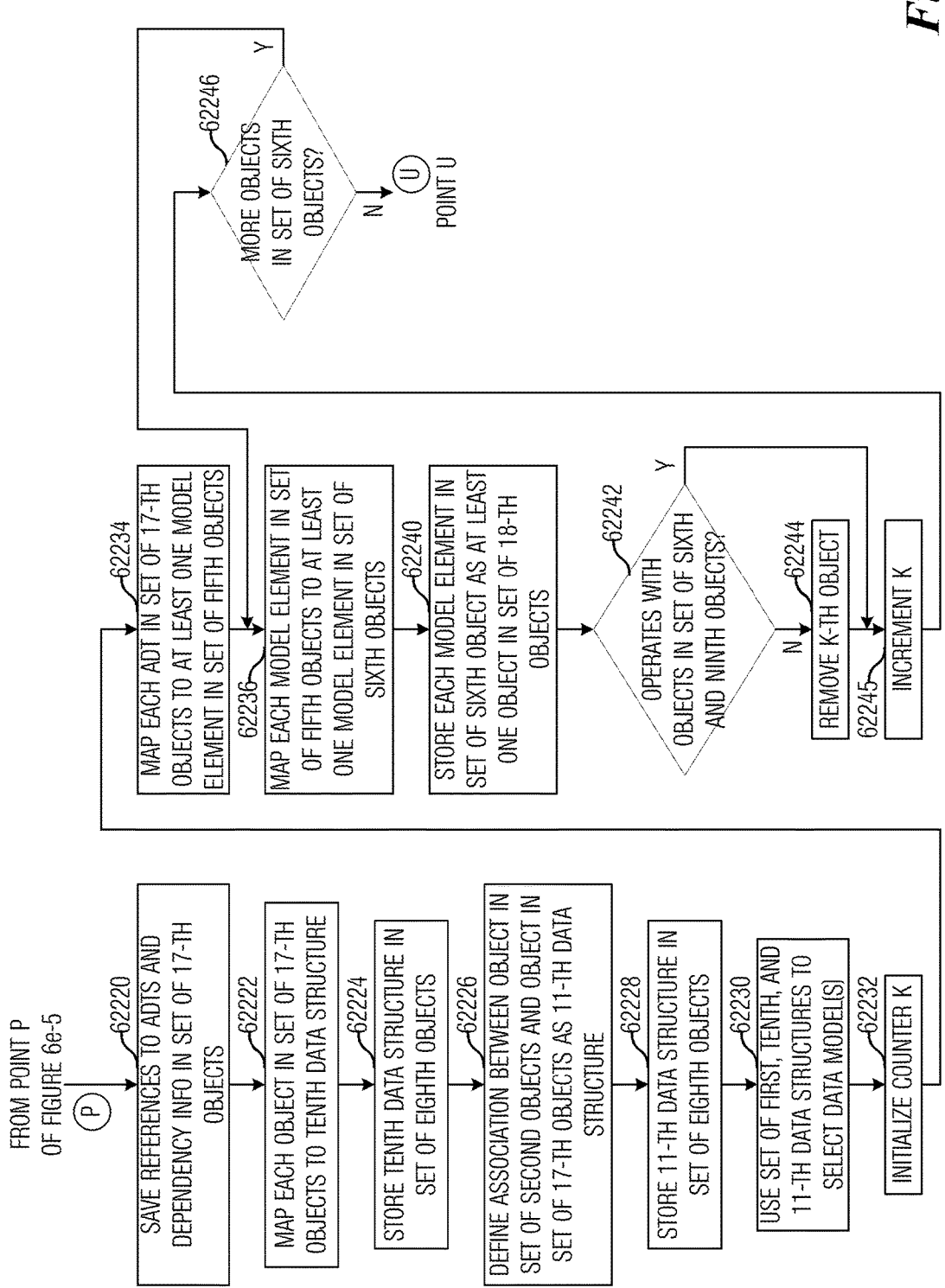
Figure 6F:
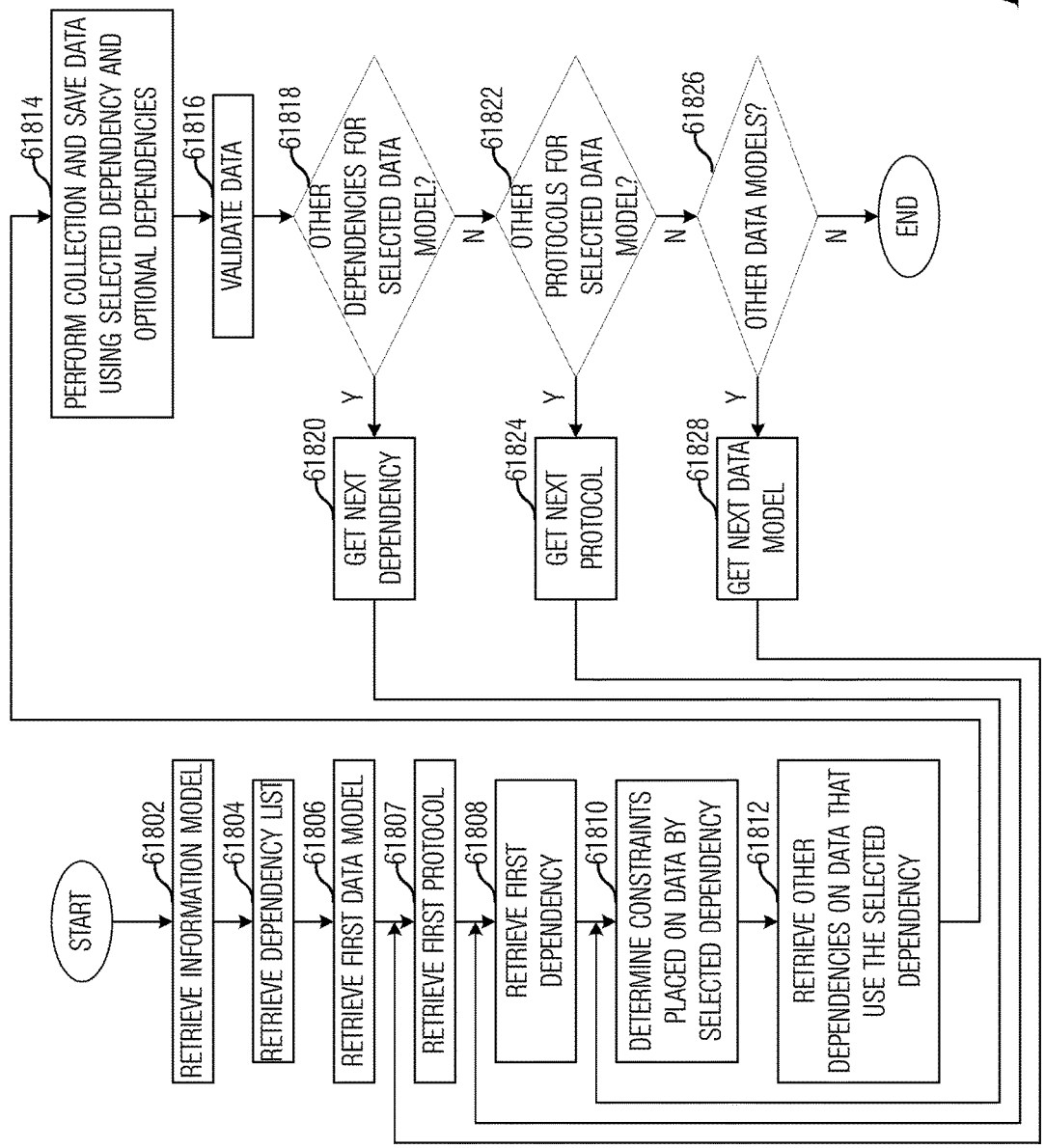
FIG. 6f illustrates an example flow diagram of operations occurring in the collection of data according to example embodiments described herein.
Figure 6G:
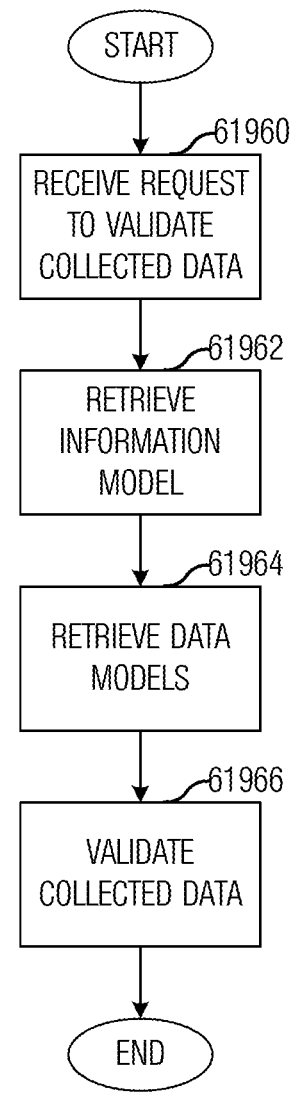
FIG. 6g illustrates an example flow diagram of operations occurring in the validation of data according to example embodiments described herein.
Figure 6I:
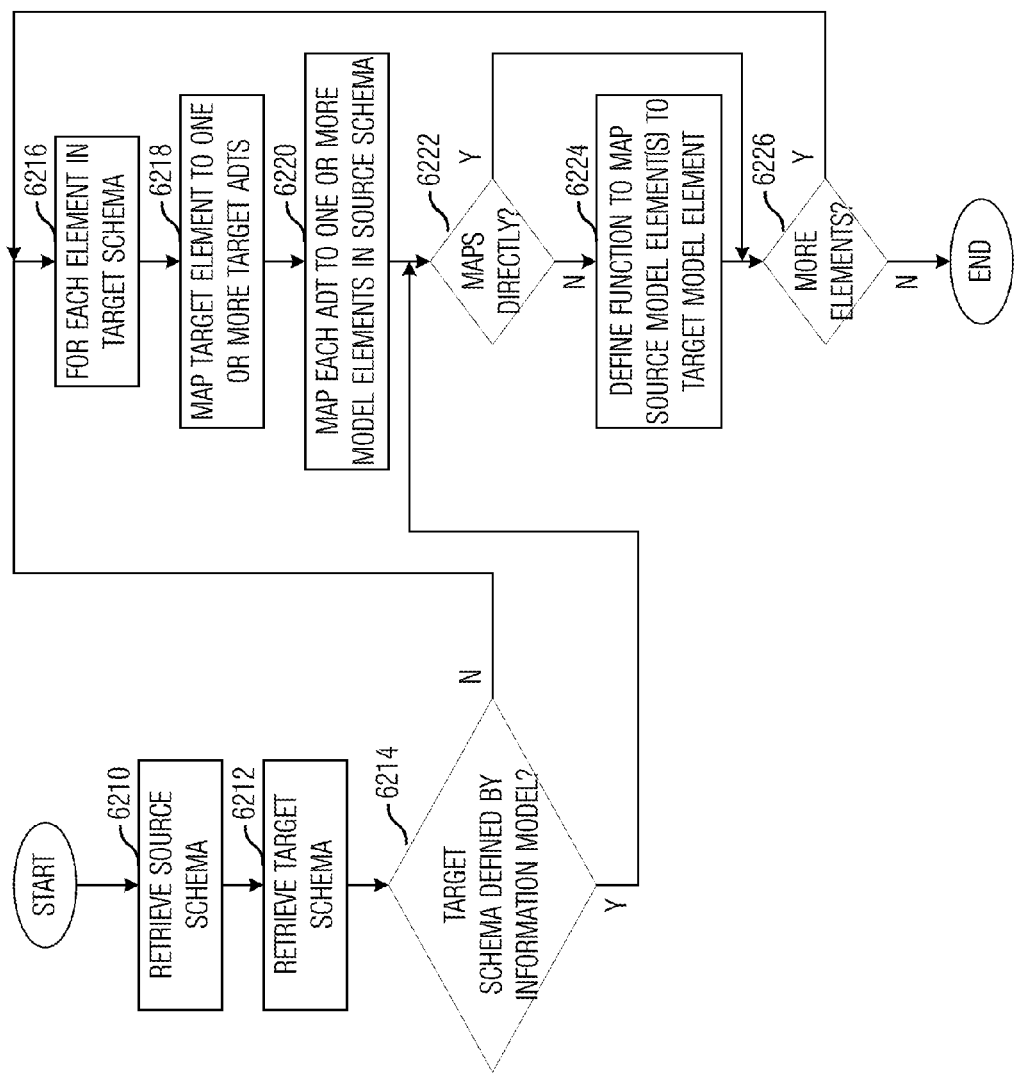
FIG. 6i illustrates an example flow diagram of operations occurring in the determining of a data transformation function according to example embodiments described herein.
Figure 6J:
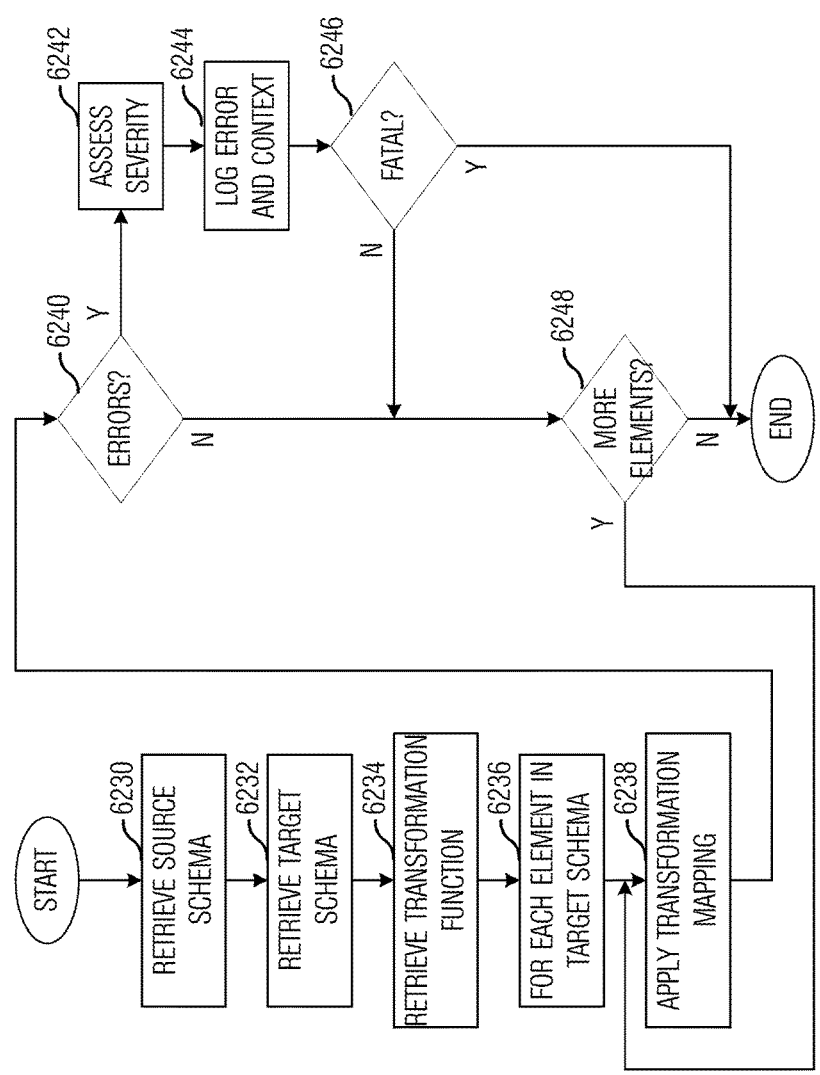
FIG. 6j illustrates an example flow diagram of operations occurring in the transforming of data according to example embodiments described herein.
Figures 1, 6K:
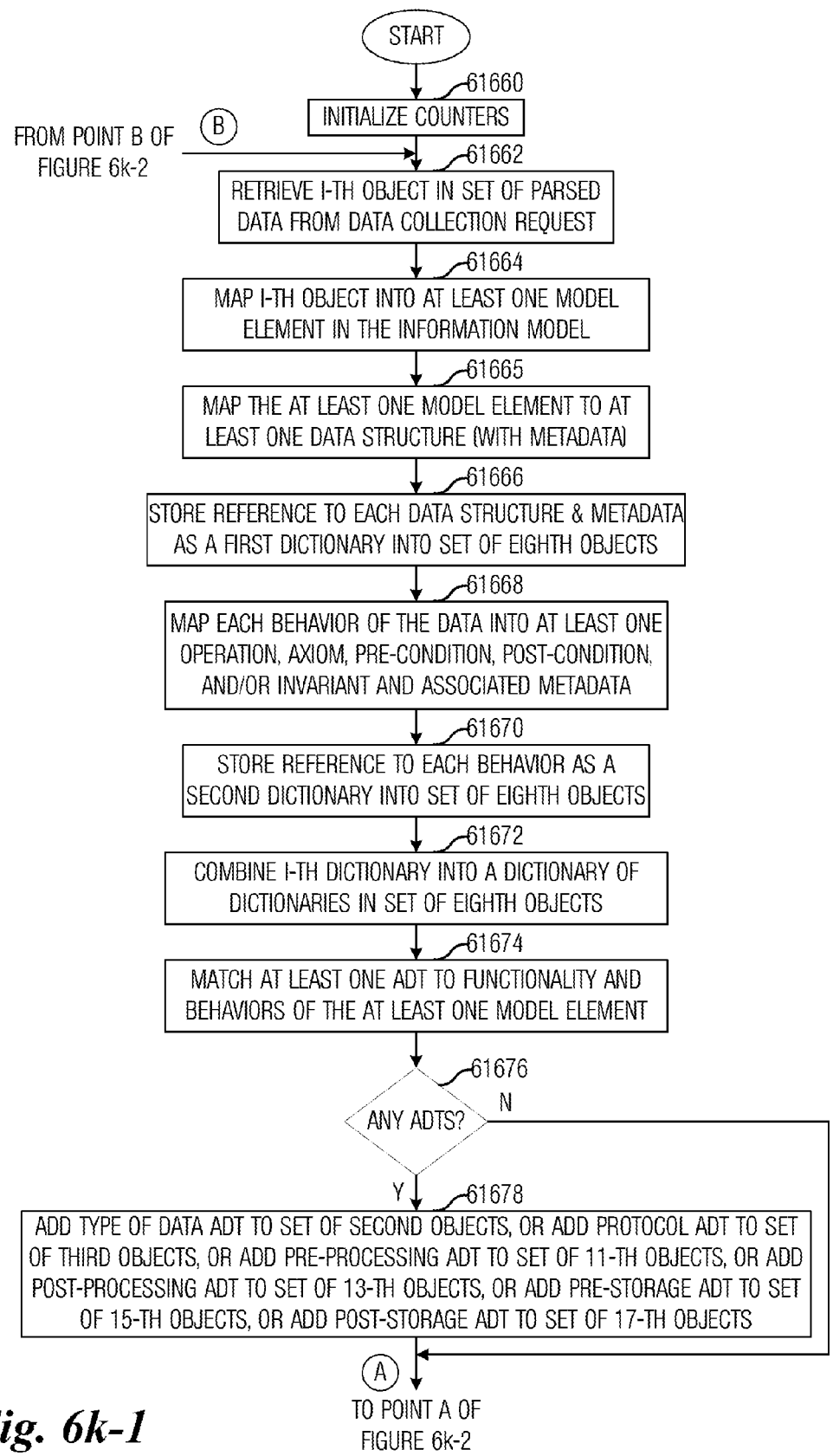
Figures 2, 6K:
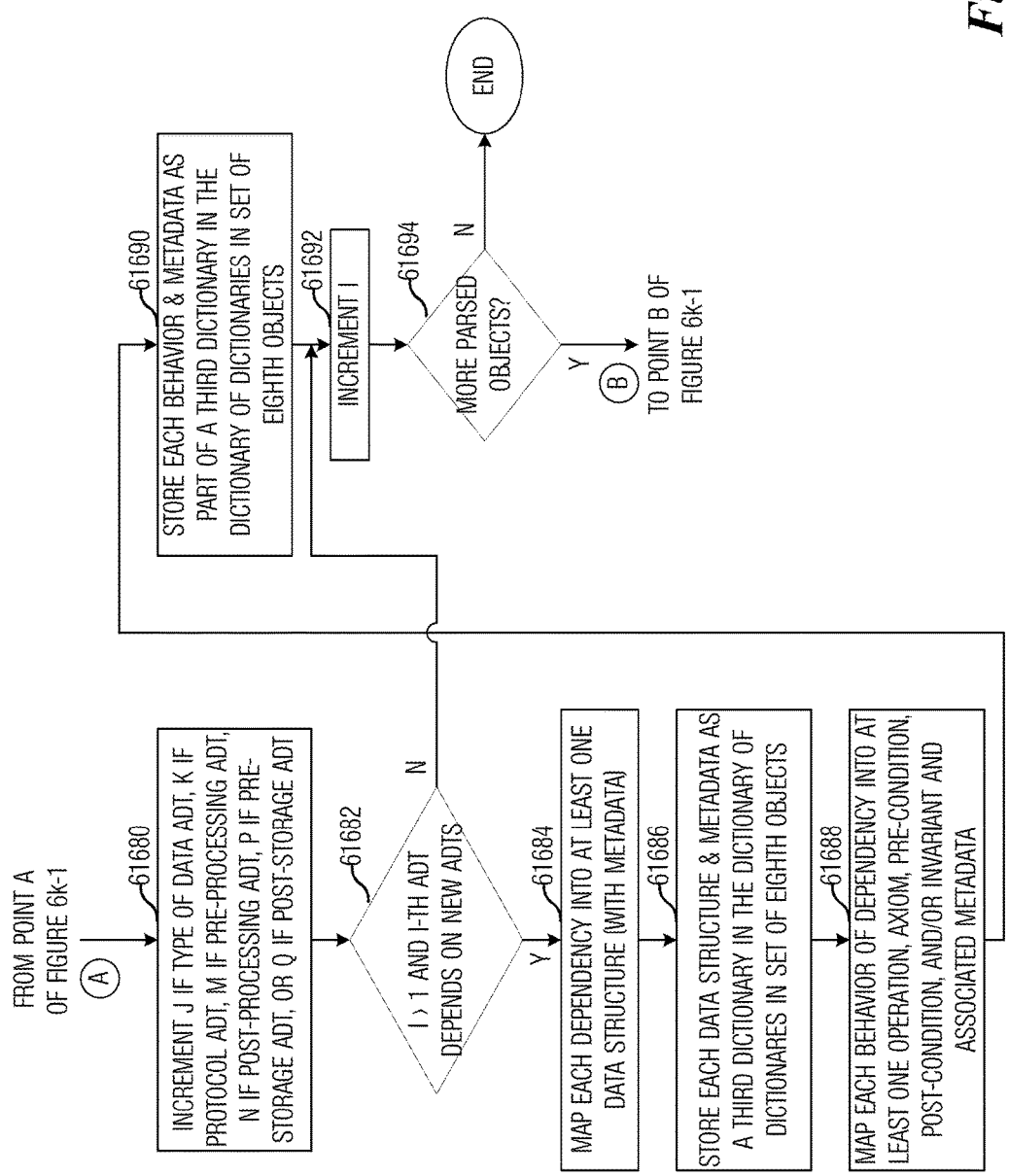
Figures 1, 6M:
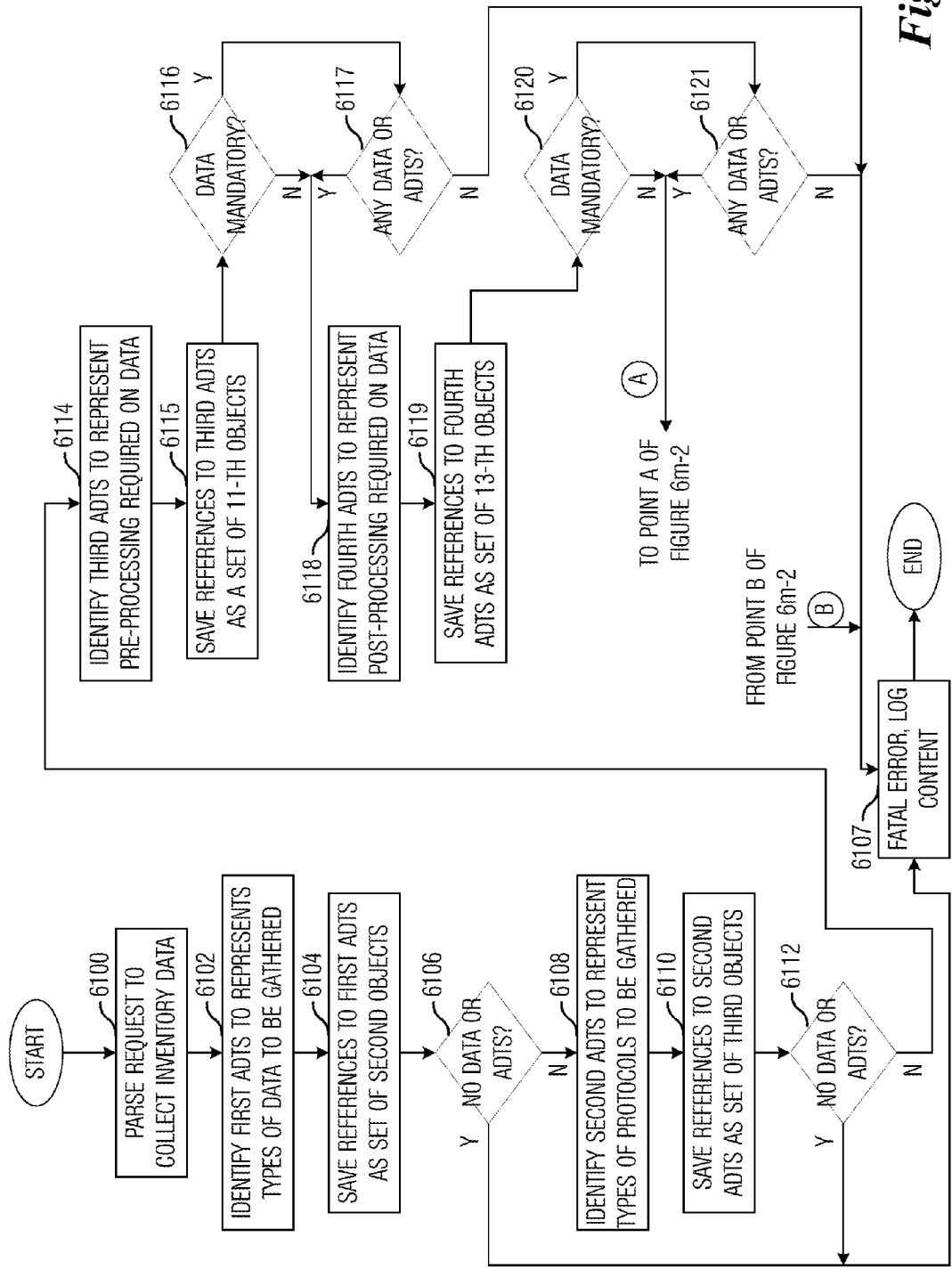
Figures 2, 6M:
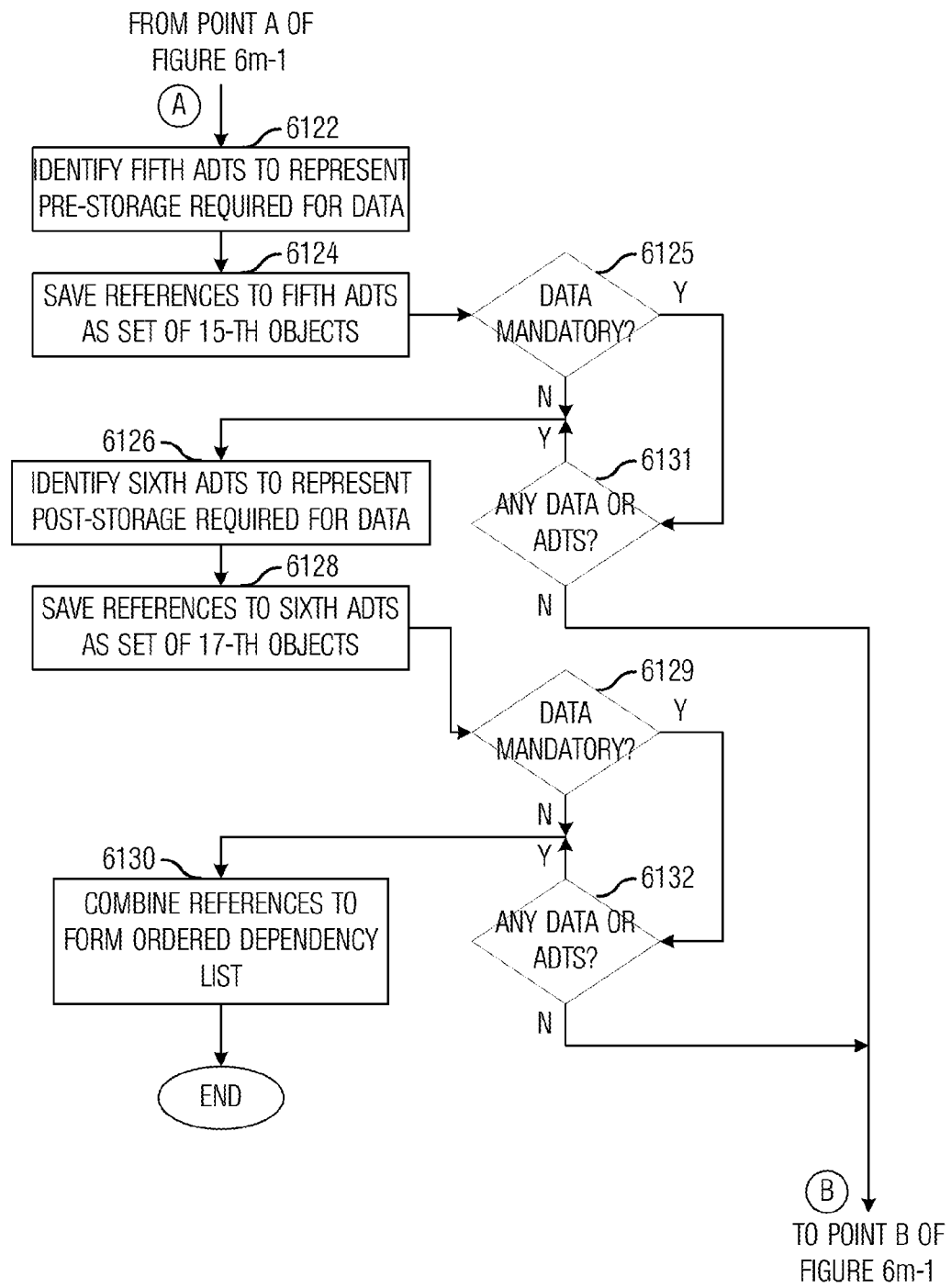

Referencing now to FIG. 6m-1, which illustrates a flow diagram of operations occurring in the beginning of the determining of a dependency list that enumerates the different dependencies between type of data, protocol used to collect the data, pre- and post-processing, and pre- and post-storage, the management entity may parse the request to collect inventory data (block 6100). In general, the parsing of the request produces a set of objects, such as a set of objects generated by a parsing process that uses either an abstract syntax tree or a concrete syntax tree. In an example embodiment, a constituency-based parse tree may be used, where the grammar differentiates between terminal and non-terminal categories. However, it should be noted that any parsing mechanism may be used.

The management entity may examine the objects produced by the parsing operation in block 6100, and subsequently attempt to identify a mechanism for representing types of data that will be gathered for this data collection request (block 6102). An object of the examination may be to understand explicit as well as implicit semantics in the request to collect data, so that dependencies between the type of data, protocol used, pre- and post-processing, and pre- and post-storage functions that make up the data collection process may be defined.

There may be several techniques that may be used to determine the different dependency relationships that may exist in the request to collect data. According to an example embodiment, a set of Abstract Data Types (ADTs) that were used to define the information model is used to help determine the different dependency relationships that may exist as part of the data collection process. Typically, an ADT is a formal model of a set of data structures that have similar characteristics and behavior, with formal meaning having a mathematical model. The presence of the mathematical model enables the ADT to represent building blocks (e.g., a stack, queue, array, graph, and the like) of the model in a technology-independent way. The ADTs may be used to help transform the information model from a technology-neutral to a technology-specific (i.e., a data model) form. The ADTs may also be used to describe algorithms, the different types of data structures that a given implementation requires (e.g., the programming languages used to build the data structures, and the associated data models), and evaluate which algorithms and data structures are optimal for a given application. A generic algorithm is used herein to define ADTs. An example embodiment of this algorithm is shown below.

Referring now to FIGS. 6k-1 and 6k-2, where a flow diagram of operations occurring in the determining of Abstract Data Types are illustrated. The flow diagram illustrates a technique that may be used to determine ADTs for use in creating a dependency list. Operations may begin with the management entity initializing a set of seven counters (i, j, k, m, n, p, or q) (block 61660). As an example, the counters are each initialized to 0. As an illustrative example, counter i is used to keep track of the parsed collection request objects, and counters j-q are used to keep track of the six dependency types, respectively. The management entity may retrieve the i-th object, or set of objects, in the set of parsed objects from the current request to collect data (block 61662). The management entity may map the i-th object, or set of objects, into at least one model element that is defined in the information model (block 61664). As an example, if the i-th object is a simple determiner (e.g., definite and indefinite articles, such as "the"; demonstratives, such as "that"; interrogatives, such as "which"; quantifiers, such as "all"; numerals, such as ten; fractions, such as one half; and possessive determiners, such as my; and so forth), then the management entity knows that it may temporarily store the i-th object and retrieve the next object. This is because the function of a determiner is to add context to the noun or noun phrase that immediately follows the determiner. Hence, such an object must be examined together with the noun or noun phrase that it applies to. As an alternative, if the management entity identifies a noun phrase, then the i-th object may instead be the determiner along with the noun or noun phrase that it applies to.

As yet another example, if the i-th object being examined by the management entity is the noun phrase "all devices", then this may be interpreted as every object that can be instantiated from the device class, as defined in the information model. As yet another example, if the i-th object being examined by the management entity is the noun phrase "all devices whose IP address is 192.168.0.0/16", then this may be satisfied either by all objects that can be instantiated from the device class whose IP attribute is equal to 192.169.0.0/16, and/or all objects that can be instantiated from the device class that aggregate an IPAddress object, where an attribute of the IPAddress object is its address (i.e., 192.168.0.0/16). It is noted that in the two examples above, the number of model elements that are mapped to are 1, 2, and 4, which correspond to a single object, an object with a particular attribute value, and an object, a relationship, or another object with a particular attribute value, respectively. It is also noted that other combinations of model elements are also possible. Since a variety of parser techniques and a variety of different analysis methods may be used, the techniques shown in FIGS. 6k-1, and 6k-2 are intentionally generic and used for illustrative purposes only, and do not limit the scope or the spirit of the example embodiments. Hence, the management entity may retrieve one or more objects from the parsing process (block 61662), and it may map one or more parsed objects to one or more attributes of an information model (block 61664).

The management entity may map the at least one model element from the information model to at least one data structure (block 61665). It is noted that zero or more metadata objects may also be defined as part of the mapping. The mapping performed by the management entity may comprise either the model elements or references to the model elements, and may be realized as any appropriate data structure, such as an array of complex objects. The mapping captures the syntactical restrictions of the type of data being analyzed. The management entity may store a reference to each data structure and metadata into a set of eighth objects (block 61666). According to an example embodiment, a reference to each data structure and metadata is grouped into its own dictionary (a first dictionary). While, in an alternative scenario, other data structures, such as a set or an associative array, may be used instead, as long as the other data structures ensure that each member is unique and associated with a unique key. In this alternative scenario, the key may be the current value of i.

The management entity may capture the semantic restrictions of the type of data being analyzed by mapping each behavior of the parsed request to collect data to at least one operation, axiom, pre-condition, post-condition, and/or invariant (block 61668). Each of these objects may have one or more metadata objects associated with them in order to express context, restrictions, or other factors that influence the semantics. The management entity may store a reference to each data structure and metadata into a set of eighth objects (block 61670). Each reference to each data structure and metadata is grouped into its own second dictionary. Again, the key in this scenario may be the current value of i.

The management entity may combine the two dictionaries (the first dictionary and the second dictionary) into a single dictionary of dictionaries (block 61672). The combination of the two dictionaries enables the features (syntax) and behavior (semantics) of the at least one model element to be described below in as generic a manner as possible, while still enabling efficient access to the features and/or behavior of the at least one model element.

At this point, the management entity may define zero or more ADTs representing the syntactical and semantic requirements from blocks 61665 and 61668, respectively (block 61674). The zero or more ADTs are defined by matching the syntactical and semantic requirements from blocks 61665 and 61668 to a list of ADTs that were used to construct the information model. The management entity may test to see if any ADTs were found (block 61676). If one or more ADTs were found, then the management entity may add each newly found ADT to the appropriate set of objects (second, third, eleventh, thirteenth, fifteenth, or seventeenth, respectively) (block 61678). Discussion of the technique continues with FIG. 6k-2. Furthermore, if no ADTs were found in block 61676, then the management entity may also continue to FIG. 6k-2.

The management entity may increment an appropriate counter (i.e., j, k, m, n, p, or q) depending on the type of ADT that was identified (type of data, protocol, pre-processing, post-processing, pre-storage, or post-storage, respectively) (block 61680). The management entity may test to determine if there are any dependencies between the newly defined ADT and any existing ADTs (block 61682). The mapping may make use of types of constraints, including a hyponym, a hypernym, a holonym, a meronym, a behavioral subtype, a behavioral supertype, a subtype, a supertype, or a combination thereof. If there are not any dependencies between the newly defined ADT and any existing ADTs, then the management entity proceeds to block 61692 to increment the counter. If there are dependencies between the newly defined ADT and any existing ADTs, then the management entity may maps the functional requirements of each dependency found between the newly defined ADT and each existing ADT into its own new data structure (block 61684). The mapping may optionally be enhanced with metadata. It is noted that multiple dependencies may exist between the same objects. In such a situation, each dependency is mapped into its own separate data structure.

The management entity may store the mapping as a third data dictionary, and attaches the third data dictionary to the dictionary of dictionaries (block 61686). The management entity may map the behavioral (semantic) requirements of each dependency into its own separate data structure (block 61688). The management entity may store the mapping as part of each corresponding third data dictionary (i.e., the third data dictionary that had functional dependencies between the two ADTs being compared) if applicable, and attaches the third data dictionary to the existing dictionary of dictionaries (block 61690).

The management entity may increment counter i (block 61692), and then the management entity may check to determine if any additional parsed objects remain (block 61694). If there are remaining parsed objects, then the management entity returns to block 61662. Otherwise, these operations terminate, and returns control to block 6104 of FIG. 6m-1.

Referencing back to FIG. 6m-1, the result of block 6102 (e.g., blocks 61660-61694 of FIGS. 6k-1 and 6k-2) comprises at least one of a set of first ADTs to represent the types of data that are to be used during the data collection process. The parsed output may help identify additional semantics that may be embedded in the request to collect data. In general, the ADTs identify a set of characteristics and behavior required of the data to be collected in a technology-neutral manner. Therefore, the same ADTs may be used to define the different objects required for completing the request to collect data in a technology-neutral manner. It also enables the same ADTs to be used for different types of data produced by different applications and which exist in different scenarios, since ADTs are used to guide the implementation via mapping from an information model to a data model.

As an example, a user may have requested that "all devices that interact with Carrier X" should have their inventory data updated. An information model processing unit of a management entity can locate an abstract class called "Device" in the information model, but may not know which instantiated objects of that abstract class that are defined in its data models to use without parsing the request and realizing that the devices should have a relationship with Carrier X. The relationship is defined in the request generically, so the relationship could include ownership, the ability to transport traffic, the ability to backup data for Carrier X, and other roles. Similarly, the information model processing unit of the management entity may not know what Carrier X is or means, since the information model is a generic model and does not define specific vendors. However, by parsing the request, it may be able to determine that for this request, Carrier X is the name of a service provider. Hence, it will be able to assign a subclass of the ServiceProvider class, which is used to represent different types of carriers and providers, to this role, by using the model elements defined in that subclass. The assignment of the subclass includes inherited attributes, constraints, and relationships as well as attributes, constraints, and relationships that are defined for that particular subclass. Similarly, the information model processing unit of the management entity may not know how to detect dependencies between types of data, protocols, pre- and post-processing, and pre- and post-storage without examining either instantiated objects or their more abstract equivalent, such as ADTs. Finally, the information model processing unit of the management entity may not know how to create a data model with appropriate object instances to represent the request to collect information. FIG. 6m-1 explains how the dependency list is generated. The example will be used throughout the remaining discussion to show how the information processing units and data processing units and other units operate.

The management entity may use the ADTs to help map the request to collect data to different types of objects and data structures that are used by the data being requested (block 6102). The mapping may enable the management entity to be able to better identify the types of data that should be present when the data is collected. The management entity may save references to the set of first ADTs as a set of second objects (block 6104). The result of blocks 6102 and 6104 are then checked by the management entity in block 6106. If no data was parsed, or if no ADTs were found, then the content is logged for further processing, and the technique terminates in a fatal error (block 6107). In contrast, if data was parsed, and if at least one ADT was found, then the management entity proceeds to block 6108.

Similar to blocks 6102 and 6104, the management entity performs a similar set of operations in blocks 6108 and 6110, but for protocol dependencies instead of data dependencies. The management entity may examine the objects produced by the parsing operation in block 6100 to help determine the different dependency relationships that may exist that involve a protocol and other elements that are part of the data collection process (block 6108). It is noted that the presence of at least one protocol is mandatory, since a protocol is required to collect data. As an example, specific types of data may require a particular protocol to be used to transmit and receive the data without error. As another example, a particular datum may have one representation in data model 1 that requires protocol X, but a different representation in data model 2 that requires protocol Y. In this approach, the same ADT can be used in both cases to detect dependencies.

The management entity may examine the parsed output of the request to collect data, and maps that output to at least one of a set of second ADTs to represent the types of data that are to be used during the data collection process (block 6108). The parsed output may help to identify additional semantics that may be embedded in the request to collect data. The ADTs identify a set of characteristics and behavior required of a protocol in a technology-neutral manner. The result of blocks 6108 and 6110 are then checked by the management entity in block 6112. If no data was parsed, or if no ADTs were found, then the content is logged for further processing, and the technique terminates in a fatal error (block 6107). In contrast, if data was parsed, and if at least one ADT was found, then management entity proceeds to block 6114.

Similar to blocks 6102 and 6104, the management entity performs a similar set of operations in blocks 6114 and 6115, but for pre-processing dependencies instead of data dependencies. The management entity may examine the objects produced by the parsing operation in block 6100 to help determine the different dependency relationships that may exist that involve a pre-processing operation and other elements that are part of the data collection process (block 6114). The management entity may examine the parsed output of the request to collect data, and maps that output to at least one of a set of third ADTs to represent the pre-processing operations that are to be used during the data collection process, as a set of eleventh objects (block 6115). The parsed output may help to identify additional semantics that may be embedded in the request to collect data. The ADTs may identify a set of characteristics and behavior required of a set of pre-processing operations in a technology-neutral manner. It is noted that blocks 6114 and 6115 may be optional, since a pre-processing operation is not always mandatory.

The management entity may continue to block 6116, where it determines whether a pre-processing operation is mandatory based on parsing the request to collect data. If the request is not mandatory, the management entity proceeds to block 6118. If a pre-processing operation is mandatory, then management entity proceeds to block 6117, where the management entity tests to determine if any data as well as any ADTs were found. If either data and/or ADTs were not found, the management entity continues to block 6107, where the context is logged and the technique exits with a fatal error. In contrast, if both data and ADTs were found, the management entity proceeds to block 6118. As an example, specific types of data may require a particular set of pre-processing operations to be used as the data is being collected in order to reduce the amount of data that has to be analyzed as part of the data collection process.

Similar to blocks 6102 and 6104, the management entity performs a similar set of operations in blocks 6118 and 6119, but for post-processing dependencies instead of data dependencies. The management entity may examine the objects produced by the parsing operation in block 6100 to help determine the different dependency relationships that may exist that involve a post-processing operation and other elements that are part of the data collection process (block 6118). The management entity may examine the parsed output of the request to collect data, and maps that output to at least one of a set of fourth ADTs to represent the post-processing operations that are to be used during the data collection process, as a set of thirteenth objects (block 6119). The parsed output may help to identify additional semantics that may be embedded in the request to collect data. The ADTs may identify a set of characteristics and behavior required of a set of post-processing operations in a technology-neutral manner. It is noted that blocks 6118 and 6119 may be optional, since a post-processing operation is not always mandatory.

The management entity may continue to block 6120, where it determines whether a post-processing operation is mandatory based on parsing the request to collect data. If the request is not mandatory, the management entity proceeds to block 6122 (point A) of FIG. 6m-2. If a post-processing operation is mandatory, the management entity proceeds to block 6121, where it tests to determine if any data as well as any ADTs were found. If either data and/or ADTs were not found, the management entity continues to block 6107, where the context is logged and the technique exits with a fatal error. In contrast, if both data and ADTs were found, the management entity proceeds to block 6122 (point A) in FIG. 6m-2. As an example, specific types of data may require a particular set of post-processing operations to be used after all of the data has been collected in order to find trends and patterns among all of the data.

Referring now to FIG. 6m-2, similar to blocks 6102 and 6104, the management entity performs a similar set of operations in blocks 6122 and 6124, but for pre-storage dependencies instead of data dependencies. The management entity may examine the objects produced by the parsing operation in block 6100 to help determine the different dependency relationships that may exist that involve a pre-storage operation and other elements that are part of the data collection process (block 6122). The management entity may examine the parsed output of the request to collect data, and maps that output to at least one of a set of fifth ADTs to represent the pre-storage operations that are to be used during the data collection process, as a set of fifteenth objects (block 6214). The parsed output may help identify additional semantics that may be embedded in the request to collect data. The ADTs may identify a set of characteristics and behavior required of a set of pre-storage operations in a technology-neutral manner. It is noted that blocks 6122 and 6124 may be optional, since a pre-storage operation is not always mandatory.

The management entity may continue to block 6125, where it determines whether a pre-storage operation is mandatory based on parsing the request to collect data. If the request is not mandatory, the management entity proceeds to block 6126. If a pre-storage operation is mandatory, the management entity proceeds to block 6131, where it tests to determine if any data as well as any ADTs were found. If either data and/or ADTs were not found, the management entity continues to block 6107 (point B) on FIG. 6m-1, where the context is logged and the technique exits with a fatal error. In contrast, if both data and ADTs were found, the management entity proceeds to block 6126. As an example, specific types of pre-processing operations may require temporary storage (i.e., pre-storage operations) to be used as the data is being collected in order to execute correctly.

Similar to blocks 6102 and 6104, the management entity performs a similar set of operations in blocks 6126 and 6128, but for post-storage dependencies instead of data dependencies. The management entity may examine the objects produced by the parsing operation in block 6100 to help determine the different dependency relationships that may exist that involve a post-storage operation and other elements that are part of the data collection process (block 6126). The management entity may examine the parsed output of the request to collect data, and maps that output to at least one of a set of sixth ADTs to represent the post-storage operations that are to be used during the data collection process, as a set of seventeenth objects (block 6128). The parsed output may help identify additional semantics that may be embedded in the request to collect data. The ADTs may identify a set of characteristics and behavior required of a set of post-storage operations in a technology-neutral manner. It is noted that blocks 6126 and 6128 may be optional, since a post-storage operation is not always mandatory.

The management entity may continue to block 6129, where it determines whether a post-storage operation is mandatory based on parsing the request to collect data. If the request is not mandatory, the management entity proceeds to block 6130. If a post-storage operation is mandatory, the management entity proceeds to block 6132, where it tests to determine if any data as well as any ADTs were found. If either data and/or ADTs were not found, the management entity continues to block 6107 (point B) on FIG. 6m-1, where the context is logged and the technique exits with a fatal error. In contrast, if both data and ADTs were found, the management entity proceeds to block 6130. As an example, specific types of data may require a particular set of post-storage operations to be used after the data has been collected, either as part of an archiving process or for other operations required as part of the data collection analysis process.

FIG. 6b-2 illustrates a dependency tuple. The dependency tuple may be an example of the output of parsing the request to form the dependency list (block 610, FIG. 6b-1). According to an example embodiment, a tuple defines dependencies between the data requested, the protocols to be used, the operations to be used to pre-process and/or post-process the data, and storage of the data before or after it is sent. A first line (i.e., the first group of four statements) represents the dependencies between the type of data to be collected and the protocol(s) to be used. Since the dependencies are from the type of data to the set of protocols, the subscripting shows just the protocols. Furthermore, only the first protocol is mandatory, since it is required to use a protocol to retrieve data of any type. The rest of the first line is optional, and can be simplified as:

$$\{ \{ D_{proto1} [, D_{proto2}, \ldots D_{protoA} ]$$
$$[ \text{ optional pre-processing } ]$$
$$[ \text{ optional post-processing } ]$$
$$[ \text{ optional pre-storage } ]$$
$$[ \text{ optional post-storage} ] \}, \ldots$$

The second set of four statements is similar, defining the protocol dependencies, first for data, then for pre-processing, post-processing, pre-storage, and then post-storage. Similarly, lines 3 through 6 do the same for pre-processing, then post-processing, then pre-storage, then post-storage. It is noted that the notation [ . . . ] indicates that text within the brackets is optional.

The second line defines the dependencies between the protocol(s) used and the type(s) of data being collected, the pre-processing method(s) used, the post-processing method(s) used, and any associated storage requirements. The difference between this line and the first line is that the first line describes the dependency from the point of view of the data, whereas this line describes the dependency from the point of view of the protocol. This is an asymmetric relationship; hence, each dependency may be different.

The third line defines the dependencies between the pre-processing method(s) used and the type(s) of data being collected, the protocol(s) being used by each method, the post-processing method(s) used, and any associated storage requirements. It is noted that the dependencies are optional.

The fourth line defines the dependencies between the post-processing method(s) used and the type(s) of data being collected, the protocol(s) being used by each method, the pre-processing method(s) used, and any associated storage requirement. It is noted that the dependencies are optional.

The fifth line defines the dependencies between the "pre-storage" method(s) used and the type(s) of data being collected, the protocol(s) being used by each method, the pre- and post-processing method(s) used, and any associated post-storage requirement. Here, the term "pre-storage" means that temporary storage is required during the data collection process. It is noted that the dependencies are optional.

The sixth line defines the dependencies between the "post-storage" method(s) used and the type(s) of data being collected, the protocol(s) being used by each method, the pre- and post-processing method(s) used, and any associated pre-storage requirement. Here, the term "post-storage" means that temporary and/or permanent storage is required after the data collection processing operation has finished. It is noted that the dependencies are optional.

Referencing back now to FIG. 6b-1, the output of block 610 is a dependency tuple that represents the dependency list, such as that described in FIG. 6b-2. Once the dependency list is formed, the management entity may perform a check to determine if human intervention is required (block 612). The check may also allow for linking to additional processes and features not presently discussed. If human intervention is required human intervention may be obtained (block 613). It is noted that it is possible that, after human intervention is performed, the data collection process may continue at one of the entry points described in FIG. 6b-1, FIGS. 6c-1 and 6c-2, FIGS. 6e-1 through 6g, FIGS. 6k-1 through 6m-2, and FIGS. 7a-1 through 7b.

If human intervention is not required (block 612), the management entity may retrieve an information model for the communications system being inventoried (block 614). As an example, the information model may be stored in a memory local to the management entity or a memory remote to the management entity, and the management entity may retrieve a subset of the information model from the memory. As another example, the information model may be retrieved from an entity coupled to the management entity.

The management entity may make use of the information model retrieved in block 614 to determine specific data model(s) required to collect the data requested in block 616. A detailed discussion of an embodiment is explained using FIGS. 6e-1 to 6e-10, provided below.

Referencing now to block 6162 of FIG. 6e-1, where a new list for containing data models that are required to collect data for this collection request is initialized. The management entity may retrieve the first type of data to be collected from the dependency list (block 6163), and retrieve the corresponding set of first ADTs for the first type of data (block 6164). It is noted that the retrieval of the corresponding set of first ADTs was discussed previously in reference to blocks 6166-61694 of FIGS. 6k-1 and 6k-2. The management entity may look for a first protocol to use with the first type of data (block 6165), and retrieve the at least one protocol ADT (block 6166). The management entity may compare the first type of data ADT with each of the at least one protocol ADTs (block 6167). If no dependencies between the type of data and protocol ADTs are found (block 6168), the management entity continues to block 6170. Otherwise, the management entity proceeds to block 6169, where it saves references to ADTs and dependency information describing each dependency in a set of eighth objects (block 6169).

The management entity may map each first ADT from block 6164 to one or more model elements from the information model, and then stores these model elements as a set of fifth objects (block 6170). The management entity may update the set of fifth objects with any appropriate metadata (block 6171). The management entity may map and store each model element in the set of fifth objects to at least one model element of a selected data model in a set of sixth objects, where the data model being used has been derived from the information model (block 6172). The management entity may store each model element from the selected data model as a new object in a set of seventh objects (block 6173). This may be done by a variety of methods. One simple embodiment is by instantiating the model element from the set of sixth objects to produce an object instance, which is then stored as an object in the set of seventh objects. The management entity continues to block 6174 of FIG. 6e-2, where it determines one or more data models from the set of seventh objects. The management entity may add the new data model to the list of data models if it is not already in the list (block 6175).

The management entity may map the protocol ADT to at least one model element and associated metadata from the information model (blocks 6176 and 6177), and map and store the at least one model element of the information model to at least one model element of a data model that has been derived from the information model in set of sixth objects (block 6178). The management entity may store the set of sixth objects as a new set of ninth objects (block 6179), which may be used to determine if a new data model is required to meet the requirements of the current ADT in block 6180. The management entity may add the selected model to the list of data models if required (block 6181).

The management entity may retrieve the first pre-processing algorithm and its corresponding set of ADTs (blocks 6182 and 6183). The management entity may compare the first ADT (type of data) with each of the third ADTs (pre-processing) (block 6184). Referring now to block 6185 of FIG. 6e-3, where the management entity checks to see if any dependencies have been detected between the first (type of data) and third (pre-processing) ADTs. If no dependencies were detected, the management entity continues to block 6187. If one or more dependencies were detected, the management entity continues to block 6186 and point M of FIG. 6e-7.

Referring now to block 61850 of FIG. 6e-7, the management entity may save references to each ADT and the dependency information in a set of eleventh objects. The management entity may map each object in the set of eleventh objects to a fourth data structure (block 61852), and store the fourth data structure into the set of eighth objects (block 61854). The management entity may define an association between an object in the set of second objects (i.e., ADTs for types of data) and the object in the set of eleventh objects (e.g., pre-processing ADTs) as a fifth data structure (block 61856), which is then stored in the set of eighth objects (block 61858). The management entity may use the set of first, fourth, and fifth data structures to select one or more data models that can be used to meet the requirements of each data structure (block 61860).

The management entity may initialize a counter k to a value, such as one (block 61861). The management entity may map each pre-processing ADT (in the set of eleventh objects) into at least one or more model elements in the information model (the set of fifth objects) (block 61862), and map each model element in the information model into at least one model element in a selected data model (the set of sixth objects) (block 61866). The newly created set of data model elements are then mapped into a new set of twelfth objects (block 61870). The management entity may ensure that the pre-processing objects can operate with the data and protocol objects already defined (the set of sixth and ninth objects, respectively) (block 61872). If the pre-processing objects cannot operate with the data and protocol objects already defined, the k-th object is removed (block 61874), and the management entity increments counter k (block 61875). If the pre-processing objects can operate with the data and protocol objects already defined, the management entity increments counter k (block 61875). The management entity may check to determine if there are additional types of pre-processing objects (block 61876). If there are additional pre-processing types, the management entity returns to block 61866. If there are not any additional pre-processing types, the management entity returns to block 6186 of FIG. 6e-3.

Referencing now to block 6187 of FIG. 6e-3, the management entity may map each pre-processing ADT to one or more model elements of the information model (block 6187), and update any metadata associated with that mapping (block 6188). The management entity may map and store each model element of the information model to at least one model element of a selected data model (block 6189), and store each model element in the set of sixth objects as a new object in a set of eleventh objects (block 6190). The management entity may determine one or more data models that are required to accommodate the needs of the pre-processing ADTs (block 6191), and add any data models to the list of data models if they are not already in the list (block 6192).

If post-processing ADTs are present, the management entity may retrieve the first post-processing algorithm and its corresponding set of ADTs (blocks 6193 and 6194). The management entity may compare the first ADT (type of data) with each of the fourth ADTs (post-processing) (block 6195). The management entity may check to determine if any dependencies have been detected between the first (type of data) and fourth (post-processing) ADTs (block 6196). If no dependencies were detected, then execution continues to block 6198 of FIG. 6e-4. If one or more dependencies were detected, the management entity continues to point N (block 6197) of FIG. 6e-8.

Referring now to block 62000 of FIG. 6e-8, the management entity may save references to each ADT and the dependency information in a set of thirteenth objects. The management entity may map each object in the set of thirteenth objects to a sixth data structure (block 62001), and store the sixth data structure into the set of eighth objects (block 62002). The management entity may define an association between an object in the set of second objects (i.e., ADTs for types of data) and the object in the set of thirteenth objects (e.g., post-processing ADTs) as a seventh data structure (block 62003), which may then be stored in the set of eighth objects (block 62004). The management entity may use the set of first, sixth, and seventh data structures to select one or more data models that can be used to meet the requirements of each data structure (block 62005).

The management entity may initialize counter k to a value, such as one (block 62006). The management entity may map each post-processing ADT (in the set of thirteenth objects) into at least one or more model elements in the information model (block 62007), and map each model element in the information model into at least one model element in a selected data model (block 62008). The newly created set of data model elements may then be mapped into a new set of fourteenth objects (block 62009). The management entity may check to ensure that the post-processing objects can operate with the data and protocol objects already defined (the set of sixth and ninth objects, respectively) (block 62010). If they cannot, then the k-th object is removed (block 62011), and the management entity increments counter k (block 62012). If they can, the management entity proceeds directly to block 62012. The management entity may check to determine if there are additional post-processing objects (block 62013). If there are additional post-processing objects, the management entity returns to block 62008. Otherwise, the management entity returns to block 6198 (point W) of FIG. 6e-3, which returns to point G (block 6198) of FIG. 6e-4.

Referencing back to block 6198 of FIG. 6e-4, the management entity may map each post-processing ADT to one or more model elements of the information model (block 6198), and update any metadata associated with that mapping (block 6199). The management entity may map and store each model element of the information model to at least one model element of a selected data model (block 6200). The management entity may store each model element in the set of sixth objects as a new object in a set of thirteenth objects (block 6201). The management entity may determine one or more data models that are required to accommodate the needs of the post-processing ADTs (block 6202), and add any data models to the list of data models if they are not already in the list (block 6203).

If pre-storage ADTs are present, the management entity may retrieve the first pre-storage algorithm and its corresponding set of ADTs (blocks 6204 and 6205). The management entity may compare the first ADT (type of data) with each of the fifth ADTs (pre-storage) (block 6206). The management entity may check to see if any dependencies have been detected between the first (type of data) and fifth (pre-storage) ADTs (block 6207). If no dependencies were detected, the management entity continues to block 6209. If one or more dependencies were detected, then execution continues to block 6208 and point O of FIG. 6e-9.

Referring now to block 62080 of FIG. 6e-9, the management entity may save references to each ADT and the dependency information in a set of fifteenth objects. The management entity may map each object in the set of fifteenth objects to an eighth data structure (block 62082), and store the eighth data structure into the set of eighth objects (block 62084). The management entity may define an association between an object in the set of second objects (i.e., ADTs for types of data) and the object in the set of fifteenth objects (e.g., pre-storage ADTs) as a ninth data structure (block 62086), which is then stored in the set of eighth objects (block 62088). The management entity may use the set of first, eighth, and ninth data structures to select one or more data models that can be used to meet the requirements of each data structure (block 62090).

The management entity may initialize counter k to a value, such as one (block 62094). The management entity may map each pre-storage ADT (in the set of fifteenth objects) into at least one or more model elements in the information model (block 62096), and map each model element in the information model into at least one model element in a selected data model (block 62098). The newly created set of data model elements may then be mapped into a new set of sixteenth objects (block 62100). The management entity may ensure that the pre-processing objects can operate with the data and protocol objects already defined (the set of sixth and ninth objects, respectively) (block 62102). If they cannot, then the k-th object is removed (block 62104), and the management entity increments counter k (block 62105). Otherwise, the management entity proceeds directly to block 62105. Finally, the management entity may check to determine if there are additional pre-storage objects (block 62106). If there are additional pre-storage objects, the management entity returns to block 62098. Otherwise, the management entity returns to block 6209 of FIG. 6e-4.

Referring now to block 6209 of FIG. 6e-4, the management entity may map each pre-storage ADT to one or more model elements of the information model (block 6209).

Referring now to FIG. 6e-5, the management entity may update any metadata associated with that mapping (block 6250). The management entity may map and store each model element of the information model to at least one model element of a selected data model (block 6251). The management entity may store each model element in the set of sixth objects as an object in a new set of fifteenth objects (block 6252). The management entity may determine one or more data models that are required to accommodate the needs of the pre-storage ADTs (block 6253), and add any data models to the list of data models if they are not already in the list (block 6254).

If post-storage ADTs are present, the management entity may retrieve the first post-storage algorithm and its corresponding set of ADTs (blocks 6255 and 6256). The management entity may compare the first ADT (type of data) with each of the sixth ADTs (post-storage) (block 6257). The management entity may check to determine if any dependencies have been detected between the first (type of data) and sixth (post-storage) ADTs (block 6258). If no dependencies were detected, the management entity continues to block 6260. If one or more dependencies were detected, the management entity continues to block 6259 and point P of FIG. 6e-10.

Referring now to block 62220 of FIG. 6e-10, the management entity may save references to each ADT and the dependency information in a set of seventeenth objects (block 62220). The management entity may map each object in the set of seventeenth objects to a tenth data structure (block 62222), and store the tenth data structure into the set of eighth objects (block 62224). The management entity may define an association between an object in the set of second objects (i.e., ADTs for types of data) and the object in the set of seventeenth objects (e.g., post-storage ADTs) as an eleventh data structure (block 62226), which is then stored in the set of eighth objects (block 62228). The management entity may use the set of first, tenth, and eleventh data structures to select one or more data models that can be used to meet the requirements of each data structure (block 62230).

The management entity may initialize counter k to a value, such as one (block 62232). The management entity may map each post-storage ADT (in the set of seventeenth objects) into at least one or more model elements in the information model (block 62234), and map each model element in the information model into at least one model element in a selected data model (block 62236). The newly created set of data model elements are then mapped into a new set of eighteenth objects (block 62238). The management entity may ensure that the post-processing objects can operate with the data and protocol objects already defined (the set of sixth and ninth objects, respectively) (block 62240). If they cannot, the k-th object is removed (block 62244), and the management entity increments counter k block 62245. Otherwise, the management entity proceeds to block 62245. Finally, the management entity may check to see if there are additional post-storage objects (block 62246). If there are additional post-storage objects, the management entity returns to block 62236. Otherwise, the management entity returns back to block 6259 of FIG. 6e-5.

Referring now to block 6259 of FIG. 6e-5, the management entity continues to block 6260, where it may map each post-storage ADT to one or more model elements of the information model. The management entity may update any metadata associated with that mapping (block 6261). Referring now to FIG. 6e-6, the management entity may map and store each model element of the information model to at least one model element of a selected data model (block 6262). The management entity may store the set of data model elements as a new set of seventeenth objects (block 6263). The management entity may determine one or more data models that are required to accommodate the needs of the post-storage ADTs (block 6264), and add any data models to the list of data models if they are not already in the list (block 6265).

The remainder of FIG. 6e-6 illustrates six loops that ensure that all ADTs of all components of the data collection process are analyzed. The management entity may check to determine if there are any more post-storage ADTs left to process (block 6266). If there are, the management entity returns to point K (block 6255) in FIG. 6e-5. The management entity may check to determine if there are any more pre-storage ADTs left to process (block 6267). If there are, the management entity returns to point H (block 6204) in FIG. 6e-4. The management entity may check to determine if there are any more post-processing ADTs left to process (block 6268). If there are, the management entity returns to point F (block 6193) in FIG. 6e-3. The management entity may check to determine if there are any more pre-processing ADTs left to process (block 6269). If there are, the management entity returns to point D in FIG. 6e-2 (block 6182). The management entity may check to determine if there are any more protocol ADTs left to process (block 6270). If there are, the management entity returns to point C (block 6165) in FIG. 6e-1. The management entity may check to determine if there are any more type of data ADTs left to process (block 6271). If there are, the management entity returns to point B (block 6163) in FIG. 6e-1. Otherwise, management entity returns to block 618 of FIG. 6b-1.

The management entity may collect the data (block 618). An example embodiment of the collection of the data is shown in FIG. 6f. Referring now to block 61802 of FIG. 6f, the management entity may retrieve the information model (block 61802). The management entity may retrieve the dependency list (block 61804), and retrieve the first data model to be used (block 61806). The remainder of FIG. 6f illustrates the defining of a set of loops to process the collected data using the dependencies found.

The management entity may retrieve the first protocol to be used with the first type of data (block 61807), and retrieve the first dependency (block 61808) between the first type of data and the first protocol. The management entity may use these elements to determine if any constraints are placed on the data by the selected dependency (block 61810). The management entity may retrieve any other dependencies on the type of data that use the selected dependency (block 61812). As an example, a pre- or post-processing function may depend on the retrieved type of data and protocol. If this is the case, then this also means that the pre- or post-processing function also depends on the retrieved dependency and data model. The management entity may perform the data collection process using the mandatory (from block 61810) and optional (from block 61812) dependencies (block 61814). Since the data may have pre- and post-processing, as well as pre- and post-storage dependencies, an example embodiment may collect data in groups according to the dependencies found. While data may be collected on a per datum basis, this is, in general, inefficient when compared with the example embodiments discussed herein.

The management entity may first analyze the various dependencies found in order to develop one or more strategies to govern the data collection process. Since there may be a number of viable strategies for different types of collection requests, an example collection and analysis process is described in FIG. 6*o*. It is noted that there are other possible collection and analysis processes.

Figures 1, 6N:
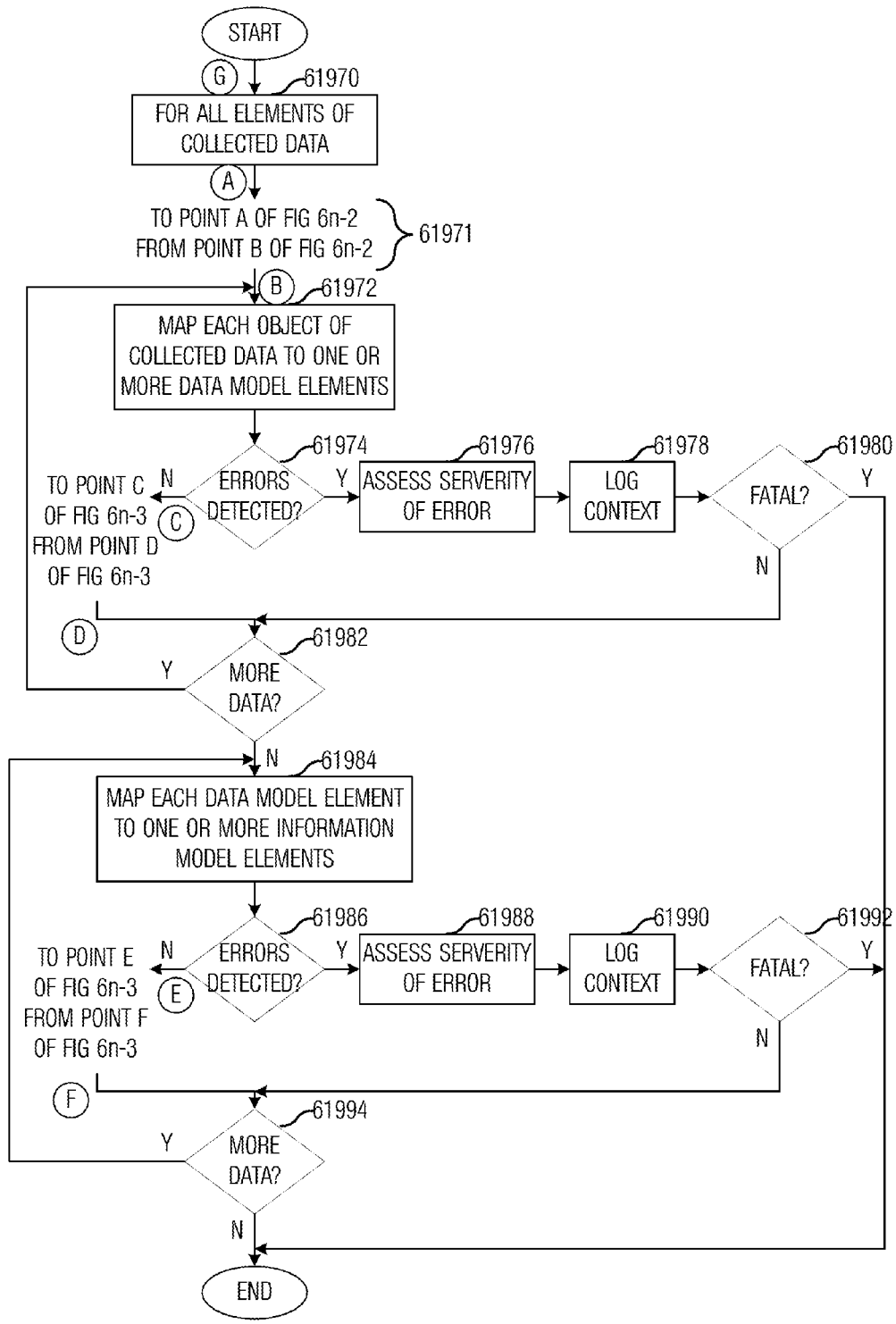
Figures 3, 6N:
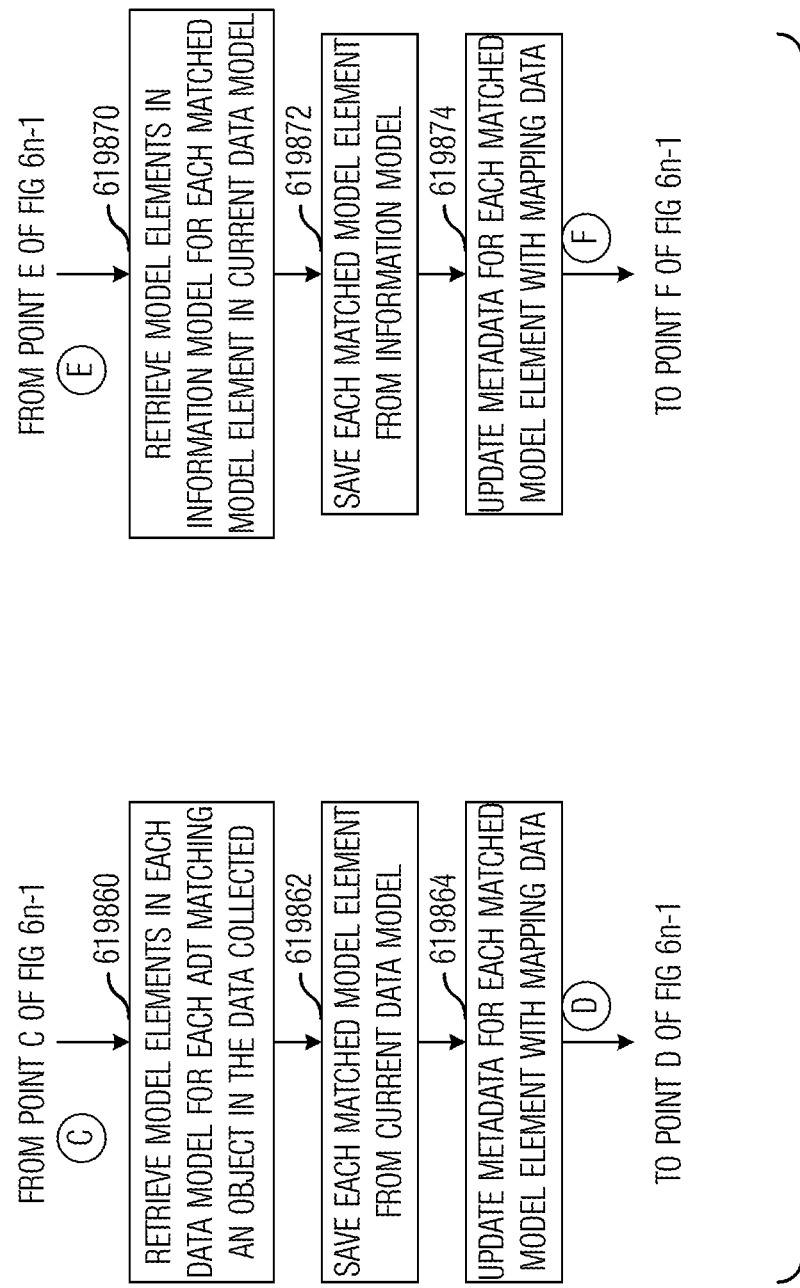
Figure 60:
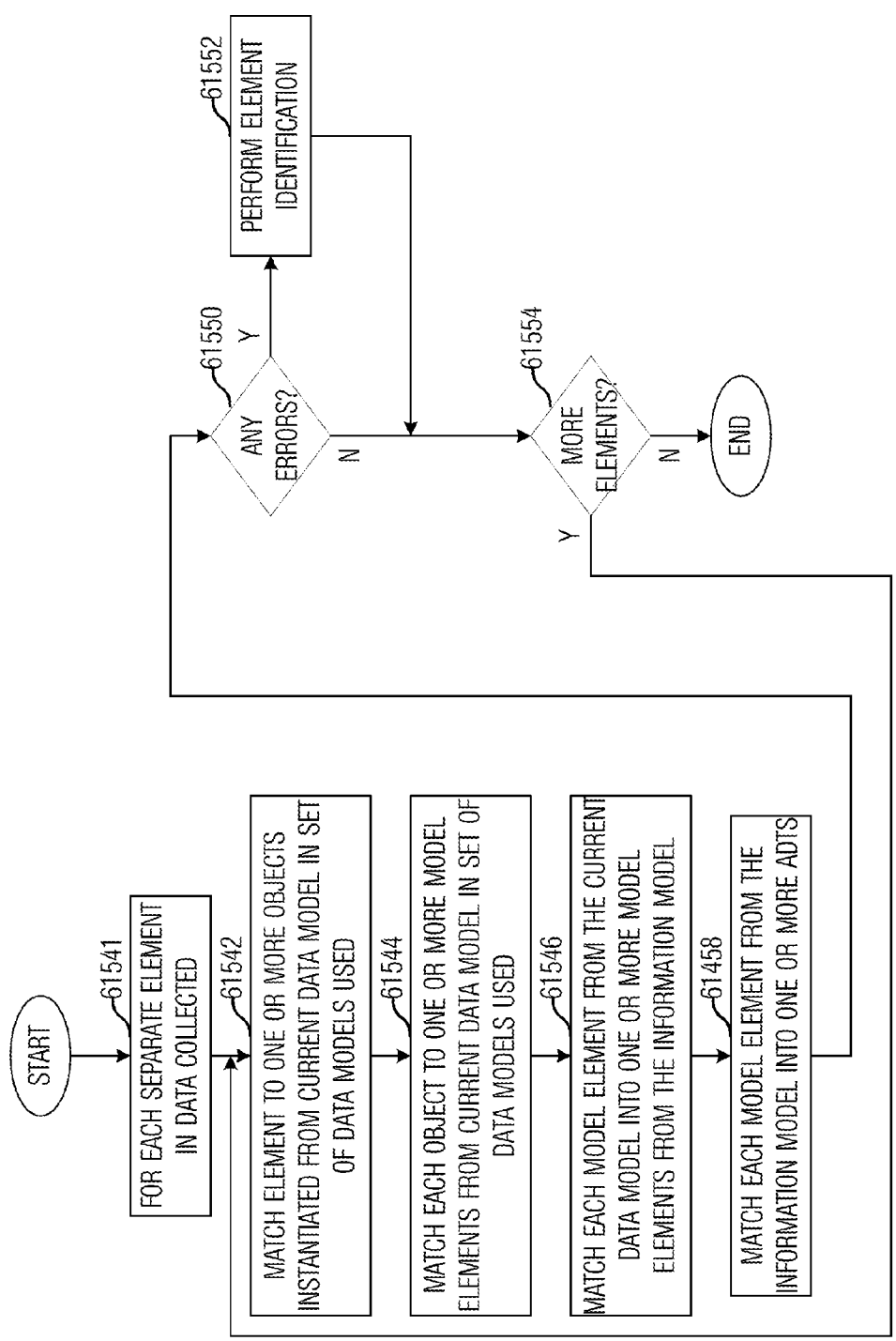

Referring now to block 61541 of FIG. 6*o*, the management entity may analyze the collected data through the use of a series of loops (block 61541). According to an example embodiment, the management system has already analyzed the various dependencies found in the collection request and defined one or more strategies with which to satisfy the collection request. The management entity may analyze the collected data stream, seeking to find an atomic element that it can identify using a data model from the list of data models that it is using to meet the data collection request (block 61542). It is noted that some data are easily distinguishable and can be immediately identified due to having or exhibiting unique properties or behavior. In contrast, some data are not easily distinguishable, and can only be identified in the context of other data. A generic approach for solving this problem is illustrated in FIGS. 6*o*, 6*p*, and 6*q*, and is initiated in block 61542 of FIG. 6*o*, whose operation is described in more detail in FIG. 6*p*.

Figure 6P:
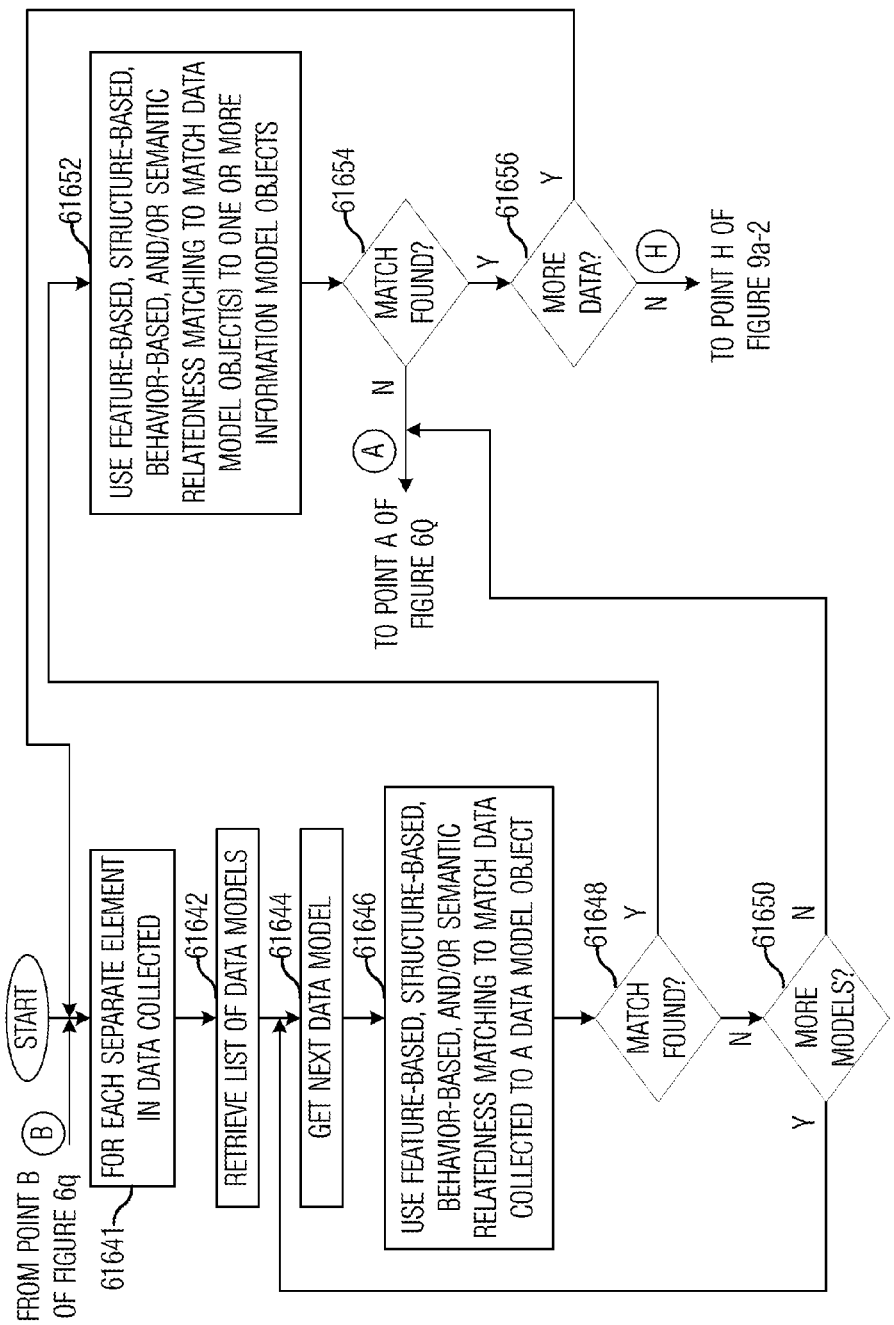
FIG. 6p illustrates an example flow diagram of operations occurring in the matching process of an object according to example embodiments described herein.
Figure 6Q:
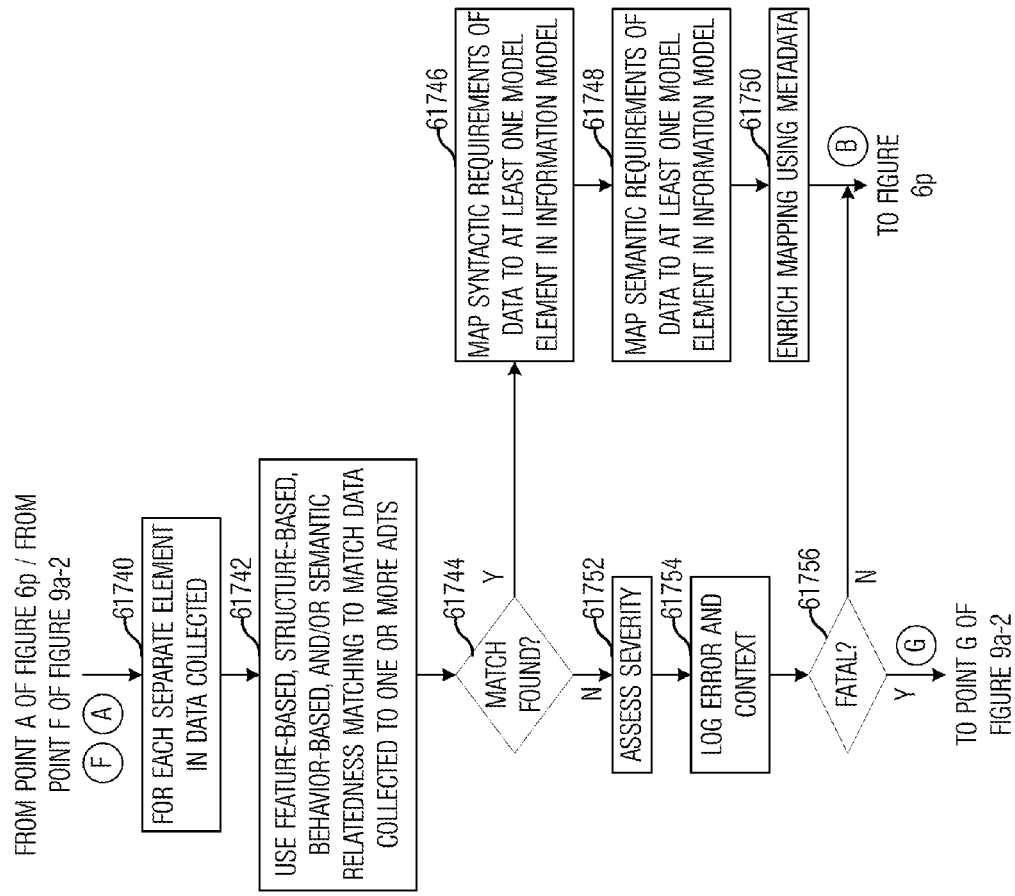
FIG. 6q illustrates an example flow diagram of operations occurring in the identification process of an object according to example embodiments described herein.

Referring now to block 61641 in FIG. 6*p*, the management entity may initialize looping constructs used to perform the matching process to identify data collected. The management entity may retrieve a list of data models (block 61642), and retrieve the first data model in the list of data models (block 61644). The management entity may use one or more of feature-based, structure-based, behavior-based, or semantic relatedness matching to match data collected to at least one model element in the first data model (block 61646). The management entity may perform a check to determine if a match has been found (block 61648). If no match is found in block 61648, then in block 61650, the management entity may check to determine if more data models are available. If more data models are available, then the management entity returns to block 61644, where the next data model is retrieved, and the process is repeated. If no more data models are available, then the management entity proceeds to point A (block 61740) in FIG. 6*q* to attempt a more computationally expensive method to identify the data. An example identification technique is illustrated in FIG. 6*q*. Since there may be a number of viable strategies for identifying different types of data, the example identification process illustrated in FIG. 6*q* should not be construed as being limiting to either the scope or the spirit of the example embodiments.

If a match is found in block 61648, then the management entity moves to block 61652, where the management entity may use one or more of feature-based, structure-based, behavior-based, and semantic relatedness matching to match the at least one model element from the first data model to at least one model element in the information model (block 61652). The matching may enable the management entity to be cognizant of the set of features and behaviors that an instance of the at least one model element should have. As an illustrative example, if a router has been identified, and a physical port of the router has been assigned speed and duplex values, but no address is associated with that physical port, then the management entity may conclude that the physical port is not completely initialized (e.g., at a minimum, it needs an address object to be associated with the physical port, and the physical port itself must be enabled). Repeating this procedure is an example of the management entity recognizing enough objects that have simple functionality and behavior, as well as recognizing various relationships between these simple objects, to build a more complex ManageableEntity (e.g., a router). By viewing the information model description of the element, the management entity may verify that the assembled ManageableEntity is correct as well as learn what other data to look for in the collected data in order to determine if the object is complete or not. This leads to better understanding of the context of the data.

The management entity may perform a check to determine if a match between the at least one model element from the retrieved data model and at least one model element from the information model is found (block 61654). If so, the management entity may move to block 61656, where it checks to determine if there is more data to be identified. If there is not any more data to identify, the management entity returns to block 61542 of FIG. 6*o*. If there is more data to be identified, the management entity returns to block 61641, and the technique repeats. If a match is not found in block 61654, the management entity may return to point A (block 61740) in FIG. 6*q* to attempt a more computationally expensive method to identify the data.

Referring now to block 61740 of FIG. 6*q*, the management entity may initialize looping constructs used to perform the element matching process to identify data collected (block 61740). A purpose of the technique shown in FIG. 6*q* is to match elements in the data collected to known model elements in the information model (in order to identify them) using ADTs. An advantage of this technique is that it enables the management entity to match data collected to known features and behavior of a ManageableEntity or part thereof; as each match of each feature and/or behavior is verified, then the confidence that these data collected are in fact an instance of the ManageableEntity. As used herein, the term element means a set of data that are logically a part of a larger data object. Element may correspond to one or more model elements of the information model. As an example, a router may comprise chassis, port, interfaces, power supplies, and other objects. Each of these objects may in turn comprise other, lower-level objects (e.g., an interface may have an IP address and/or a MAC address, depending on the type of interface). It should be noted that all of these example objects are either ManageableEntities (e.g., an interface) or UnManageableEntities (e.g., a chassis).

The management entity may use one or more of feature-based, structure-based, behavior-based, or semantic relatedness matching to match the data from the retrieved data model to at least one ADT defined in or used to construct the information model (block 61742). The matching enables the management entity to recognize one or more features and behaviors that an instance of the at least one element should have. If a match is not found in block 61744, the management entity is unable to identify these data. Accordingly, the management entity assesses the severity of the inability to (currently) identify these data. The assessment is used to determine whether this technique should continue (block 61752). It is noted that the severity may be context-sensitive, and in most cases, the object matching technique can be continued. The technique may continue because by identifying more data in the collected data, more information about the collected data is gathered, which may then be used to help identify the currently unidentifiable element. The context is logged (block 61754), and the management entity may perform a second check to determine if this error is fatal within the gathered context (block 61756). If the error is not fatal, then the management entity returns to point B (block 61641) of FIG. 6*p*. If the error is fatal, this technique terminates, and the management entity returns to block 61542 in FIG. 6*o*.

If a match is found in block 61744, the syntactic requirements of the ADT may be mapped to at least one model element in the information model (block 61746). The management entity may use the syntactic requirements to examine the data in order to map the semantic requirements of the ADT to at least one model element in the information model (block 61748). The management entity may enrich the mapping by adding metadata as appropriate (block 61750). The metadata may be derived from information that the management entity already knows, and may contain hints for the management entity to aid in the current and future object identification technique. The model element being mapped to in blocks 61746, 61748, and 61750 may be a single model element or a single set of model elements. The management entity may return to point B (block 61641) of FIG. 6p.

Once the element is identified using the selected data model (block 61542), the management entity may continue to match the at least one object that was identified (block 61542) to at least one model element in the selected data model (block 61544). The management entity may then match the at least one model element from the selected data model (block 61544) to at least one model element from the information model (block 61546). These three steps (blocks 61542-61546) have thus matched objects from the data collected to (conceptual) model elements from the information model. This serves to identify the class of the object instance, which in turn serves as a syntactical and semantic check of the veracity of this identification technique. The management entity may then match each model element from the information model to at least one ADT; this enables the management entity to recognize changes in the structure, attribute values, operations, and/or relationships that this object instance has (as represented in the information model) in this particular application-specific context by relying on a more abstract definition of its functionality and behavior (as defined by the at least one ADT). Hence, the same management entity may recognize variations in the instantiation of the same object caused by different application contexts. As an illustrative example, a router that has 16 PhysicalPort objects may enable a different number of object instances in different applications. As another illustrative example, the same Interface object may be configured in different ways, or be used to create higher-level logical MangeableEntities (e.g., a VLAN or VPN) for different applications.

The management entity may then check for any errors in the matching processes (blocks 61542-61548) in this technique. If no errors are found, the management entity may then check for the presence of additional elements in the data collected to analyze (block 61554). If there are additional elements to analyze, then the management entity may return to block 61542 and repeat the above process. If not, then this technique terminates, and returns to block 61814 of FIG. 6f. If at least one error was found, then the management entity performs element identification, as described in FIG. 6q, in order to try to resolve the error by identifying the unknown object.

Referring now back to block 61814 of FIG. 6f, the management entity has completed collection of the data and identified the objects of the data. The management entity may validate the data (block 61816). In this technique, the management entity may check to ensure that the results of the data collection process make sense (e.g., data about a given Entity makes sense for that Entity and in the context of the application(s) that this Entity supports or interacts with, and that the collected data, when viewed from a global point-of-view, is consistent. As an example, domains and ranges will be checked (catching errors like an IP address with a negative value), objects (e.g., a card is plugged into a Slot of a Chassis, and not into a PhysicalPort or a Protocol), elements (e.g., groups of related objects that form a higher-level ManageableEntity, such as a Chassis, a Card, a PhysicalPort, and an IPAddress that are combined into a single Router), and the like. An example approach illustrated in FIGS. 6g and 6n will be described herein. Since there are a variety of methods to validate data, the approach illustrated herein should not be construed as being limiting to either the scope or the spirit of the example embodiments.

Referring now to block 61960 of FIG. 6g, where the validation module may be initialized (block 61960). The management entity may retrieve the information model (block 61962) and a subset of the data models (block 61964) if they are not already available to the management entity. The management entity may validate the collected data (block 61966).

Referring now to block 61970 of FIG. 6n-1, where a first looping construct is initialized. It is noted that the operations described herein are applicable to all elements of the collected data (block 61970). The management entity may be defined to store the collected data, along with associated information and metadata (block 61971). Referring now to FIG. 6n-2, operations in the definition of the set of applicable repositories to store the collected data, along with associated information and metadata are discussed in detail. Referring now to block 619750 of FIG. 6n-2, the set of ADTs for the data to be collected are retrieved by the management entity. The management entity may retrieve the ADT(s) for the current protocol(s) being used (block 619752) and check to see if any pre-processing functions are required (block 619754). If so, then the management entity retrieves their associated ADT(s) (block 619756) and then proceeds to block 619758. Otherwise, the management entity goes directly to block 619758. Similar checks are done for post-processing (blocks 619758 and 619760), pre-storage (blocks 619762 and 619764), and post-storage (blocks 619766 and 619768), At this point, the management entity may have a complete description of all capabilities and requirements of the data collection process (via the ADTs). The management entity may now examine the capabilities of each repository that can be used to ensure that it is capable of performing all desired operations on the collected data, such as storing, retrieving, searching, and the like. Hence, in block 619770, the management entity retrieves ADTs that define such operations for each candidate repository. In block 619772, the management entity may determine which repositories satisfy the requirements of the data collection process by checking to see if the current repository being checked may perform all desired operations without adversely affecting the (collected) data to be operated on. If the current repository does not meet these requirements, control proceeds directly to block 619776. Otherwise, that repository is added to the set of tenth objects, which contains the repositories that can be used to save validated data (block 619774). The management entity then moves to block 619776.

The management entity may check to determine if there are any more candidate repositories to check (block 619776). If so, the management entity returns to block 619772, and the process repeats. Otherwise, the management entity returns to point B (block 61971) in FIG. 6n-1. The management entity may map each object of the collected data to one or more data model elements (block 61972). The management entity may perform a check to determine if an error is detected (block 61974). Since each object in the data collected has either been already identified (block 618 of FIG. 6b-1) or known to be unidentifiable (blocks 61744-61766 of FIG. 6q), the management entity may be able to perform the mapping without any problems (block 61974). If this is the case, the management entity may first save the mapped data. Since there are many different ways to perform this operation, an example technique is illustrated in FIG. 6n-3, starting at point C.

Referring forward to FIG. 6n-3, the management entity may retrieve model elements in each data model for each ADT that matches an object in the collected data (block 619740), The management entity may save each matched model element from the data model that is currently being used (block 619742). The management entity may update the metadata for each matched model element with data that describes the mapping from an ADT to a data model element, as well as any other context (block 619744). The management entity returns to point D (block 61982) in FIG. 6n-1.

The management entity may perform a check to determine if there is more data to process (block 61982). If there is more data to process, the management entity returns to block 61972. Otherwise, the management entity may move to a second loop, which starts at block 61984.

If an error is found in block 61974, the severity of the problem is assessed (block 61976). As an example, the data collection process may have correctly identified an IPAddress object, but may have not found another, higher-level, ManageableEntity to either contain and/or aggregate the IPAddress. In such a case, the data model may not be able to determine with which object the IPAddress should be associated. As another example, an IPAddress could be associated with a variety of different devices (e.g., routers, switches, firewalls, hosts, and the like) that are all part of a Local Area Network. A data model may not provide associated business logic, policy rules, and other semantics that may be required to properly associate the IPAddress object with another containing or aggregating object. Hence, the management entity may log the current context of the process (block 61978), and test to determine if not being able to map the current object to one or more data model elements should be considered a fatal error (block 61980). If fatal, the technique terminates. Otherwise, the management entity returns to block 61982, which acts as described above.

Once the management entity moves to the lower loop, operation may be substantially identical to the upper loop, except that the data model element is mapped to one or more model elements of the information model (block 61984). After the mapping is attempted in block 61984, the management entity may perform a check to determine if the mapping succeeded or produced errors (block 61986). If an error was detected, the severity of the problem may be assessed (block 61988). As an example, the information model may not have the appropriate business logic to solve a problem (e.g., matching the IPAddress object to an appropriate containing or aggregating object). Thus, the management entity may log the current context (block 61990), and test to see if this error should be considered a fatal error (block 61992). If it is a fatal error, the technique terminates. If an error is not detected, then the management entity may save the mapped model element of the information model. Since there are many different ways to perform this operation, an example technique is illustrated in FIG. 6n-3, starting at point E.

Referring forward to FIG. 6n-3, the management entity may retrieve model elements in the information model for each matched model element in the current data model (block 619750), The management entity may save each matched model element from the information model (block 619752). The management entity may update the metadata for each matched model element with data that describes the mapping from a model element in the data model to a model element in the information model, as well as any other applicable context (block 619754). Control is then passed back to point F (block 61994) in FIG. 6n-1.

Otherwise, the management entity moves to block 61994, where it may test to determine if more data needs to be mapped to model elements of the information model. If more data needs to be mapped, the management entity returns to block 61984, and the technique repeats. Otherwise, the management entity returns to block 61966 of FIG. 6g. Referring back to block 61966 of FIG. 6g, the validation process is now complete. The management entity may return to block 61816 in FIG. 6f.

Referring now to block 61816 of FIG. 6f, the data validation process is now complete. The management entity may perform a check to determine if other dependencies still need to be processed for the currently selected protocol and data model (block 61818). If so, the management entity may obtain a next dependency (block 61820), and returns to block 61810, which continues the data collection process for the given type of data, given data model, given protocol, and the next dependency for these four components of the data collection process.

The management entity may perform a check to determine if more protocols still need to be processed for the currently selected data model (block 61822). If so, the management entity may retrieve the next protocol (block 61824), and returns to block 61808, which continues the data collection process for the given type of data, given data model, and given protocol.

The management entity may perform a check to determine if more data models still need to be processed (block 61826). If so, the management entity may retrieve the next data model (block 61828), and returns to block 61807, which continues the data collection process using this new data model. Otherwise, the management entity returns to block 618 of FIG. 6b-1. This completes the data collection process, and the management entity returns to block 604 of FIG. 6a.

Referring back now to FIG. 6a, the management entity may save references of collected data as a set of first objects (block 605), in order to facilitate identification and processing of the collected data. This may be necessary because the data may be delivered out of order, or split into multiple segments, or even have some missing elements. In general, the example embodiments perform identification of ManageableEntities, as well as other functions, by converting the data collected into ManageableEntities and then matching the data characteristics and behavior of those ManageableEntities to information provided in the set of data models and the information model that the management system is using.

The management entity may then perform zero or more data collection processing operations (block 606). Such operations may be necessary in order to convert the collected data into a form more suitable for use by other entities that receive these data via the collection request (block 602). As an example, the amount of data collected may exceed the ability of the requesting entity to store and process. In such a case, an example of data collection processing could be to filter out unneeded data and/or provide a lesser amount of data that collectively has more semantics, through operations such as aggregation, correlation, and enrichment. FIGS. 6c-1 and 6c-2 illustrate a generic approach to data collection processing. Since the data collection processing can be performed in many different ways, the generic approach shown in FIGS. 6c-1 and 6c-2 is not intended to limit the spirit or the scope of the example embodiments.

Referring now to block 6060 of FIG. 6c-1, the management entity may retrieve the parsed data collection request (block 6060). The parsed data collection request may be used to retrieve any appropriate knowledge that the management system knows about that is related to the data collection request (block 6061). As an example, the management system may have stored information from previous data collection requests and analyses that may apply to the current data collection processing request and its analysis. The management entity may retrieve the dependency list, selected data models, and selected protocols (block 6062). The ordering of each of these sets of information may be adjusted by the information retrieved in block 6061 and the nature of the data collection request (from block 6060).

At this point, the management system has access to the data collection request (represented as a parse tree, or similar data structure, for example), along with the various dependencies that the management system has discovered, which may be ordered according to increasing importance on identifying dependencies between components that collect and/or analyze the data, types of data to be analyzed, the results of pre- and/or post-processing on the collected data, and the like. The management entity may partition the collected data into a set of different groups of objects, where each group contains a subset of the collected data based upon a different combination of one or more type of data dependencies and one or more protocol dependencies (block 6064). The partitioning enables the management entity to uncover hidden relationships that may not otherwise be apparent from just examining the data. As an example, an IPAddress is typically found before the device that the IPAddress is bound to. The data model will define which devices can contain and/or aggregate IPAddress objects, but in general, it cannot define which IPAddress is associated with which device until runtime. The restriction is due to the way the data model treats permanent association. The restriction would in turn negate the generalness of the data model. Similarly, the information model would not define which IPAddress was bound to which device. However, the information model could represent policy rules that would govern such associations. Assuming that the management entity is able to determine if the system being managed was using any such policy rules, then these policy rules may form part of a knowledge based that the management entity could use and apply to the collected data.

After partitioning the collected data into different groups based on dependencies between a type of data and one or more protocols (block 6064), the management entity may select a specific protocol to use for each partition (block 6066). Then, if any optional dependencies, such as those involving pre- or post-dependencies or pre or post-storage functions are found, additional partitions may be defined (block 6068). In general, the management entity has a total of at least j·k·m·n·p·q partitions, where j is the number of types of data, k is the number of protocols used for a given type of data, m and n are the number of pre- and post-processing functions used per type of data, and p and q are the number of pre- and post-storage functions used per type of data.

The management entity may initialize counters and containers required for the analysis of the collected data (block 6069). Typically, there are three types of containers used. The first two containers are used to contain Entities that can contain and/or aggregate other Entities (these Entities will henceforth be referred to as containing Entities) that have and have not been processed. Such Entities start in the first container and are processed by the management entity in blocks 60702 to 60720 of FIG. 6c-2. Once it is determined that a given Entity has no more associations with any other Entities, then that Entity is placed in the second container. Both the first container and the second container are used to determine if different types of associations, but especially whole-part relationships, exist in the data. The third container contains all other Entities that are not containing Entities. The management entity may analyze the collected data according to the dependencies (block 6070).

Referring now to block 60700 of FIG. 6c-2 for a detailed discussion of an example analysis of the collected data according to the dependencies selected in blocks 6060-6068 of FIG. 6c-1.

The management entity may retrieve the first containing Entity that can contain and/or aggregate other Entities and/or ManageableEntities (block 60700). The retrieval of the first containing Entity may enable the management entity to start assembling elements (e.g., collections of objects that are all related to each other). The elements can be nested. As an illustrative example, an IPAddress object and a PhysicalPort object may be aggregated with each other; a Protocol object uses the PhysicalPort number and the IPAddress to communicate; the PhysicalPort may be contained by a Card; the Card may be aggregated by a Chassis; and the Chassis, along with other objects, such as cables and a power supply, may all be aggregated into a Router. It should be noted that there are many different types of relationships in this example, including aggregation (e.g., a PhysicalPort object may aggregate an IPAddress object), association (e.g., a Protocol object may use an attribute of the PhysicalPort that it is running on to communicate), and composition (e.g., a PhysicalPort is contained by a Card and if the Card is removed, then that PhysicalPort is also removed). Each relationship has different semantics, which may entail the use of different data collection processing techniques.

According to an example embodiment, all objects in the above example are represented as model elements that exist in the information model: the Card, Chassis, and PhysicalPort are each UnManageableEntities, while the IPAddress and the Protocol objects are ManageableEntities (both UnManageableEntity and ManageableEntity inherit from the Entity class). The management entity may use the semantics associated with each Entity to help assemble the set of objects in the data collected into a more meaningful form.

The management entity may identify any of the other objects in the first partition that are part of the collected data to test if any may be associated with the current containing Entity using any of feature-based, structure-based, behavior-based, or semantic relatedness matching (block 60702). The identification associates the identified object (which may be an Entity or a ManageableEntity) to the currently selected containing Entity (which may also be an Entity or a ManageableEntity) using one or more of the above matching mechanisms. As an example, a set of objects from the collected data may correspond to a sub-graph in the information model. Structural matching would detect this and combine the objects into a larger object. It is noted that in some systems, when a process implementing this technique is executed, the combined objects are not eliminated. Rather, a new containing Entity and/or new relationships are created to represent the appropriate semantics.

The management entity may check to determine if any associations can be deduced or inferred about the Entity that can contain and/or aggregate Entities and the set of objects being analyzed (block 60704). As an example, if an object is known to be a type of Card that has 16 physical ports that are all 10/100 Mb, then the management entity can attempt to find 16 distinct, but related, IPAddress objects that can each be associated with a different PhysicalPort of the Card. Implied are a number of facts (e.g., the PhysicalPort must be capable of transmitting and receiving Ethernet traffic at either 10 or 100 Mbps, the PhysicalPort must be enabled, and the like) that the management entity can check or use as hypotheses to attempt and verify as more of the objects in the collected data are processed. These facts are added to the collective knowledge of the management system, enabling the management system to deduce or infer new facts. As an example, the newly constructed object, a Card that now has a new IPAddress associated with a PhysicalPort, could now support running a set of Protocols. In contrast, if the management entity finds more than 16 IPAddresses, then it may conclude that at least a second device having one of those IPAddresses exists. If the management entity finds less than 16 IPAddresses, then it may also make one or more conclusions, depending on the current state of the collected data analysis, If one or more associations were generated, the management entity may continue to block 60706, where it adds the newly constructed containing Entity to the front of the first container of containing Entities. The management entity may return to block 60702, so that additional objects from the set of collected data in the first partition may be analyzed to determine if they are related to any of the containing Entities in the first container.

If no associations were created in block 60704, the management entity may move to block 60708, where it moves the containing Entity to the second container. The management entity may test to determine if there are more containing Entities (block 60710). If so, the management entity may obtain the next containing Entity (block 60712). The management entity may return to block 60702 to continue the analysis process. If there are no containing Entities, the management entity may test to determine if any new containing Entities were found on this analysis iteration (block 60714). If so, then the counter i is incremented (block 60716). The management entity may clear the contents of the first container, rename the second container (i.e., the container that has processed containing Entities) to be the new first container, and rename the old second container to be the new first container (block 60718), and move to block 60702 to continue analyzing collected data from the first partition.

If the analytic iteration does not find any new containing Entities, the management entity may check to determine if there are more data to be processed in this partition (block 60720). If there are more data to process, the management entity returns to block 60702 to continue analyzing collected data from the current partition. If there is no further data to process, the management entity may perform a check to determine if there are any more partitions to be processed (block 60722). If there are more partitions to be processed, the management entity may obtain the next partition, and reinitialize the system (block 60724), and return to bock 60702 to start analyzing collected data from the new partition. If there are no more partitions to be processed, the management entity may use one or more mechanisms to analyze the results of the previous element creation process (block 60726). Such mechanisms include, but are not limited to, machine learning, statistical analysis, fuzzy matching, and the like. The management entity may save the analysis (block 60728). The management entity may return to block 6070 of FIG. 6c-1.

With the analysis completed, the management entity returns to block 6070 of FIG. 6c-1 and then block 606 of FIG. 6a.

Referring back now to FIG. 6a, with the data collection processing analysis is complete, the management entity may save the results (block 607). The management entity may perform one or more data transformations if necessary (block 608).

Referring now to FIG. 6d, wherein blocks 620-623 illustrate an example data transformation (block 608 in FIG. 6a) on the collected data. According to an example embodiment, transformation of the collected data may make consumption of the collected data easier for a set of entities that are requesting all or part of the data collected. The set of data transformations enable the overall structure, syntax, and semantics of the data collected to be transformed into a different data set having different overall structure, syntax, and/or semantics. The management entity may perform a check to determine if the collected data requires a transformation to be compliant with the specified schema (block 620). As an example, the collected data may be in a form compliant with a first internal schema, but not compliant with a second schema that is specified by the requester of the data collection process. Hence, a transformation may be needed to make the collected data compliant with the specified schema. If the collected data does not require transformation, data transformation 620 may be skipped.

If the collected data does require transformation, then it may be assumed that the first schema is already defined in either the information model or in one of the data models. The management entity may retrieve the specified schema (block 621). The specified schema may be stored in a memory local or remote to the management entity.

Utilizing the first schema and the specified schema, the management entity may determine a transformation function (block 622). The transformation function may be considered to be a mapping function that maps instances of one schema (e.g., the first schema) to another schema (e.g., the specified schema). It is noted that the transformation may consist of either a set of operations, a set of "sub-transformations", and/or multiple transformations performed in series.

Referring now to block 6210 of FIG. 6i, the management entity may start by retrieving the source and target schemata (blocks 6210 and 6212, respectively). The management entity may check to determine if the target schema is already defined, or can be defined, in the information model (block 6214). If the target schema is already defined or if it can be defined, the management entity may to block 6222. If it cannot, the management entity may define a mapping transformation function. The management entity may initialize loops (block 6216). The management entity may map each element in the target schema to at least one ADT in the information model (block 6218). The management entity may map each ADT to at least one model element in the information model that corresponds to another at least one model element in the source schema (block 6220).

The management entity may perform aa check to determine if there is enough information to define the mapping directly (block 6222). If so, the management entity may perform a check to determine if there are more elements left to map (block 6226). If there are more elements to map, the management entity returns to block 6216. If there are no more elements to map, the management entity returns back to block 6222 in FIG. 6d. If there is not enough information to define the mapping directly, the management entity may define a function to map source elements to target elements (block 6224). The function may be based on the ADTs that describe the target schema (and hence, define the characteristics and behavior of each element in the target schema) and the ability to map each ADT to at least one model element in the information model. Once the mapping is defined in block 6224, the management entity moves to block 6226, and the technique proceeds as explained above.

Once the data transformation function is completed for all elements of the target schema, the management entity returns to block 622 of FIG. 6*d*. The management entity may start the transformation process (block 623). An example transformation process is illustrated in FIG. 6*j*.

Referring now to block 6230 of FIG. 6*j*, the management entity may retrieve the source schema (block 6230), retrieve the target schema (block 6232), and retrieve the transformation function (block 6234), respectively, if they are not already present. The management entity may initialize looping constructs to visit all data (block 6236), and apply the transformation mapping to each element in the source schema (block 6238). In general, the application of the transformation mapping produces a set of instances to populate the target schema. The management entity may perform a check for errors in the data transformation process (block 6240). If there are none, the management entity may check to determine if there are more elements to be transformed (block 6248). If there are more elements to be transformed, the management entity returns to block 6238. If there are no more elements to be transformed, the management entity returns to block 623 of FIG. 6*d*.

If an error was detected in block 6240, the severity of the error may be assessed (block 6242), and its context logged (block 6244). The error may then be assessed as to whether it is of sufficient severity that the transformation should stop, or whether the transformation may continue (block 6246). If the transformation can continue, the management entity returns to block 6248. If the transformation cannot continue, then the technique terminates.

Referring now to block 608 of FIG. 6*a*, the management entity may then save the collected data (block 609), thereby enabling the management entity, as well as other entities, to store a "snapshot" of the collected data in its fully processed form before further operations are performed.

FIGS. 7*a*-1, 7*a*-2, and 7*b* illustrate a flow diagram of operations 700 occurring in a management entity as the management entity determines needed data model(s). Operations 700 may be indicative of operations occurring in a management entity, such as management entity 315, management entity 405, and management entity 505, as the management entity determines the data model(s) required to collect the data requested. Operations 700 may be an example implementation of determining specific data model(s) required to collect the data requested in the request, block 616 of FIG. 6*b*-1.

Figures 1, 7A:
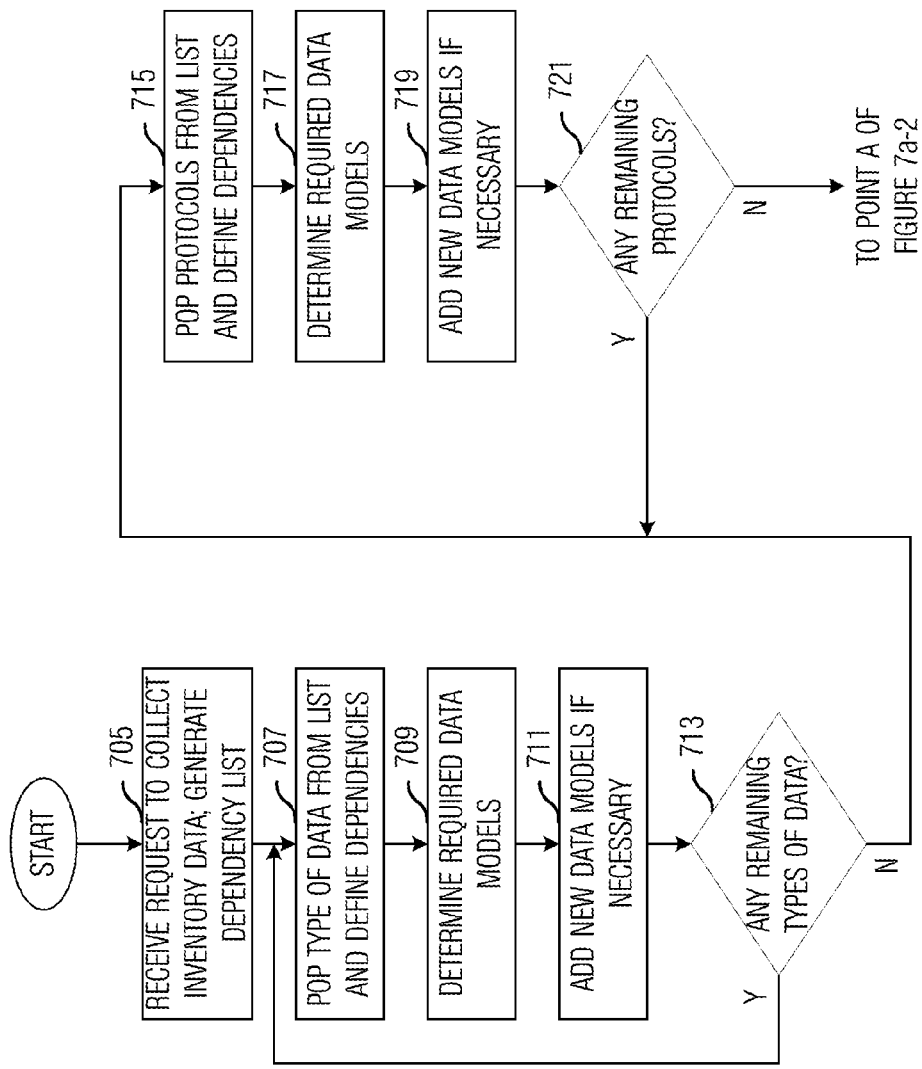
Figures 2, 7A:
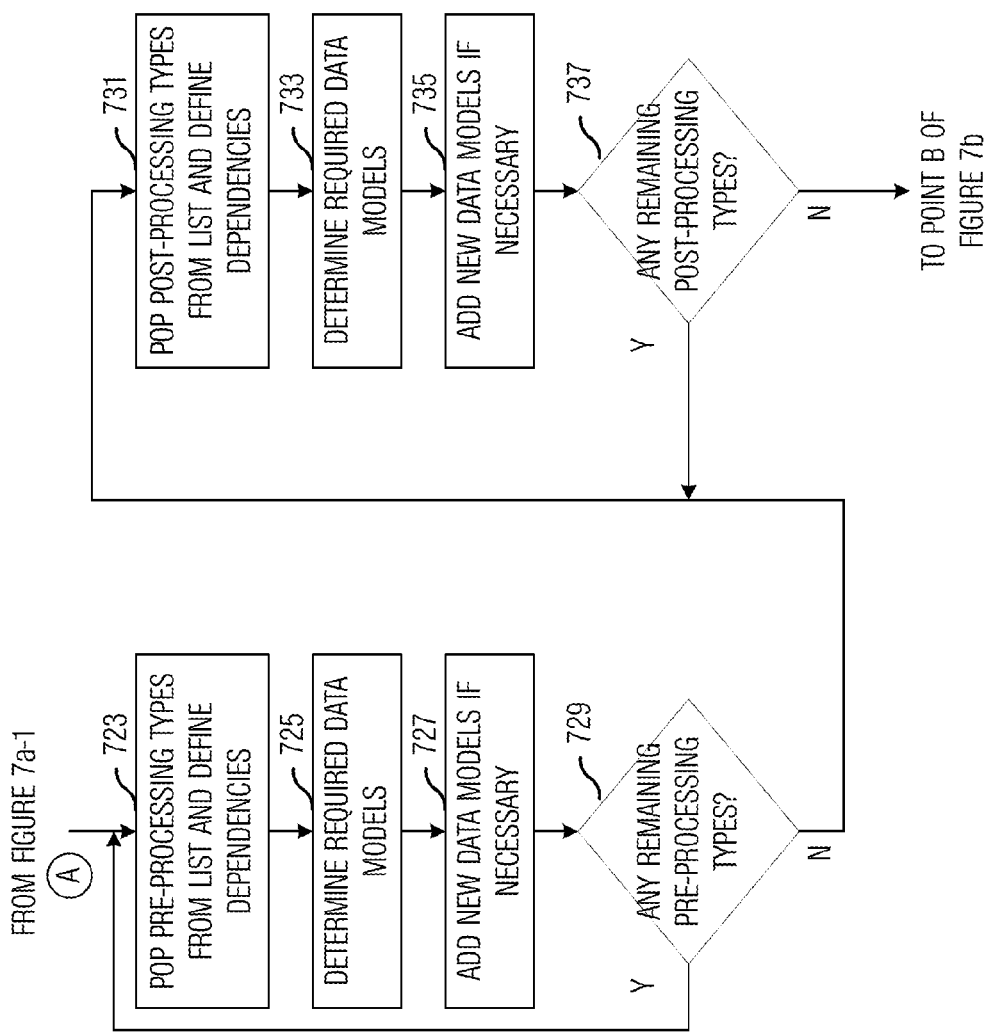
Figure 7B:
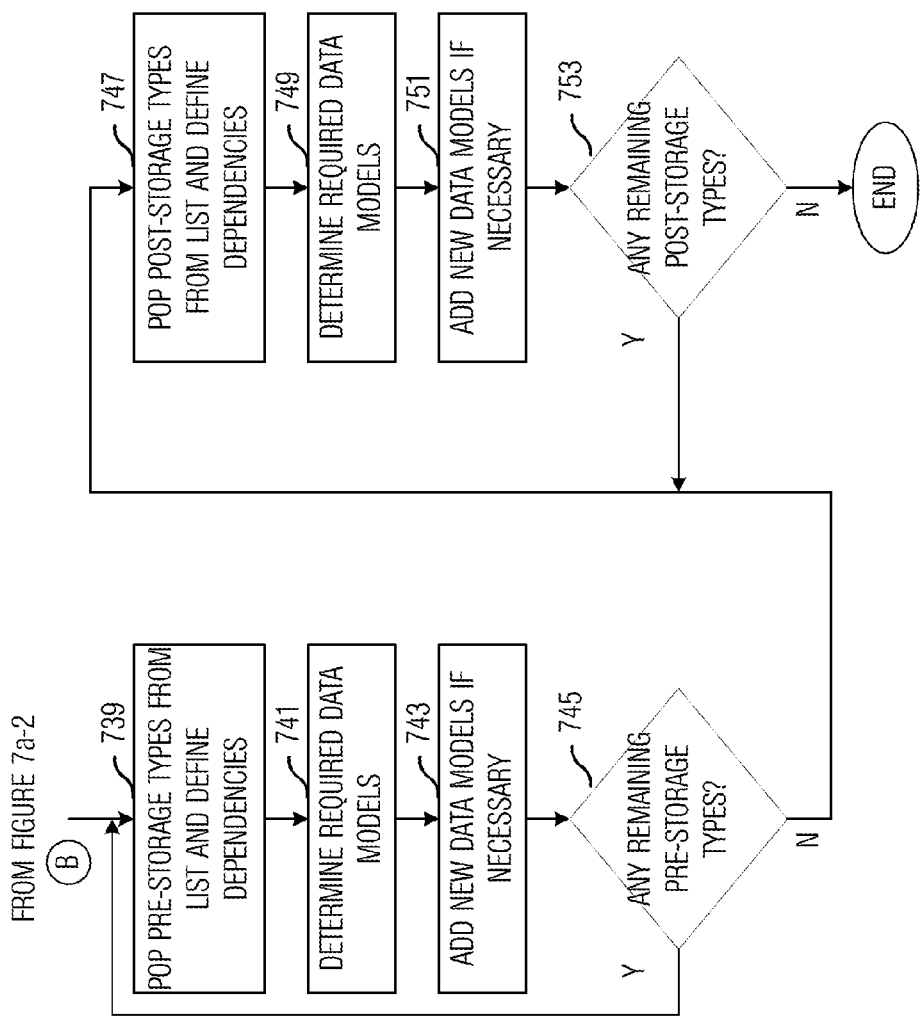
FIG. 7b illustrates an example flow diagram of operations occurring in a management entity as the management entity determines needed data model(s) to satisfy pre- and post-storage dependencies according to example embodiments described herein.
Figure 8:
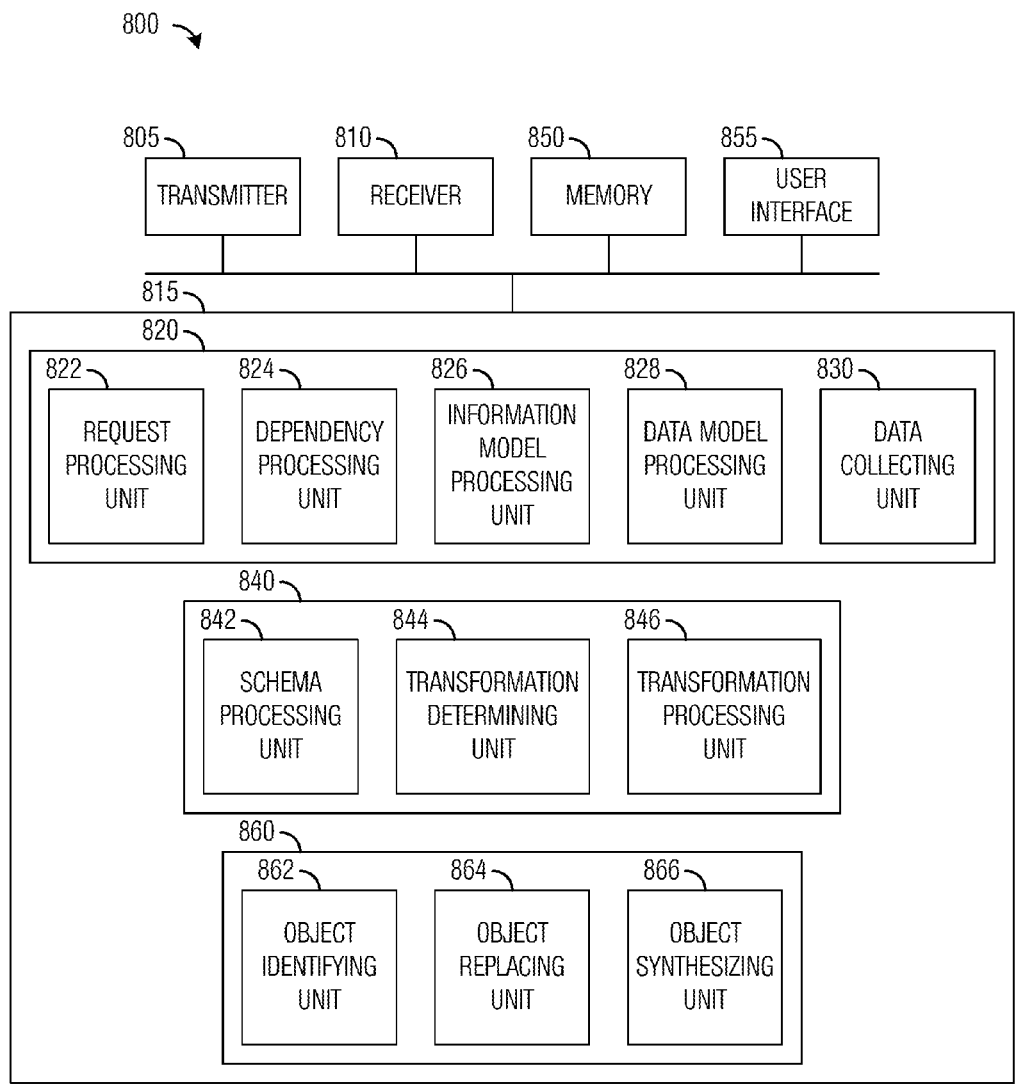

Operations 700 in FIG. 7*a*-1 may begin with the management entity receiving a request to collect inventory data and generating a dependency list from the request to collect inventory data (block 705). The dependency list may have been obtained by the management entity in block 610 of FIG. 6*b*-1 and saved for subsequent use. As an example, the management entity may retrieve the dependency list from a memory.

The dependency list consists of a set of ordered tuples that define the dependencies between each component used in the process of collecting data. A summary of the tuple is shown in FIG. 6*b*-2. The tuple may be implemented in a variety of data structures. For discussion purposes, a stack data type will be used. This should not be construed as limiting the scope of how the dependency list should be implemented.

A stack may be defined as a type of ADT that is used to define a linear data structure. The linear data structure is used to maintain a sequence of elements. For the sake of simplicity, the stack that we will use is assumed to be a homogeneous stack, meaning that it can only store elements that all have the same data type. A characteristic of a stack is that insert and delete operations are only allowed at one end of the stack, called the top or the bottom of the stack, respectively. Insertion and deletion are done in a last-in, first-out order. The principal operations of a stack are a push, which inserts a value into the stack, a pop, which removes a value from the stack, and a copy, which creates a new stack that has the same content as the current stack.

In general, two types of dependencies are mandatory: data-protocol and protocol-data. These define the types of protocols that will not adversely alter the selected data, and the data types that a given protocol can transmit and receive without error, respectively. The first dependency (data-protocol) may be obtained from the dependency list by using a pop operation (block 707). The management entity may determine data model(s) that are required to represent the type of data (block 709), as previously explained in FIGS. 6*e*1-6*e*-10. As an example, if a complex object consists of several data structures, then only a data model (or data models) capable of representing, querying, editing, and managing the complex object may be used. As another example, if an inventory object requires semantics, such as metadata or other types of programmable logic, to be stored along with the inventory object, then only a data model (or data models) that can represent this type of association may be used.

The data model (or data models) may be added to a list of data models to be used to collect the data regarding the communications system if it is not already in the list (block 711). The management entity may perform a check to determine if there are any remaining types of data that have not been analyzed for purposes of defining a dependency (or dependencies) (block 713). If there are remaining types of data that have not been analyzed, then the management entity may return to block 707 to repeat analysis of another type of data. If there are no more remaining types of data to need to be analyzed, then the management entity may proceed to block 715.

The management entity may obtain from the dependency list types of protocol (block 715) that can transmit and receive the set of types of data retrieved in block 707 without error by using a pop operation. The management entity may determine data model(s) that are required to represent the type(s) of protocol (block 717). As an example, if detailed information about a VLAN object is required, then only those protocols that are capable of retrieving detailed information about the VLAN object may be used (e.g., 802.1Q (Media Access Control Bridges and Virtual Bridge Local Access Networks), or the VLAN Trunking Protocol (VTP)). The data model (or data models) may be added to a list of data models to be used to collect the data regarding the communications system if it is not already in the list (block 719). The management entity may perform a check to determine if there are any remaining types of protocol that have not been analyzed for purposes of defining a dependency (or dependencies) (block 721). If there are remaining types of protocol that have not been analyzed, then the management entity may return to block 715 to repeat analysis of another type of protocol. If there are no more remaining types of protocol to need to be analyzed, then the management entity may proceed to block 723 of FIG. 7a-2.

The management entity may obtain from the dependency list types of pre-processing operations (block 723) by using a pop operation. The management entity may determine data model(s) that are required to represent the type(s) of pre-processing operations (block 725) that may be required in order to collect data in a form that is useful for the requester. As an example, a pre-processing method may be applied to the data being collected and may include one or more of the following: 1) operations on each datum or a set of data in the collected data; (2) sending of one or more data elements of the collected data that meet some criteria to additional logic for further processing via another protocol; and the like. Hence, the pre-processing operation may also have dependencies on protocols and storage. The data model (or data models) may be added to a list of data models to be used to collect the data regarding the communications system if it is not already in the list (block 727). The management entity may perform a check to determine if there are any remaining types of pre-processing that have not been analyzed for purposes of defining a dependency (or dependencies) (block 729). If there are remaining types of pre-processing that have not been analyzed, then the management entity may return to block 723 to repeat analysis of another type of pre-processing. If there are no more remaining types of pre-processing that need to be analyzed, then the management entity may proceed to block 731.

The management entity may obtain a type of post-processing from the dependencies list and define a dependency (dependencies) for the type of post-processing (block 731). The management entity may obtain from the dependency list types of post-processing operations (block 731) by using a stack-pop operation. The management entity may determine data model(s) that are required to represent the type(s) of post-processing operations (block 733) that may be required in order to collect data in a form that is useful for the requester. As an example, a post-processing method may be applied to the collected data, but before said data is sent to the requestor, and may include one or more of the following: 1) operations on the set of collected data as a whole, in order to derive new data based on (e.g., trending information extracted from the data collected); (2) sending of one or more data elements of the collected data that meet some criteria to additional logic for further processing via another protocol; and the like. Hence, the post-processing operation may also have dependencies on protocols, pre-processing, and storage. The data model (or data models) may be added to a list of data models to be used to collect the data regarding the communications system if it is not already in the list (block 735). The management entity may perform a check to determine if there are any remaining types of post-processing that have not been analyzed for purposes of defining a dependency (or dependencies) (block 737). If there are remaining types of post-processing that have not been analyzed, then the management entity may return to block 731 to repeat analysis of another type of post-processing. If there are no more remaining types of post-processing to need to be analyzed, then the management entity may proceed to block 739 on FIG. 7b (shown after point B of FIG. 7a-2).

The management entity may obtain from the dependency list type(s) of pre-storage operations (block 739) by using a stack-pop operation. The management entity may determine data model(s) that are required to represent the type(s) of pre-storage operations (block 741) that may be required in order to collect data in a form that is useful for the requester. As an example, a pre-storage method may be applied to the data as it is being collected, and may include storing and retrieving collected and stored data, respectively, for further analysis and processing. The data model (or data models) may be added to a list of data models to be used to collect the data regarding the communications system if it is not already in the list (block 743). The management entity may perform a check to determine if there are any remaining types of pre-storage that have not been analyzed for purposes of defining a dependency (or dependencies) (block 745). If there are remaining types of pre-storage that have not been analyzed, then the management entity may return to block 739 to repeat analysis of another type of pre-storage. If there are no more remaining types of pre-storage to need to be analyzed, then the management entity may proceed to block 747.

The management entity may obtain from the dependency list type(s) of post-storage operations (block 747). The management entity may determine data model(s) that are required to represent the type(s) of post-storage operations (block 749) that may be required in order to collect data in a form that is useful for the requester. As an example, a post-storage method may be applied to the data after all data have been collected, and may include storing and retrieving collected and stored data, respectively, for further analysis and processing. The data model (or data models) may be added to a list of data models to be used to collect the data regarding the communications system if it is not already in the list (block 751). The management entity may perform a check to determine if there are any remaining types of post-storage that have not been analyzed for purposes of defining a dependency (or dependencies) (block 753). If there are remaining types of post-storage that have not been analyzed, then the management entity may return to block 747 to repeat analysis of another type of post-storage. If there are no more remaining types of post-storage to need to be analyzed, then the management entity is finished with determining data model(s) required to collect the data requested.

FIGS. 6a-6q and attendant discussion have described the case when, after receiving a request to collect data for an entity in a communications system, the management entity is able to recognize all of the data collected. In contrast, FIGS. 9a-1 through 9f and attendant discussion present the case where the management entity is not able to recognize all of the data collected. In particular, FIGS. 9a-1, 9a-2, and 9a-3 describe methods for enabling the management entity to replace missing, corrupted, incomplete, and/or incorrect data with either deduced and/or inferred data. This includes data collection, analysis, and transformation.

Figures 1, 9A:
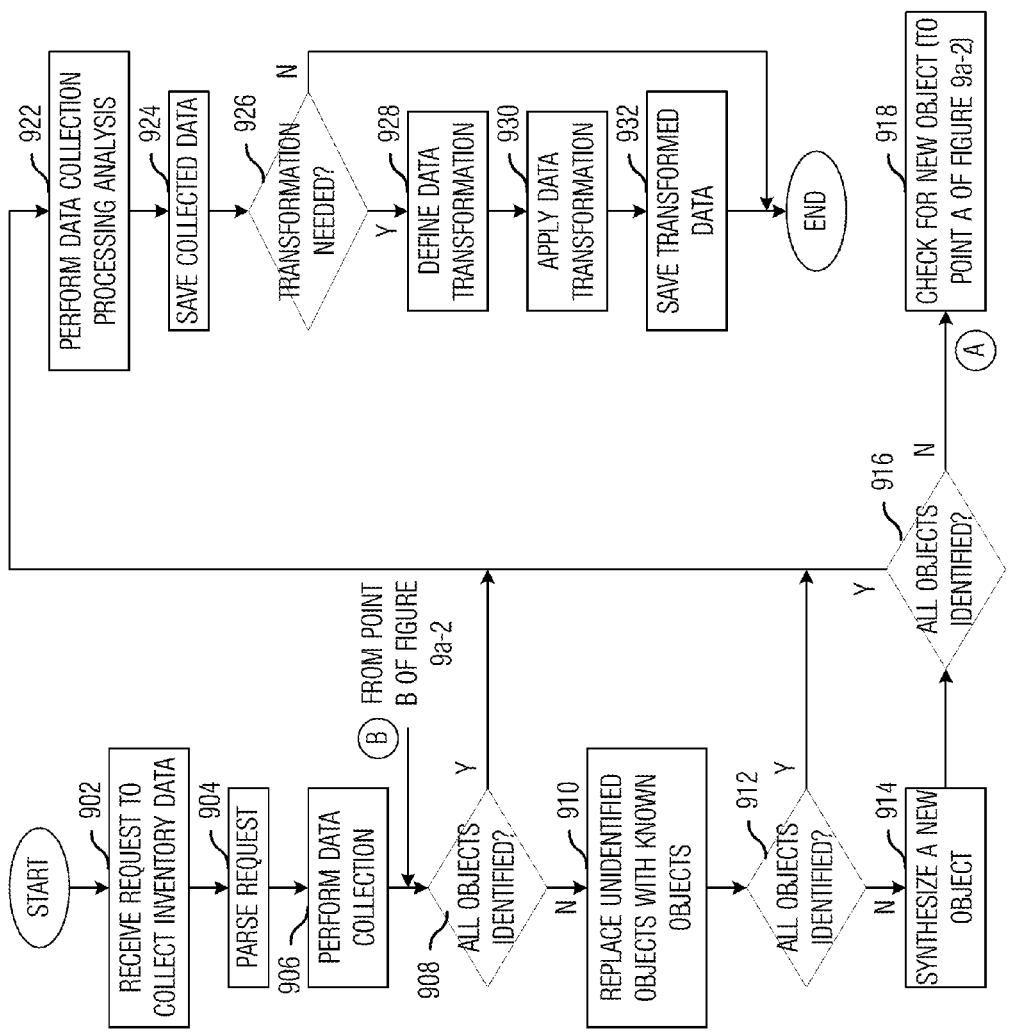
Figures 2, 9A:
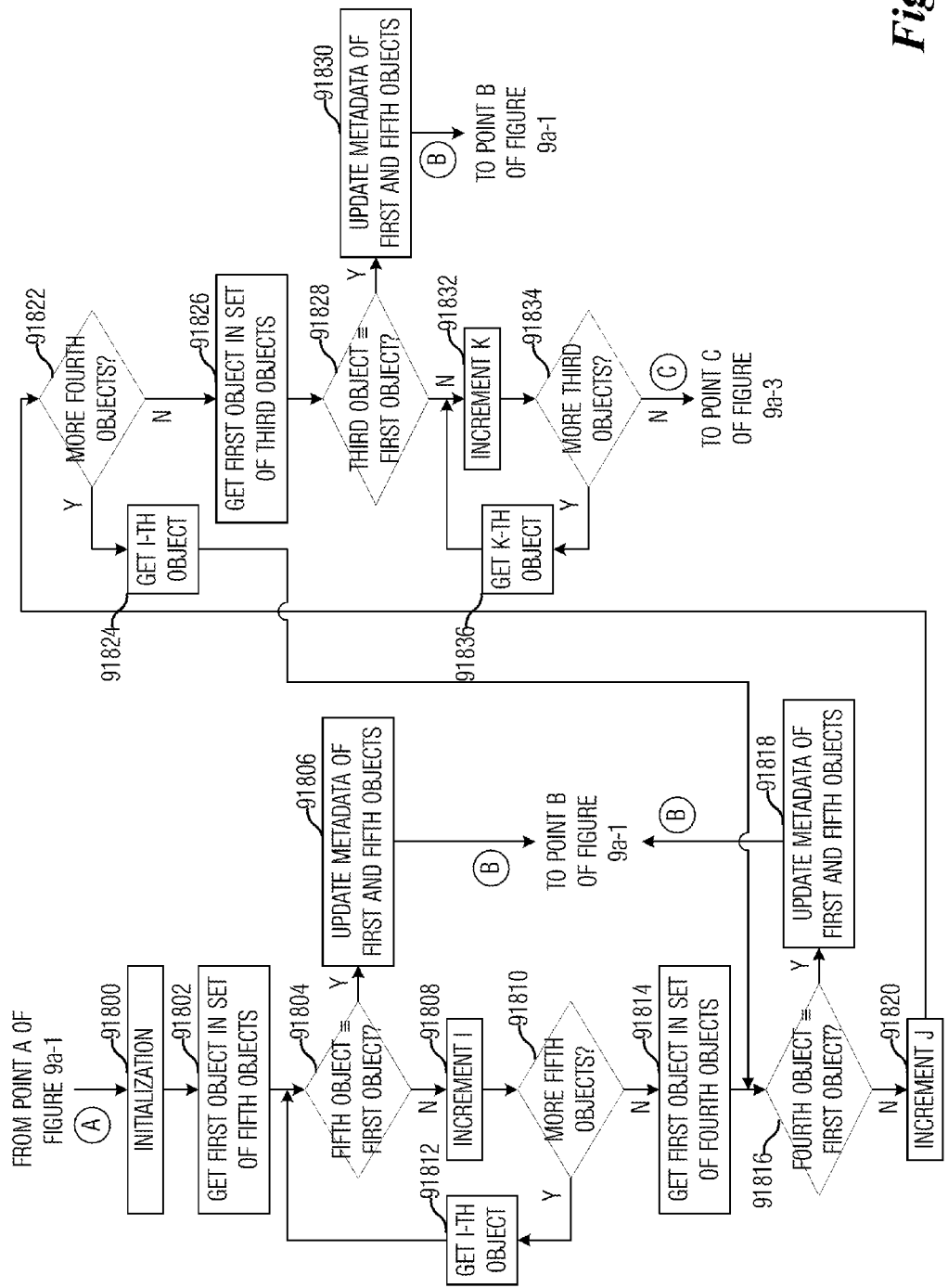
Figures 3, 9A:
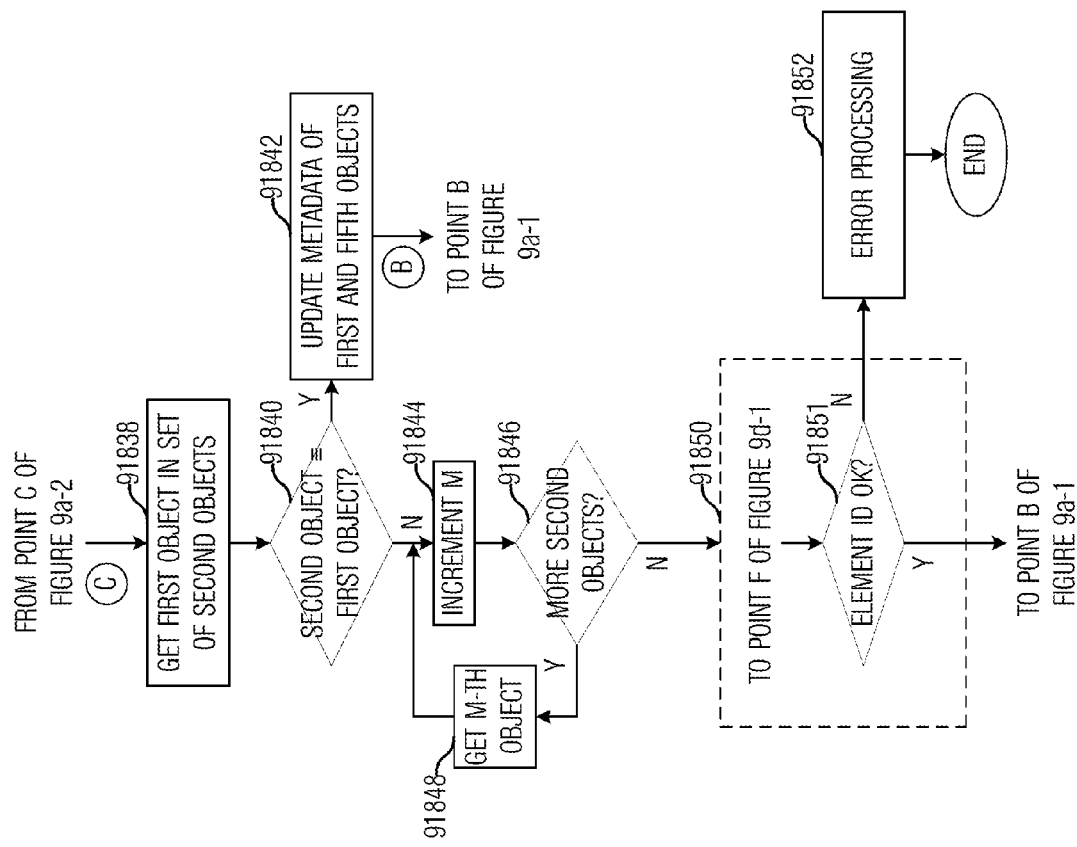

Referring now to FIG. 9a-1, the management entity receives the request to collect inventory data (block 902), just as in the previous case (block 602 of FIG. 6a). The request to collect inventory data is parsed in block 904. Producing a parse tree may, in general, be performed by a variety of different techniques. For the purposes of this invention, some amount of morphological and lexical processing (e.g., tokenization, part-of-speech tagging, inflection and derivation analysis), followed by syntactic analysis (e.g., term recognition and application of grammatical rules), is required. The management entity may then be able to perform a variety of semantic analyses, including named entity recognition and semantic role labeling.

Figure 9B:
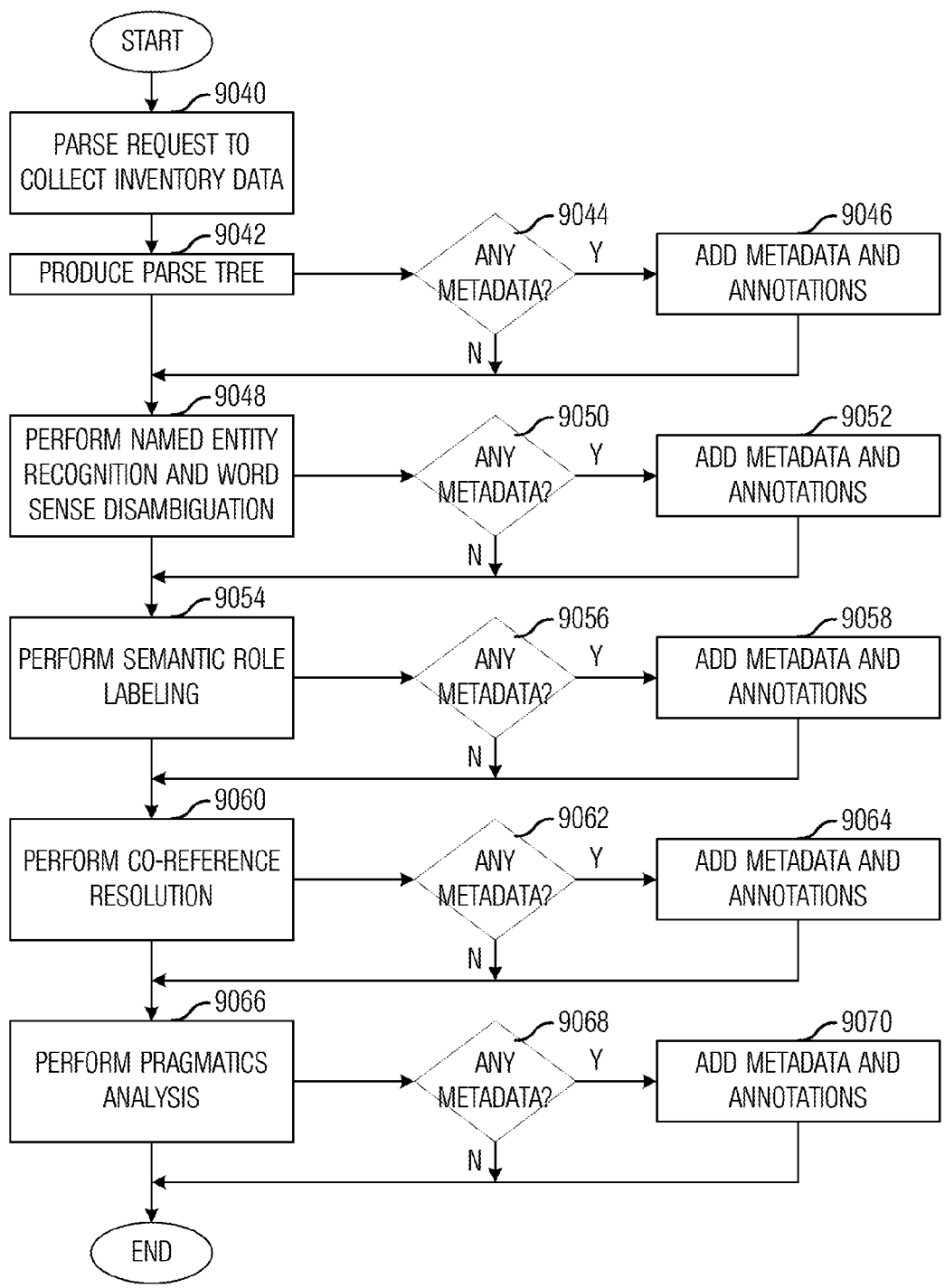
FIG. 9b illustrates an example flow diagram of operations occurring in a management entity as the management entity parses a request to collect inventory data according to example embodiments described herein.

Since there are a wide variety of techniques that can be applied to parse the request, a typical embodiment is described in FIG. 9b. Referring now to block 9040 of FIG.

9*b*, the request to collect inventory data is parsed (block 9040), producing a parse tree (block 9042). Any type of parse tree will suffice, though an example embodiment may use a constituency-based parse tree, where the grammar differentiates between terminal and non-terminal categories. The context when the parsing operation was started and completed, as well as any other data (e.g., special libraries or routines that were called by the parsing process in order for it to finish) are recorded as metadata and/or annotations (blocks 9044 and 9046). As an example, in the DEN-ng information model, an annotation is a type of metadata. However, other information models may choose to differentiate between metadata and annotations. If this is the case, both types of information are added in block 9046.

The management entity may perform named entity recognition (block 9048). Block 9048 may also include word sense disambiguation. In general, a named entity is an Entity that is an instance of a pre-defined category of interest, such as the name of a person, an organization, a location, or a date or time expression. Such Entities typically have special significance in a data collection operation. However, when occurring in free text, named entities can be very hard to recognize due to different variations in their declaration or use (e.g., "Dr. Smith" vs. "Harold" vs. "Harold Smith, Ph.D."), ambiguity (e.g., is "June" a Person or the name of a Month, or is "Washington" a Person or a Location), usage (e.g., "edge router" vs. "core router"), sentence structure (e.g., the presence or absence of different parts of speech, punctuation, spelling, spacing, and the like). Hence, different types of disambiguation may be required. These take the form of different processes, such as format detection, tokenization, sentence splitting, part of speech tagging, and others, some or all of which may be employed in block 9048. Once again, any metadata or annotations are detected (block 9050) and written (block 9052) as part of this process.

The management entity may perform semantic role labeling (block 9054). Semantic role labeling typically identifies constituents that fill a semantic role for each verb in a sentence (e.g., the arguments to a predicate). Typically, this can be a difficult task. An example embodiment uses a combination of a manual classifier augmented with various types of machine learning (e.g., for determining starting and ending positions for each argument that is associated with a verb), enabling supplemental linguistic information to be combined with linguistic and structural constraints by explicitly incorporating inferencing into the decision process. Once again, any metadata or annotations are detected (block 9056) and written (block 9058) as part of this process.

The management entity may perform co-reference resolution (block 9060). Co-reference resolution normally involves identifying entities that are related to each other in different sentences (e.g., "Find an edge router that has at least one congested port. Fix the port."). Once again, any metadata or annotations are detected (block 9062) and written (block 9064) as part of this process.

The management entity may perform pragmatics analysis (block 9066). Pragmatics analysis usually involves mapping a sentence to its intended meaning. This is most often done using a set of transformations that use a set of beliefs and goals. Once again, any metadata or annotations are detected (block 9068) and written (block 9070) as part of this process.

Referencing back to FIG. 9*a*-1, once the request has been parsed, the management entity may perform the requested data collection (block 906). While similar to the previous description for collecting data, this version has additional steps to enable the process to be able to recognize pieces of the data collected that cannot be immediately identified, and to perform additional processes on those unrecognizable pieces of data to ultimately identify them. Provision for recognizing new model elements not previously known to the management system is later described in FIGS. 9*a*-2 and 9*a*-3 and their attendant discussion.

Figures 1, 9C:
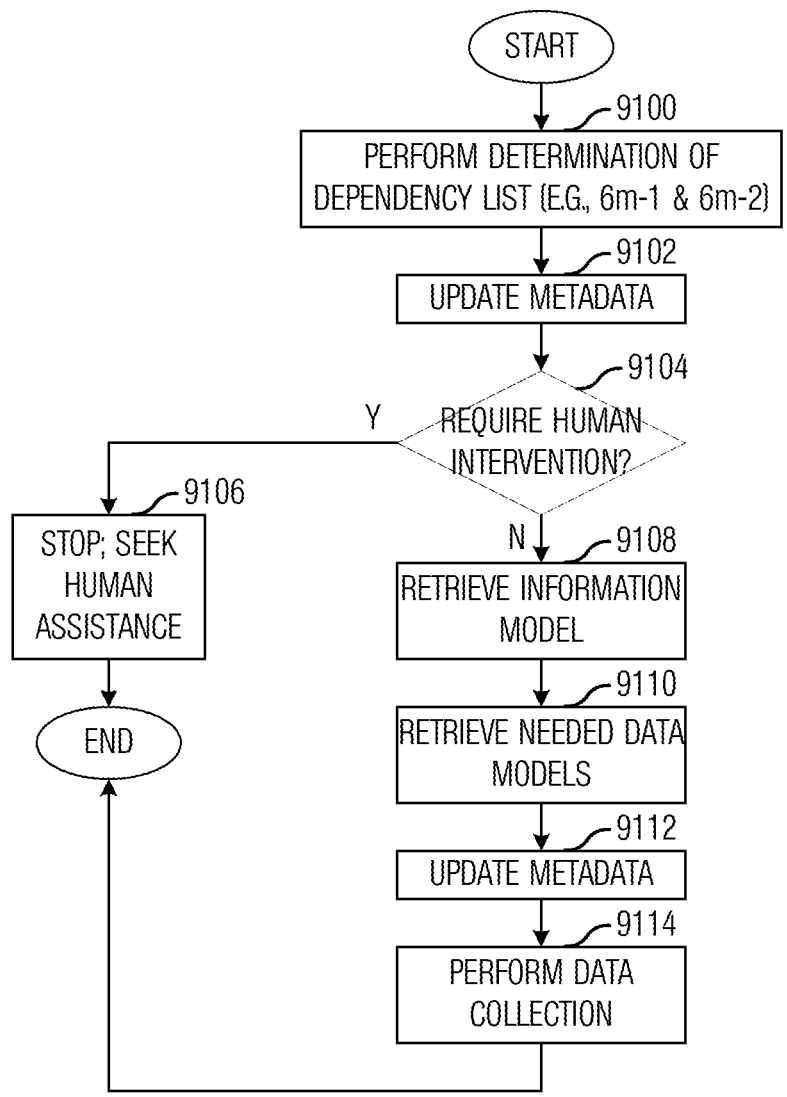
Figures 2, 9C:
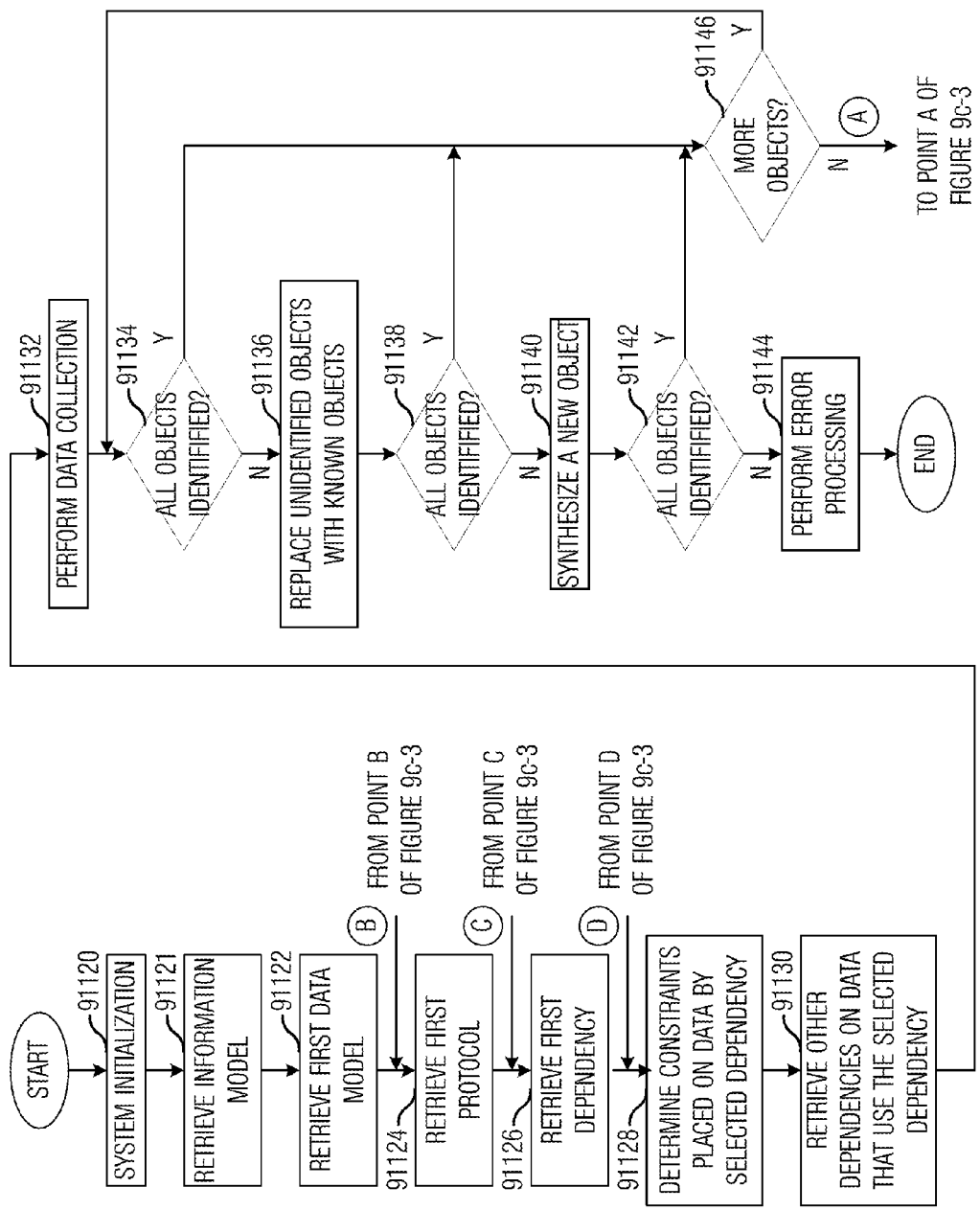
Figures 3, 9C:
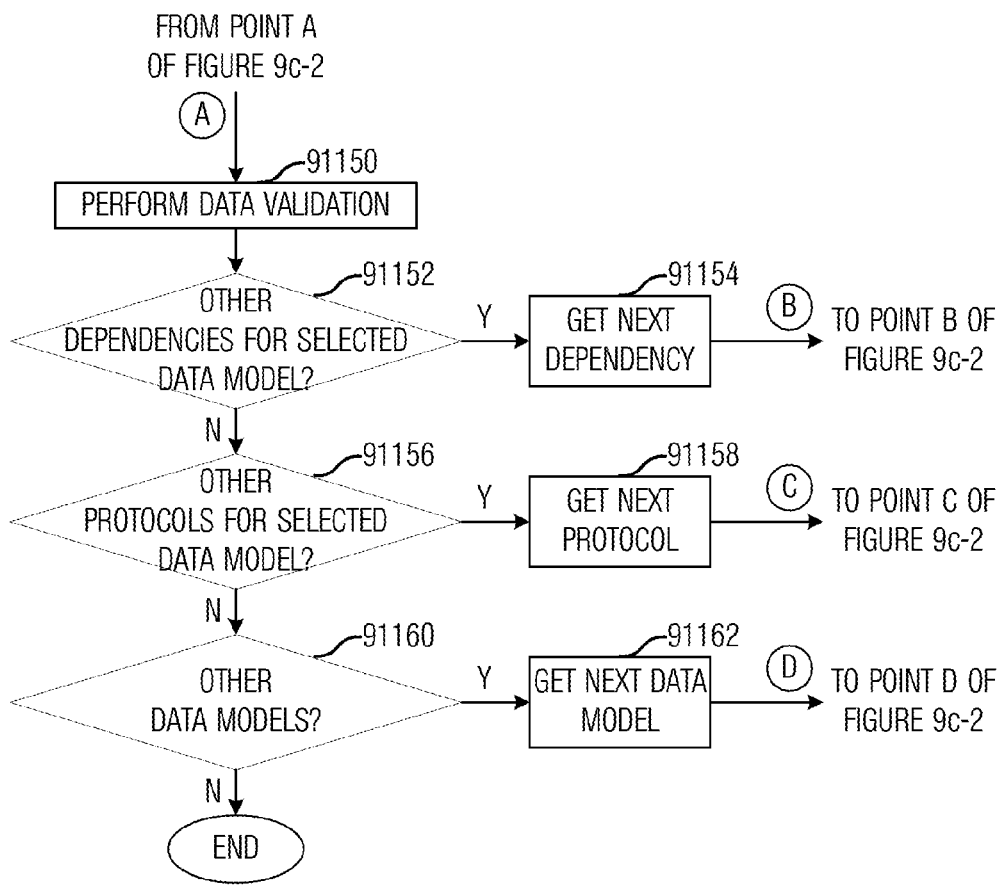

Referencing forward now to FIG. 9*c*-1, the first task required to collect data is to first determine any dependencies present between the data to be collected, protocol(s) used to collect the data, pre- and/or post-processing that must be done on some or all of the collected data, and/or pre- and/or post-storage that must be applied to some or all of the collected data (block 9100). Previously, FIGS. 6*m*-1 and 6*m*-2 described how to create a dependency list to accomplish the above tasks. This approach may be used as previously described by the management entity, as shown in block 9100 of FIG. 9*c*-1. All pertinent metadata is then updated (block 9102).

The management entity may then test to determine if human intervention is required (block 9104). For example, the data collection process may require some manual steps. If this is the case, then in block 9106, the management entity returns control to the user. The check may also allow for linking to additional processes and features not presently discussed. It is noted that it is possible that, after human intervention is performed, the data collection process may continue at one of the entry points described in FIG. 6*b*-1, FIGS. 6*c*-1 and 6*c*2, FIGS. 6*e*-1 through 6*g*, FIGS. 6*k*-1 through 6*m*-2, FIGS. 7*a*-1 through 7*b*, and FIGS. 9*a*-1 through 9*f*.

If human intervention is not required, the management entity may retrieve an information model for the communications system being inventoried (block 9108). As an example, the information model may be stored in a memory local to the management entity or a memory remote to the management entity, and the management entity may retrieve a subset of the information model from the memory. As another example, the information model may be retrieved from an entity coupled to the management entity.

The management entity may make use of the information model retrieved in block 9108 to determine specific data model(s) required to collect the data requested in block 9110. A detailed discussion of an embodiment is explained using FIGS. 6*e*-1 to 6*e*-10, as previously explained. The management entity may then update appropriate metadata with the results of how the set of data models to be used was determined; this may be of use later if the management entity determines that all or part of the data collected cannot be recognized. Metadata for all affected entities are updated in block 9112. This may complete the initialization of the data collection process. The management entity may then decide to collect data (block 9114), which is described in detail in FIGS. 9*c*-2 and 9*c*-3.

Referencing forward to block 91120 of FIG. 9*c*-2, where the management entity initializes mechanisms that are required to collect data for this collection request (block 91120). The management entity may retrieve the information model and the first data model of the list of data models to be used in blocks 91121 and 91122, respectively. The management entity uses the dependency list to retrieve the first protocol and first dependency in blocks 91124 and 91126, respectively. The management entity may determine the set of mandatory and optional constraints and other types of dependencies that are required to retrieve data of the current data type using the current protocol in blocks 91128 and 91130, respectively. At this point, the management entity is ready to collect data (block 91132). It is noted that the management entity may choose to collect data one datum at a time, or collect data as a stream from a particular source, or collect data until an error is detected, or employ other approaches, or as a combination of approaches. The mechanics of the data collection process was previously explained using FIGS. 5, 6*a*, 6*b*-1, 6*b*-2, and 6*f*.

The management entity may check to ensure that all objects have been identified (block 91134). Alternatively, the management entity may check each object as it is collected, or groups of objects, or any combination, to ensure that it can identify the object. Recognizing that some objects are inherently ambiguous until the context of their usage, execution, configuration, monitoring, and/or other factors are completely understood, the management entity may elect to collect data and identify each datum in stages; this enables the management entity to use knowledge that it is gathering and/or inferring during the data collection process to help it identify data.

If the management entity can identify the object(s), it may then check to see if more objects need to be identified (block 91146). If more objects need to be identified, the management entity returns to block 91134. Otherwise, if the management entity cannot identify one or more objects, then it may elect to identify each recognizable object with one or more methods. If the one or more methods are successful in identifying the object, then the management entity may choose to either directly replace each set of unidentified objects with at least one identified object (block 91136), or it may elect to create a new object (or set of objects) (block 91140). This is a complex process, and may be performed in a variety of ways. An example embodiment for the replacement process is described in FIGS. 9*d*-1, 9*d*-2, and 9*d*-3. An example process for the generation process is described in FIGS. 9*e*-1 and 9*e*-2.

Figures 1, 9D:
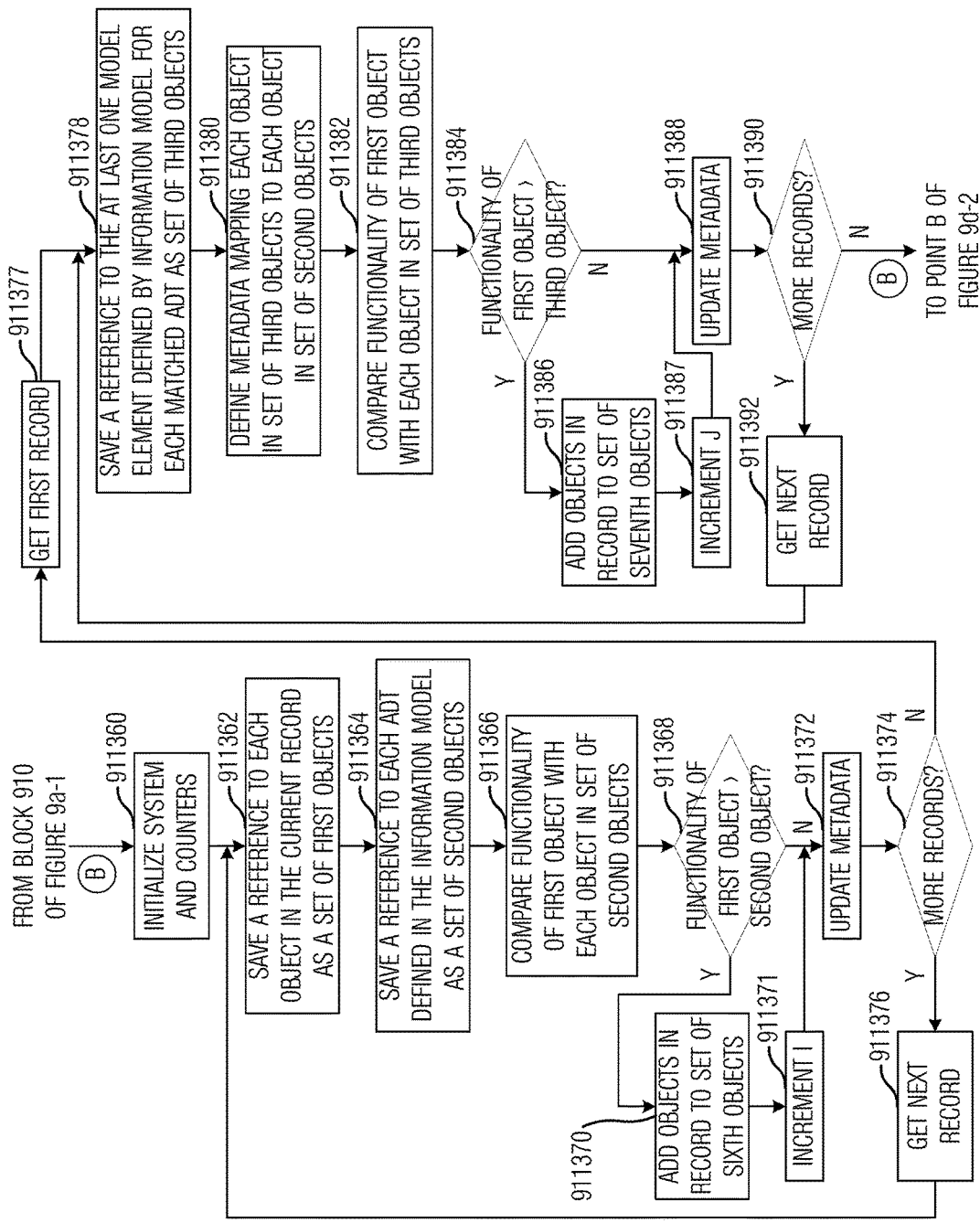
Figures 2, 9D:
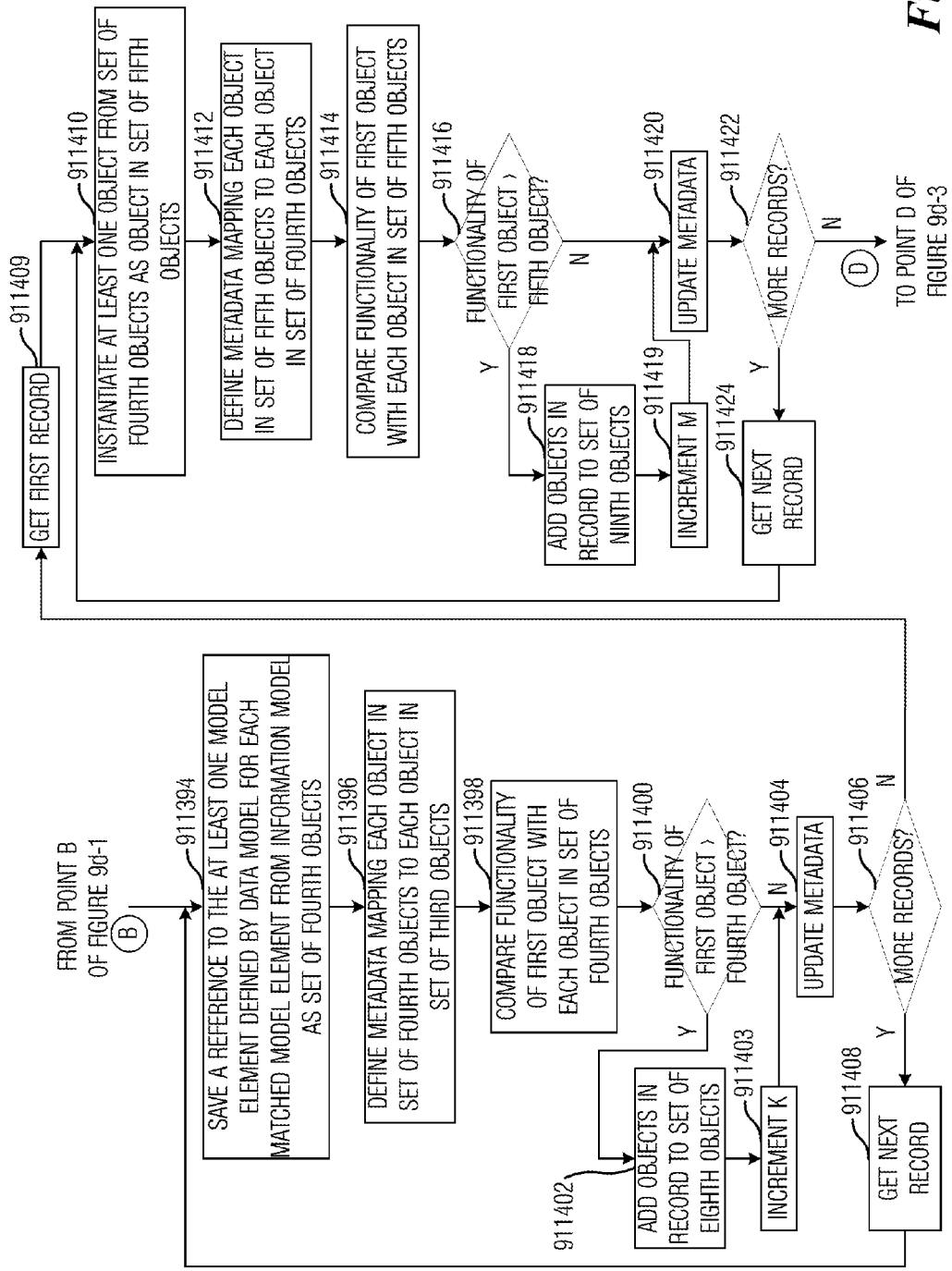
Figures 3, 9D:
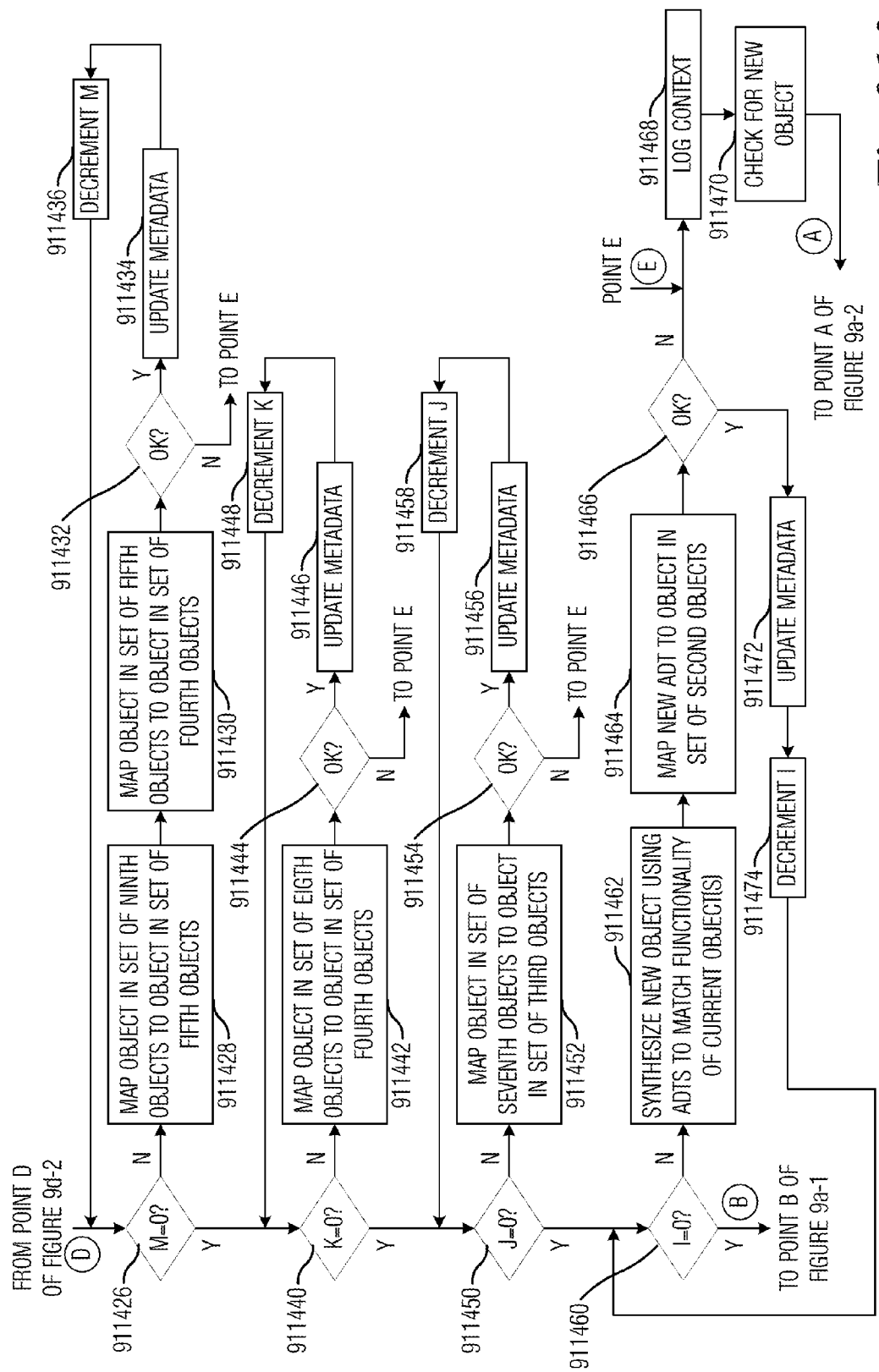

Referencing forward to block 911360 of FIG. 9*d*-1, the management entity decides how to replace an unidentified object with a set of known objects by first, identifying the unidentified object at increasingly more detailed levels of abstraction and second, successively matching the functionality of the unidentified object to known model elements and objects. The management entity first initializes the system to prepare for replacing unidentified objects with currently known objects (block 911360). The data collected may be in the form of a discrete set of objects that may contain attributes, a set of individual attributes that have direct or indirect pointers to an object, or in other formats. In addition, the data collected may have missing data, or data not properly ordered, or data fragmented into different pieces, or the like. Hence, an example embodiment will treat the data collected as a set of records, where each record can be a part of a datum (e.g., a piece of an attribute), a full datum (e.g., an attribute), a set of data (e.g., a set of related attributes), an object (e.g., an instance derived from a class, with or without attributes and other model elements), a set of objects, and the like. For simplicity, all of these forms will be termed a "record".

The management entity may save a reference to each object in the current record of the collected data as a set of first objects (block 911362). Similarly, the management entity may save a reference to each ADT defined in the information model as a set of second objects (block 911364). The management entity may compare the functionality present in the set of first objects with the functionality that is specified in the set of second objects (block 911366). Put another way, the management entity tries to match the functionality specified by an ADT to the functionality presented by the collected data. Examples of this matching include specifying the characteristics (via attributes) and behavior (via attributes, relationships, and/or constraints) of an object. If the functionality of the current record is not equal to, or a proper subset of, the functionality specified by the ADT (block 911368), the current record exhibits functionality that is not completely matched by any ADT. Hence, the management entity may conclude that there is at least one object that cannot be recognized in the current record. In this case, the management entity adds all objects that are part of the current record to a set of sixth objects (block 911370), increments a counter i for each added object (block 911371) to record the fact that i new objects have been found that do not match any known ADTs, and then updates appropriate metadata (block 911372) to record this conclusion in the set of sixth objects. Otherwise, if the functionality of the current record is equal to, or a proper subset of, the functionality specified by the ADT, the management entity can then conclude that the set of objects comprising the current record are all recognized. The management entity then records this fact by updating the metadata associated with the identified object (block 911372).

The management entity may check to see if additional records need to be analyzed (block 911374). If so, then the next record is retrieved (block 911376), and control is returned to block 911362 to repeat the analysis process. If not, then the management entity is ready to continue the identification process by attempting to derive at least one model element from the information model that corresponds to the ADT of the information model that matched the previously unidentified objects (in the set of first objects). The previous step identified, in abstract terms, the functionality that the collected data exhibits by matching the collected data to at least one ADT. This is now codified by mapping each matched ADT to at least one model element from the information model. This enables the collected data to be more precisely identified by breaking the data into model elements (e.g., classes, attributes, constraints, and relationships). The matching process may involve taking each element specified by the ADT (e.g., an attribute, or a state value, or a relationship, or an action, and the like) and mapping it to a ManageableEntity, or a set of ManageableEntities. In addition, due to context and data possibly arriving out of order, fragmented, containing errors, and/or missing, the management entity may choose to examine the data using groups of different objects represent different parts of the collected data.

Accordingly, the management system retrieves the first record in the set of first objects (block 911377), since it has previously processed all of the data collected in the previous loop when it matched objects in the set of first objects to ADTs. The management entity then retrieves the first matched ADT from the previous step and saves a reference to the at least one model element defined in the information model that corresponds to the at least one matched ADT as a set of third objects (block 911378). The mapping between the at least one matched ADT in the set of second objects and the at least one model element in the information model (i.e., objects in the set of third objects) for this record is then written as metadata (block 911380). The management entity may compare the functionality present in the current record with the functionality that is specified in the set of third objects (block 911382). The management entity tries to match the functionality specified by a set of model elements from the information model (that correspond to the previously matched ADT) to the functionality presented by the collected data. If the functionality of the current record is not equal to, or a proper subset of, the functionality specified by the at least one model element (block 911384), then the management entity may conclude that there is at least one object that cannot be recognized in the current record. Since an ADT was previously recognized, this likely means that a new model element needs to be created, or that an existing model element needs to be extended (e.g., by subclassing, or by adding a new relationship, or both). An example process for this case is described after this discussion using FIGS. 9a-1-9f.

If the functionality of the current record is not equal to, or a proper subset of, the functionality specified by the at least one model element of the information model, the management entity adds all objects that are part of the current record to a set of seventh objects (block 911386), increments a counter j for each added object (block 911387) to record the fact that j new objects have been found that match at least one ADT but do not match any known model elements from the information model, and then updates appropriate metadata (block 911388) to record this conclusion in the set of seventh objects. Otherwise, if the functionality of the current record is equal to, or a proper subset of, the functionality specified by the at least one model element (in the information model) that matches the at least one ADT, the management entity can conclude that the set of objects comprising the current record are all recognized and furthermore, that they currently exist as a formal part of the information model. In other words, the previous test (block 911374) showed that the information model is capable of representing the current record. However, it did not prove that at least one model element form the information model currently exists that can represent this functionality—it only proved that this functionality may be represented using one or more ADTs that were used to build the information model. This in turn means that a data model object could not be instantiated to represent this functionality, which is why the object is currently not able to be identified (i.e., there are no instantiated object instances that can be compared to the part of the collected data being examined). This test (block 911384) shows that the current record is, in fact, a part of the information model. However, a test still needs to be performed to determine if the current data model defines at least one model element to implement this functionality.

The management entity may test to determine if more records need to be analyzed (block 911390). If so, then the next record is retrieved (block 911392) and execution continues at block 911378. If not, then control is passed to point B (block 911394) of FIG. 9d-2. In this part of the technique for replacing unidentified objects with known objects, the management entity may try and map each model element from the information model that matched the set of ADTs (which matched the functionality of the collected data) to at least one model element from at least one data model. This test proves that at least one of the data models currently being used has at least one object defined that corresponds to the functionality of the collected data that are currently being analyzed. Hence, the most likely reason that the current record is not recognized is that the at least one model element from the at least one data model has not been instantiated.

Accordingly, the management entity saves a reference to the at least one model element defined by the at least one data model being used in the data collection process to a set of fourth objects in block 911394, where the at least one model element of the at least one data model corresponds to the at least one model element of the information model that was derived from the at least one ADT that matched the functionality of the current record (in the set of first objects). Metadata is defined that records the mappings from the at least one object in the set of fourth objects to the at least one object in the set of third objects (block 911396). The management entity may compare the functionality of the at least one model element in the data model (in the set of fourth objects) with the current record (i.e., the at least one object in the set of first objects) in block 911398. If the functionality of the current record is not equal to, or a proper subset of, the functionality specified by the at least one object in the set of fourth objects (block 911400), the management entity adds all objects that are part of the current record to a set of eighth objects (block 911402), increments a counter k for each added object (block 911403) to record the fact that k new objects have been found that match both at least one ADT as well as at least one model element from the information model, but do not match any known model elements from the data model, and then updates appropriate metadata (block 911404) to record this conclusion in the set of eighth objects. Otherwise, if the functionality of the current record is equal to, or a proper subset of, the functionality specified by the at least one model element (from the set of fourth objects), the management entity can conclude that the set of objects comprising the current record are all recognized and furthermore, that they are a formal part of at least one data model. In other words, the previous test (block 911384) shows that the information model is capable of representing the current record, but did not prove that model elements exist that can be instantiated to represent it. This test (block 911400) shows that the current record is, in fact, a part of at least one data model. As such, this test also shows that the at least one data model can instantiate an object that will match the functionality of the collected data that is currently being analyzed.

The management entity may test to see if more records need to be analyzed (block 911406). If so, then the next record is retrieved (block 911408) and execution continues at block 911394. If not, then the first record of the collected data is once again retrieved (block 911409), and a final test is started. This test attempts to match the current record to at least one instantiated object from at least one of the data models being used.

Accordingly, the management entity instantiates at least one object from the at least one model element defined by the at least one data model being used in the data collection process to a set of fifth objects in block 911410, where the at least one instantiated object is derived from the at least one model element of the at least one data model, and where the at least one model element of the at least one data model corresponds to the at least one model element of the information model that matched the functionality of the at least one ADT, which in turn matched the functionality of the current record (in the set of first objects). Metadata is defined that records the mappings from the at least one object in the set of fifth objects to the at least one object in the set of fourth objects (block 911412). The management entity may compare the functionality of the at least one instantiated object in the set of fifth objects with the current record (i.e., the at least one object in the set of first objects) in block 911414. If the functionality of the current record is not equal to, or a proper subset of, the functionality specified by the at least one object in the set of fifth objects (block 911416), the management entity adds all objects that are part of the current record to a set of ninth objects (block 911418), increments a counter m for each added object (block 911419) to record the fact that m new objects have been found that match at least one ADT, at least one model element from the information model, and at least one model element from the data model, but do not match any currently instantiated objects. This information is updated in the appropriate metadata (block 911420) to record this conclusion in the set of ninth objects. Otherwise, if the functionality of the current record is equal to, or a proper subset of, the functionality specified by the at least one model element (from the set of fourth objects), the management entity can conclude that the set of objects comprising the current record are all recognized and furthermore, that they are a formal part of at least one data model. In other words, the previous test (block 911400) shows that the data model is capable of representing the current record, but did not prove that such an object had been instantiated. This test (block 911416) shows that the current record is, in fact, a part of at least one data model and has been instantiated.

The management entity may then test to see if more records need to be analyzed (block 911422). If so, then the next record is retrieved (block 911424) and execution continues at block 911410. If not, then execution continues at point C (block 911426) of FIG. 9d-3.

This final part of this technique iterates through the previous decisions by using the set of four counters (i, j, k, and m) to try to recognize, as far as possible, each object in each record of the collected data. This is done by having the management entity check to ensure that the most concretely recognized object can be mapped to the next level of abstraction. Specifically, it performs four checks in the following order:

1) a given instantiated object (in the set of ninth objects) can be mapped to at least one object that is instantiated from at least one known model element from at least one data model (in the set of fourth objects);

2) a given object that previously did not match any model element from any data model (in the set of eighth objects) can be mapped to at least one model element from at least one data model (in the set of fourth objects);

3) a given object that previously did not match any model element from the information model (in the set of seventh objects) can be mapped to at least one model element from the information model (in the set of third objects); and 4) a given object that previously did not match any ADTs from the information model (in the set of sixth objects) can be mapped to at least one new ADT that can be derived from the information model (in the set of second objects).

Accordingly, in block 911426, the value of the m counter is tested. If it is equal to 0, then execution proceeds to block 911440. Otherwise, the management entity maps the at least one object that originally did not match any instantiated objects in any of the data models being used (i.e., an object in the set of ninth objects) to an instantiated object from at least one of the data models (i.e., an object in the set of fifth objects) (block 911428). The instantiated object is then mapped to at least one model element in at least one of the data models being used (i.e., an object in the set of fourth objects) (block 911430). If the result of both of these mappings is OK (block 911432), then the metadata for all affected objects are updated (block 911434), the m counter is decremented (block 911436), and control is returned to block 911426. Otherwise, the context is logged (block 911468) and error processing is started (block 911470). The result of the error processing will determine whether this technique continues or is terminated.

In block 911440, the value of the k counter is tested. If it is equal to 0, then execution proceeds to block 911450. Otherwise, the management entity maps the at least one object that originally did not match any model elements in any of the data models being used (i.e., an object in the set of eighth objects) to at least one model element from at least one of the data models (i.e., an object in the set of fourth objects) (block 911442). If the result of this mapping is OK (block 911444), then the metadata for all affected objects are updated (block 911446), the k counter is decremented (block 911448), and control is returned to block 911440. Otherwise, the context is logged (block 911468) and error processing is started (block 911470). The result of the error processing will determine whether this technique continues or is terminated.

In block 911450, the value of the j counter is tested. If it is equal to 0, then execution proceeds to block 911460. Otherwise, the management entity maps the at least one object that originally did not match any model elements in the information model (i.e., an object in the set of seventh objects) to at least one model element from the information model (i.e., an object in the set of third objects) (block 911452). If the result of this mapping is OK (block 911454), then the metadata for all affected objects are updated (block 911456), the j counter is decremented (block 911458), and control is returned to block 911450. Otherwise, the context is logged (block 911468) and error processing is started (block 911470). The result of the error processing will determine whether this technique continues or is terminated.

In block 911460, the value of the i counter is tested. If it is equal to 0, then this technique is completed, and execution is returned to block 91138 in FIG. 9c-2. (It is noted that this corresponds to blocks 908 and 910 of FIG. 9a-1). Otherwise, the management entity maps the at least one newly synthesized ADT from block 911462 (i.e., an object in the set of sixth objects) into the information model (block 911464). If the result of this mapping is OK (block 911466), then the metadata for all affected objects are updated (block 911472), the i counter is decremented (block 911474), and control is returned to block 911460. Otherwise, the context is logged (block 911468) and error processing is started (block 911470). The result of the error processing will determine whether this technique continues or is terminated.

Referencing back to block 91138 in FIG. 9c-2, the management entity tests to ensure that all objects have been identified. This is necessary because the preceding test in block 91134 only checks for existing objects (except for the case of synthesizing a new ADT). Hence, the management entity in block 91140 tries to synthesize a new object for each unrecognized object found. It is noted that this corresponds to blocks 912 and 914 of FIG. 9a-1. Since there are many ways to perform this task, one example solution is shown using FIGS. 9e-1 and 9e-2.

Figures 1, 9E:
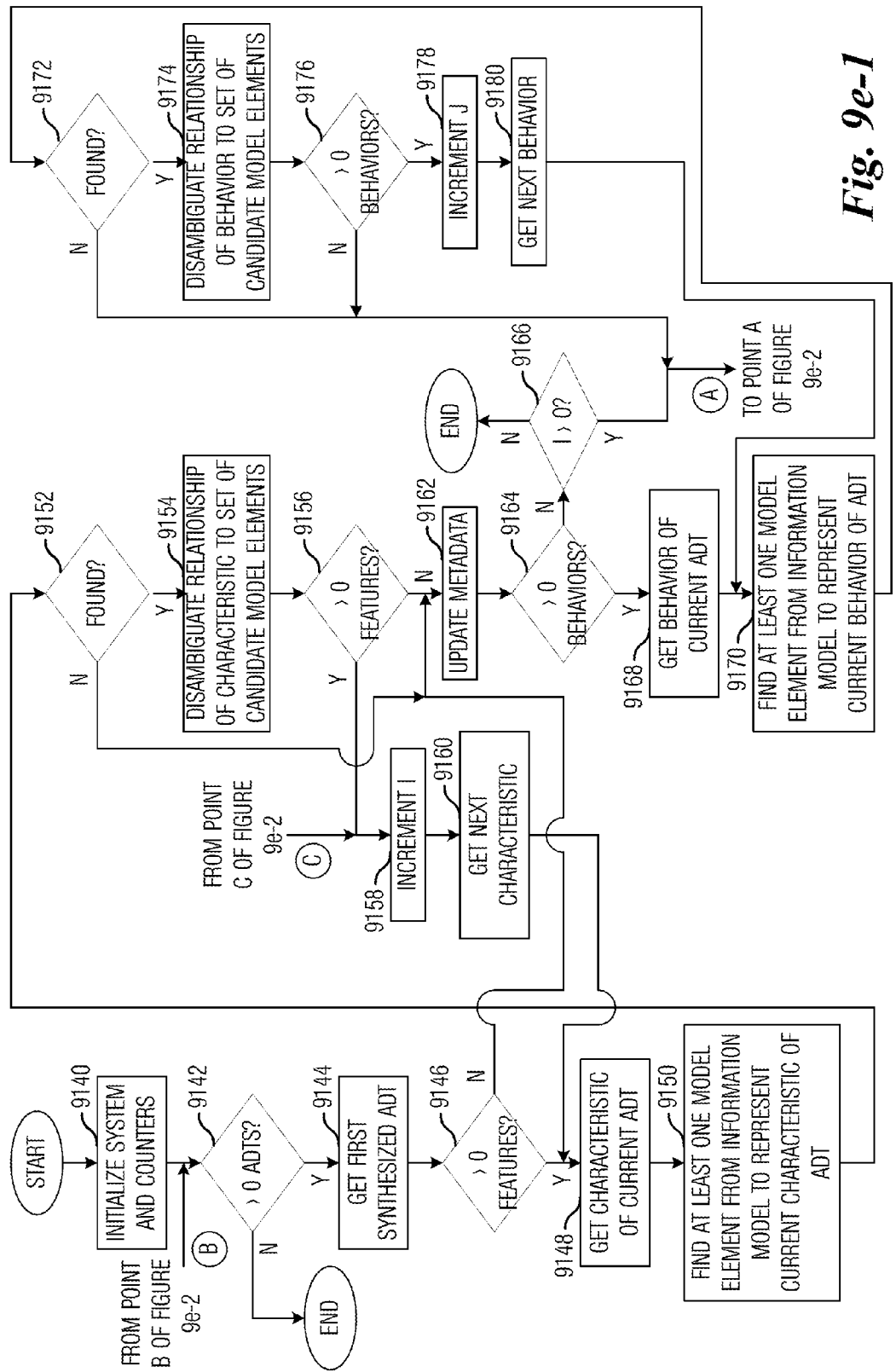
Figures 2, 9E:
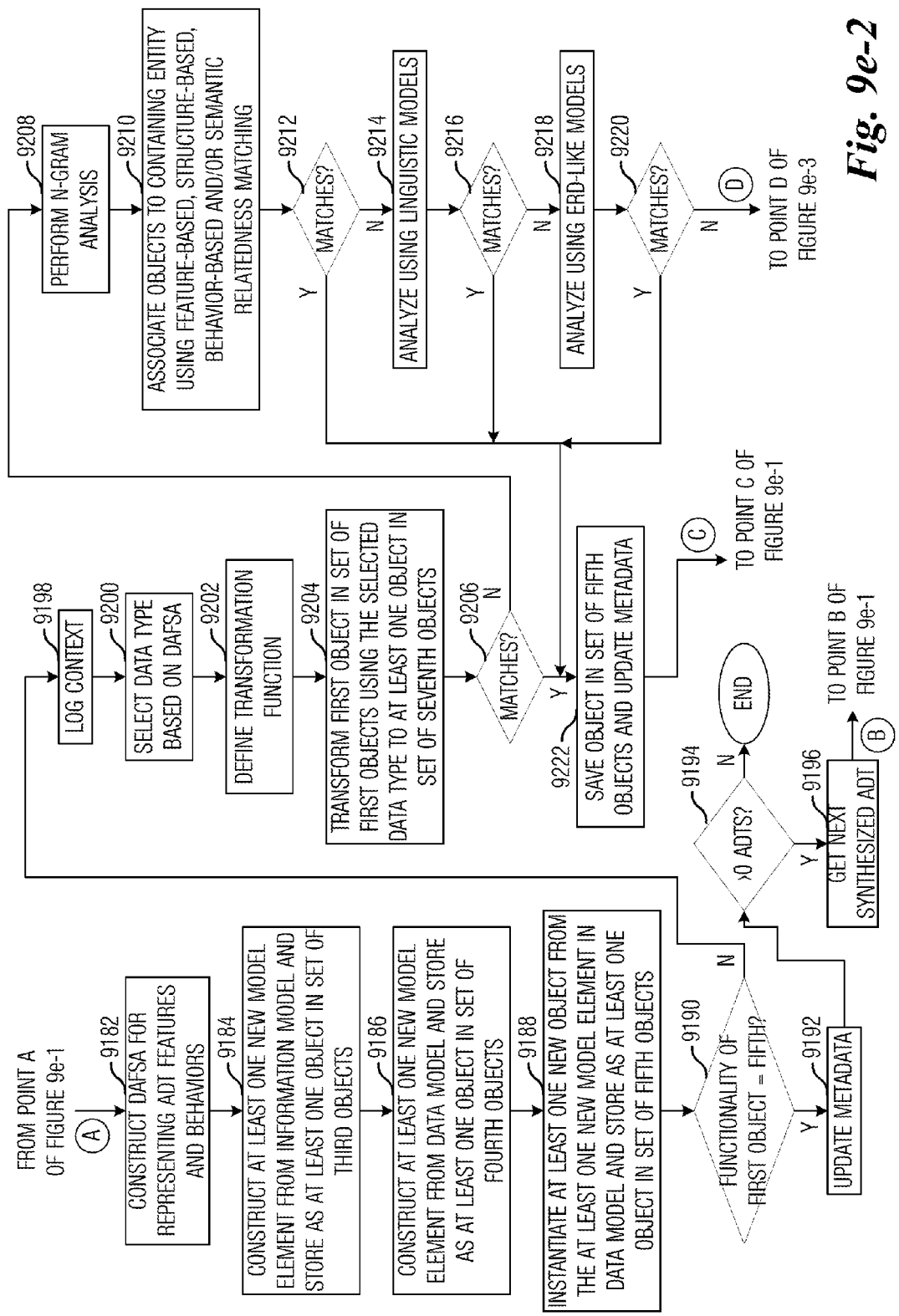
Figures 3, 9E:
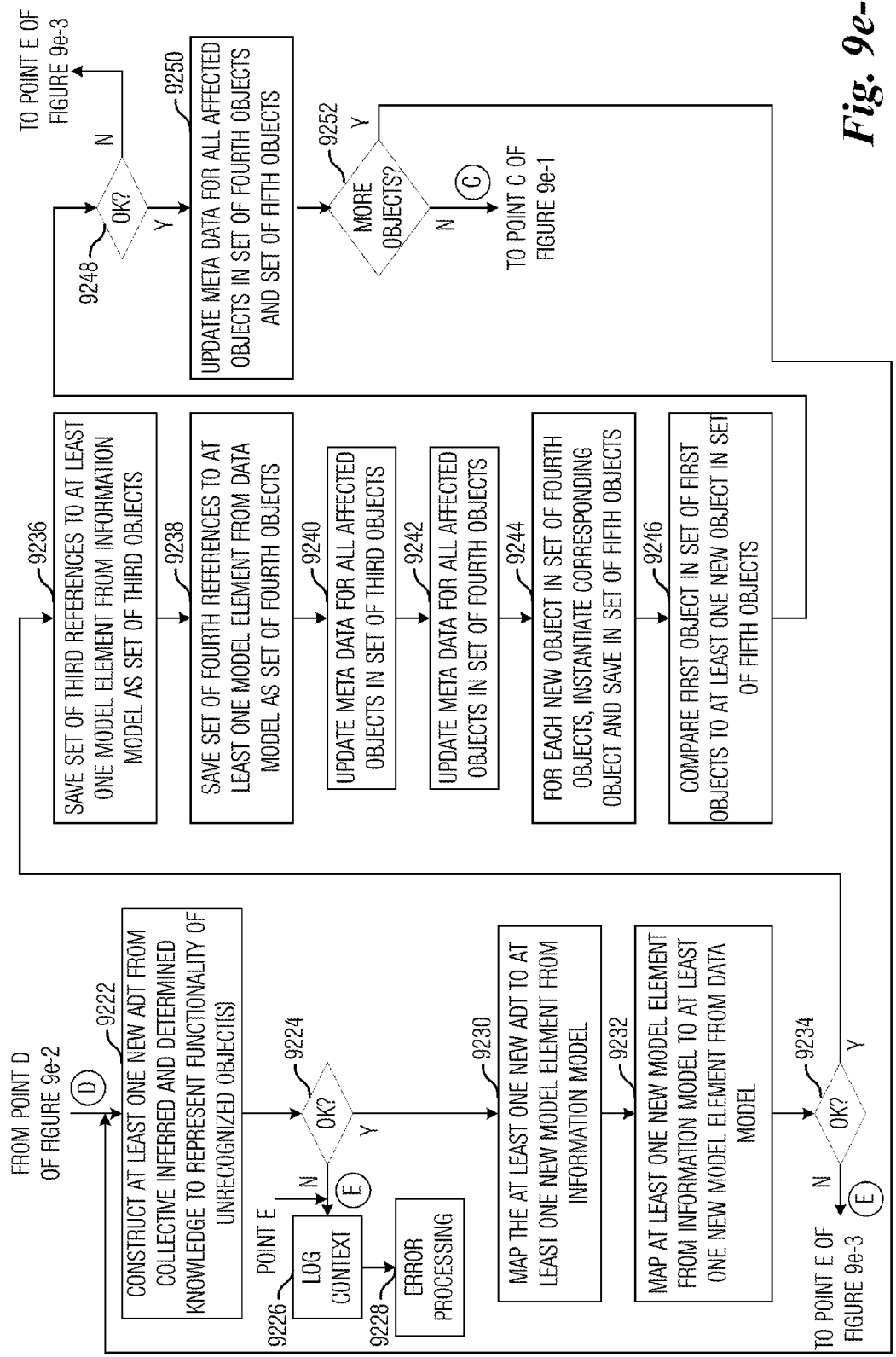

Referencing forward to block 9140 in FIG. 9e-1, the management entity may initialize the system in preparation for attempting to synthesize new objects (block 9140). The management entity checks to see if at least one (synthesized) ADT is present (block 9142). If not, this technique ends. If so, then in block 9144, the first synthesized ADT is retrieved. Since an ADT is an abstract concept, it may define zero or more attributes and zero or more behaviors, with the constraint that at least one attribute or one behavior is defined by the ADT. Therefore, in block 9146, a check is made to see if the current synthesized ADT defines any attributes. If not, control is passed to block 9162, where this is recorded as part of the metadata for this ADT. Otherwise, the management entity continues to block 9148, where it retrieves the first characteristic (i.e., attribute or constraint) of the current synthesized ADT. The management entity attempts to find at least one model element from the information model to represent the current characteristic of the ADT (block 9150). The management entity may check to see if at least one model element from the information model was found (block 9152). If not, control is passed to block 9162, where this is recorded as part of the metadata for this ADT. Otherwise, execution continues with block 9154, which attempts to disambiguate the relationship of the current characteristic to the set of model elements that could contain this characteristic. For example, if the characteristic was the name of a host computer, then a number of different object classes, such as Computer, Device, WebServer, and others, could contain that particular attribute. Hence, block 9154 uses the knowledge that it currently has about the collected data, along with the knowledge inherent in the information model, to deduce or infer if that characteristic can be associated with one particular object class (block 9156). If this was unsuccessful (i.e., if the number of object classes found was not exactly one), control is passed to block 9162, where this is recorded as part of the metadata for this ADT. Otherwise, execution continues with block 9158, where the counter i is incremented. The management entity then gets the next characteristic (block 9160) and control is returned to block 9148.

Once all characteristics of the synthesized ADT are defined, the metadata for the ADT and affected model elements is updated in block 9162. In block 9164, the management entity checks to see if the synthesized ADT defines any behaviors. If not and i is equal to 0 (block 9166), then this technique ends, and control is passed back to block 91142 in FIG. 9c-2. It should be noted that this identified an ADT used for classification purposes only, and hence is completely abstract. Otherwise, if there are no behaviors defined by this synthesized ADT, then control is passed to point A (block 9182) of FIG. 9e-2 for further processing. Otherwise, if there is at least one behavior (block 9164), execution continues with block 9168, where the management entity retrieves the first behavior defined in the current synthesized ADT. The management entity attempts to find at least one model element from the information model to represent the behavior defined in the current synthesized ADT (block 9170). The management entity checks to see if at least one model element from the information model was found (block 9172). If not, then control is passed to point A of FIG. 9e-2 (block 9182). Otherwise, if there is at least one model element from the information model that was found, the management entity continues with block 9174, which disambiguates the relationship of the current behavior to the set of model elements that could contain this behavior. For example, if the ADT specifies that a model element must have a particular attribute, and the only way to satisfy this requirement is to use a relationship to associate, aggregate, or composite two model elements together, then this could be inferred by the management entity, and used to satisfy this particular requirement. Hence, block 9174 uses the knowledge that it currently has about the collected data, along with the knowledge inherent in the information model, to deduce or infer if this behavior can be satisfied using at least one model element from the information model. If this was unsuccessful (block 9176), control is passed to point A (block 9182) of FIG. 9e-2. Otherwise, execution continues with block 9178, where the counter j is incremented. The management entity then gets the next behavior (block 9180) and control is returned to block 9170.

In block 9182 of FIG. 9e-2, a deterministic acyclic finite state automaton (DAFSA), also referred to as a directed acyclic word graph (DAWG), is defined for representing the characteristics and behavior of the synthesized ADT (block 9182). Generally, a DAFSA is a data structure that (typically) represents a set of strings, and enables query operations to efficiently test whether a given string belongs to the data structure in time proportional to its length. In these respects, a DAFSA is very similar to a trie, but it is much more space efficient. However, it should be noted that the example embodiments presented herein can use a DAFSA, a trie, or any other suitable data structure, as long as the functionality described herein can be met.

At least one new model element is then constructed in accordance with the DAFSA (or data structure of equivalent functionality). The at least one new model element is stored as at least one new object in the set of third objects (block 9184). Similarly, at least one new data model element from at least one data model that is currently being used is constructed and stored in the set of fourth objects (block 9186). This enables the management entity to instantiate at least one new object from the at least one new model element from the at least one data model, and store this at least one instantiated object as at least one object in the set of fifth objects (block 9188).

The management entity may then verify that the functionality of the newly instantiated object in the set of fifth objects equals the functionality of the record currently being analyzed (block 9190). If so, then the metadata for all affected objects (i.e., any objects in the set of second objects (ADTs), any objects in the set of third objects (model elements from the information model), any objects in the set of fourth objects (model elements from any one of the data models) and any objects in the set of fifth objects (object instances)) are updated (block 9192) and a check is made to see if there are any more synthesized ADTs that need analysis. If not, then this technique ends, and control is returned back to block 91142 in FIG. 9c-2. Otherwise, execution continues with block 9196, where the next synthesized ADT is retrieved. Control is then passed to point B (block 9142) in FIG. 9e-1.

If the functionality of the first object does not equal the functionality of the newly synthesized object, then the context is logged (block 9198), and a set of alternative techniques are attempted in order of increasing complexity. First, data type substitution is tried. Accordingly, in block 9200, a data type is selected based on the DAFSA, and a transformation function is defined (block 9202) to transform the first object to a new object using data type substitution. It should be noted that this step may chain transformations together in the case of complex object construction (e.g., an attribute that is in reality an object that has its own attributes, relationships, and behavior) as well as in the case of constructing complex transformations (e.g., it is typically simpler, and more effective, to construct a complex transformation as a set of simpler transformations; this also encourages reuse of the set of simpler transformations). This may solve cases where an existing model element defines an attribute of one data type (e.g., an integer) but higher precision is specified by the newly synthesized ADT (e.g., a floating point number). The result of this transformation is checked in block 9204. If the match is successful (block 9206), the metadata for all affected objects is updated in block 9224 and control is passed to point C (block 9158) in FIG. 9e-1. Otherwise, n-gram analysis is attempted in block 9208.

Generally, an n-gram is a contiguous sequence of n items from a given sequence of text or speech. Typically, a n-gram is a combination of letters. However, n-grams that use lexemes, morphemes, phonemes, syllables, or other components of a given language can also be used. For the purposes of the example embodiments, n-gram based approaches are used to encode the likelihood that a word or phrase will appear in the future. An example embodiment is shown in FIG. 9f.

Referencing forward from block 9208 in FIG. 9e-2 to block 92000 in FIG. 9f, the management entity retrieves the first synthesized ADT (block 92000). It retrieves pre-defined n-gram weights (block 92002), which can be used to better adjust the stochastic model being used. Alternatively, other approaches, such as repetition of lexemes and morphemes, may be used instead of or in addition to the weighted approach as appropriate. The collected data is analyzed in block 92004. The output of the n-gram analysis can be measured by several different mechanisms. One example method is to define a set of profiles that categorize expected words or phrases, and then compare the profile for the collected data to the set of category profiles. The set of differences between n-grams of any single category profile and the profile for the collected data can be defined as the distance between that category and the collected data (block 92006). The distance is one type of semantic relatedness function. Other examples can be defined as well. As an example, different sets of collected data can be represented as a vector, with values of term weights used for each n-gram. Inverse document frequency (IDF), which is a measure of how important a given n-gram is for categorizing the text in an item, can be used to reduce the dimension of the vector space.

Blocks 92008 and 92010 are example mechanisms, and represent the use of at least two different measurements (both based on n-grams) to categorize the data collected. If no matches are found (block 92012), the context is logged in block 92030 and appropriate error processing is executed (block 92032). Otherwise, the synthesized ADT can be classified and stored in a set of second objects (block 92014). This enables at least one new model element, defined in the information model, to be constructed by using the definition of the synthesized ADT. The at least one new model element is then stored as at least one object in the set of third objects (block 92016). Given at least one new model element from the information model, at least one new model element from at least one data model can be constructed. The at least one new model element from the at least one data model is stored as at least one object in a set of fourth objects (block 92018). This new object can be instantiated and stored as at least one object in the set of fifth objects (block 92020), which enables the management entity to compare the characteristics and behavior of the at least one instantiated object with the synthesized ADT (block 92022). If the two are not equal, the context is logged and error processing is initiated (blocks 92030' and 92032', respectively). It is noted that blocks 92030' and 92032' may be the same as blocks 92030 and 92032. However, they are labeled differently to prevent confusion. Otherwise, the metadata of all affected objects (i.e., any objects in the set of second objects (ADTs), any objects in the set of third objects (model elements from the information model), any objects in the set of fourth objects (model elements from any one of the data models), and any objects in the set of fifth objects (object instances)) is updated (block 92024). The management entity may check to see if any more synthesized ADTs exist (block 92026). If not, then this technique terminates, and control is returned to block 9210 in FIG. 9e-2. Otherwise, the next synthesized ADT is retrieved (block 92028), and control is returned in block 92002.

Referring back to block 9210 in FIG. 9e-2, the management entity may use one or more mechanisms, including feature-based matching, structure-based matching, behavior-based matching, semantic relatedness matching, and the like, to further classify the collected data (block 9210). Specifically, these mechanisms enable the characteristics and behavior of the newly synthesized object to be better understood, so that a more complete definition of it can be computed. As an example, these different types of matching mechanisms may find additional model elements, such as relationships or constraints, which apply to the newly synthesized object. The management entity may check the results of the application of one or more of the matching methods in block 9212. If there are matches, then the metadata of all affected objects are updated in block 9224, and execution is passed to point C in FIG. 9e-1 (i.e., block 9158). Otherwise, execution continues to block 9214, where linguistic models are used to synthesize the object. This block represents a set of computational linguistic approaches that can be used to classify and mine specific text using language models. The management entity may check the results of the application of one or more of the matching methods in block 9216. If there are matches, then the metadata of all affected objects are updated in block 9224, and execution is passed to point C in FIG. 9e-1 (i.e., block 9158). Otherwise, execution continues to block 9218, where domain-specific models are used to validate the synthesized object. This block represents a set of approaches, such as Entity Relationship Diagrams (ERDs), which provide domain-specific knowledge that can be used to more precisely model entities that are expected to be present in the collected data. The management entity may check the results of the application of one or more of the matching methods in block 9220. If there are matches, then the metadata of all affected objects are updated in block 9224, and execution is passed to point C in FIG. 9e-1 (i.e., block 9158). Otherwise, execution continues to block 9222, which performs appropriate error processing. The result of the error processing will determine the next action taken by the management entity.

Referencing back to block 91142 in FIG. 9c-2, the management entity may then check to see if all objects that in the currently collected data have been identified (block 91142). If so, in block 91146, the management entity checks to determine if there are other objects that may need to be identified. If so, the management entity returns to block 91134. Otherwise, the management entity continues to point A (block 91150) of FIG. 9c-3. If all objects have still not been identified, error processing is performed (block 91144) and this technique ends.

Referencing forward to block 91150, FIG. 9c-3, the collected data, which have all now been identified, are validated, such as previously described in FIGS. 6n-1 through 6n-3 (block 91150). The management entity checks to see if any other dependencies exist that use this particular data model (block 91152). If so, the next dependency is retrieved (block 91154), and execution returns to point B (block 91124) in FIG. 9c-2. If not, then the management entity checks to see if any other protocols exist that use this set of dependencies with this particular data model (block 91156). If so, the next protocol is retrieved (block 91158), and execution returns to point C (block 91126) in FIG. 9c-2. If not, then the management entity checks to see if any other data models exist that use this set of dependencies and this protocol (block 91160). If so, then the next data model is retrieved (block 91162), and execution returns to point D (block 91128) in FIG. 9c-2. If not, then this technique ends, and control is returned to block 916 in FIG. 9a-1 (it is noted that block 912 and 914 have already been processed in FIGS. 9c-2 and 9c-3).

The management entity makes a final check to ensure that all objects in all collected data have been identified (block 916 of FIG. 9a-1). If not, then there are no other ways that this management entity has to identify an object, and more complex checks to establish the presence of new objects ensues (block 918).

Referencing forward to FIG. 9a-2, four nested loops are constructed to cover four types of matching in order to start more complex object identification processes (blocks 91800, 91802, 91804, and 91806). These blocks will iterate over each object in the set of second, third, fourth, and fifth sets of objects (i.e., each ADT, model element of the information model, model element of all data models, and object instances that have been instantiated) to check for deep equality between the original object from the collected data (i.e., the object in the set of first objects that has not yet been recognized) and the object being compared to (i.e., the object in the set of second, third, fourth, or fifth objects). Deep equality checks that objects are not only the same type, but their attributes, constraints, and relationships are also the same. This applies recursively for each model element, such as arrays. Deep equality also checks for null equality. The reason that deep equality is used is to ensure that the syntax and semantics of the two objects are the same.

Accordingly, in block 9180, the unrecognizable object is compared to the first object in the set of fifth objects (e.g., each object instance from each model element from each data model being used). Conceptually, this checks to see if any object has been instantiated from any of the data models being used that is deeply equal to this unknown object. This is the simplest of the four tests. If the objects are equal, then the previously unrecognizable object has been identified. This is useful for situations in which an object was originally instantiated and then removed. If the result of the test in block 91808 is true, then in block 91830, the metadata for the objects being compared is updated. Then, a check for more objects in the set of first objects is performed (block 91832). If there more first objects to check, the next first object is retrieved, the first object in the set of fifth objects is retrieved, and control is returned to block 91808. If there are no more first objects to check, then control is passed to point B in FIG. 9a-1 (block 908).

If the unrecognizable object is compared to the first object in the set of fifth objects (block 91808), and the result is not equal, then a check is made to see if there are any more objects in the set of fifth objects to compare. If there is, the next fifth object is retrieved, and control is returned to block 91806. If not, then the unrecognizable object does not match any instantiated object from any data model, and hence, has not yet been identified. Consequently, the unrecognizable object is then compared to the first object in the set of fourth objects (block 91810). This is useful for situations in which a model element from a data model was never instantiated. If the result of the test in block 91810 is true, then in block 91830, the metadata for the objects being compared is updated. Then, a check for more objects in the set of first objects is performed (block 91832). If there more first objects to check, the next first object is retrieved, the first object in the set of fifth objects is retrieved, and control is returned to block 91808. If there are no more first objects to check, then control is passed to point B in FIG. 9a-1 (block 908).

If the unrecognizable object is compared to the first object in the set of fourth objects (block 91810), and the result is not equal, then a check is made to see if there are any more objects in the set of fourth objects to compare. If there is, the next fourth object is retrieved, and control is returned to block 91804. If not, then the unrecognizable object does not match any model element from any data model, and hence, has not yet been identified. Consequently, the unrecognizable object is then compared to the first object in the set of third objects (block 91812). This is useful for situations in which a model element from an information model was never mapped into an object for any data model. If the result of the test in block 91812 is true, then in block 91830, the metadata for the objects being compared is updated. Then, a check for more objects in the set of first objects is performed (block 91832). If there more first objects to check, the next first object is retrieved, the first object in the set of fifth objects is retrieved, and control is returned to block 91808. If there are no more first objects to check, then control is passed to point B in FIG. 9a-1 (block 908).

If the unrecognizable object is compared to the first object in the set of third objects (block 91812), and the result is not equal, then a check is made to see if there are any more objects in the set of third objects to compare. If there is, the next third object is retrieved, and control is returned to block 91802. If not, then the unrecognizable object does not match any model element from the information model, and hence, has not yet been identified. Consequently, the unrecognizable object is then compared to the first object in the set of second objects (block 91814). This is useful for situations in which an ADT was never mapped into a model element from the information model. If the result of the test in block 91814 is true, then in block 91830, the metadata for the objects being compared is updated. Then, a check for more objects in the set of first objects is performed (block 91832). If there more first objects to check, the next first object is retrieved, the first object in the set of fifth objects is retrieved, and control is returned to block 91808. If there are no more first objects to check, then control is passed to point B in FIG. 9a-1 (block 908).

Otherwise, execution continues to block 922, where data collection processing analysis is performed as previously described using FIGS. 6g and 6n-1, 6n-2, and 6n-3.

The analyzed data is then saved in block 924. The management entity may then determine if at least one data transformations are needed (block 926). If not, then this technique ends. Otherwise, the set of data transformations is defined, executed, and saved in blocks 928, 930, and 932, respectively. These operations were previously described in FIGS. 6d, 6i, and 6j, respectively.

FIG. 8 provides an illustration of a device 800. Device 800 may be an implementation of a management entity and the like. Device 800 may be used to implement various ones of the embodiments discussed herein. As shown in FIG. 8, a transmitter 805 is configured to send packets, frames, cells, and/or other types of data and commands and a receiver 810 is configured to receive packets, frames, cells, and/or other types of data. In both cases, the data may include operational, administrative, management, and/or performance data and commands. Transmitter 805 and receiver 810 may have a wireless interface, a wireline interface, or a combination thereof.

A data collector 820 is configured to collect data for MangeableEntities in a communications system coupled to device 800. Data collector 820 utilizes knowledge derived from an information model of the communications system, and a data model(s) that is an instantiation of the information model to select a protocol(s) to collect the data. The knowledge may also be used to select a combination of none or more pre-processing, post-processing, pre-storage, and post-storage to process the collected data.

A request processing unit 822 is configured to process a request for device 800 to collect data for ManageableEntities in the communications system. A dependency processing unit 824 is configured to determine dependencies present in the request and to form a dependency list. Dependency processing unit 824 detects several different types of dependencies, including a type of data to collect, a type of protocol to use to collect each type of data, types of pre-processing operations and/or post-processing operations to be performed on each type of data, and types of pre-storage and/or post-storage operations for each type of data. An information model processing unit 826 is configured to retrieve an information model of the communications system, e.g., the information model may be retrieved from a memory or an entity coupled to device 800. A data model processing unit 828 is configured to determine specific data model(s) that are required to collect the data requested in the request. As an example, dependencies between a type of managed object that uses a specific set of data types that require a particular access pattern, along with other characteristics, may be used to imply the need for one or more protocols, data stores, pre-processing and/or post-processing functions, and pre-storage and/or post-storage functions. Similar arguments can be made for the other types of dependencies. These dependencies collectively may be used to determine the data model(s) that are required. A data collecting unit 830 is configured to collect the data from the ManageableEntities in the communications system. Data collecting unit 830 may stream the collected data, and may include facilities for managing data that is delivered out of order, fragmented, missing, and the like.

A data transformer 840 is configured to transform collected data in a first schema into a format compatible with a second schema. Data transformer 840 makes use of knowledge provided by the information model and/or the data model(s). A schema processing unit 842 is configured to determine if the collected data requires transformation. If transformation is required, schema processing unit 842 retrieves the second schema, which may be stored in a memory or a remote entity. A transformation determining unit 844 is configured to determine a transformation(s) to be used to transform the collected data from the first schema to the second schema. The transformation(s) may be a mapping function that maps instances of the first schema to the second schema. A transformation processing unit 846 is configured to apply the transformation(s) to the collected data.

A data analyzer 860 is configured to perform data analysis, including object identifying, object replacing, object synthesizing, and the like. An object identifying unit 862 is configured to identify objects present in the collected data. Object identifying unit 862 is also configured to mark unidentified objects or unrecognizable objects. An object replacing unit 864 is configured to replace an unidentified object or an unrecognizable object with an object that is identifiable or recognizable. An object synthesizing unit 866 is configured to synthesize an object for each unidentified or unrecognizable object found in the collected data.

A memory 850 is configured to store the information model, the data model(s), the pre-processing, the post-processing, the pre-storage, and the post-storage, the collected data, the transformation, the transformed data, schemas, and the like. Memory 850 may be a physical memory, such as a disk drive, solid state memory, or a combination of the two. Memory 850 may be physically a part of device 800, it may be remotely located, or a combination of the two. Memory 850 may also consist of physical memory that is virtualized, thereby enabling multiple physical memory elements to be treated as a single pool of memory that can be allocated on an as-needed basis. A user interface 855 includes hardware and/or software to permit user interaction with device 800. As an example, user interface 855 includes a display, a keyboard, a touch pad, a voice recognition system, a speaker, a mouse, a stylus, and the like, to allow the user to interact with device 800.

The elements of device 800 may be implemented as specific hardware logic blocks. In an alternative, the elements of device 800 may be implemented as software executing in a processor, controller, application specific integrated circuit, or so on. In yet another alternative, the elements of device 800 may be implemented as a combination of software and/or hardware.

As an example, transmitter 805 and receiver 810 may be implemented as a specific hardware block, while data collector 820 (including request processing unit 822, dependency processing unit 824, information model processing unit 826, data model processing unit 828, and data collecting unit 830), data transformer 840 (including schema processing unit 842, transformation determining unit 844, and transformation processing unit 846), and data analyzer 860 (including object identifying unit 862, object replacing unit 864, and object synthesizing unit 866) may be software modules executing in a processor 815, a microprocessor, a custom circuit, or a custom compiled logic array of a field programmable logic array. It is noted that processor 815, the microprocessor, the custom circuit, the custom compiled logic array, and the like, may be implemented in a multiple processing unit configuration that may be local to one another or distributed and coupled through a communications network. Data collector 820 (including request processing unit 822, dependency processing unit 824, information model processing unit 826, data model processing unit 828, and data collecting unit 830), data transformer 840 (including schema processing unit 842, transformation determining unit 844, and transformation processing unit 846), and data analyzer 860 (including object identifying unit 862, object replacing unit 864, and object synthesizing unit 866) may be stored as modules in memory 850.

Advantageous features of example embodiments may include: a method for management entity operations, the method comprising: receiving, by a management entity, a request to collect data for an entity in a communications system; collecting, by the management entity, the data for the entity utilizing a set of protocols selected using knowledge defined by a first data model of a data model list derived from an information model of the communications system; and saving, by the management entity, the data collected.

The method could further include, forming the dependency list comprising: saving references to objects in the data collected as a set of first objects; determining a first set of Abstract Data Types (ADTs) to represent a behavior of an object in the set of first objects, wherein the first set of ADTs comprises a specification of at least one of a functionality, an axiom, a pre-condition, a post-condition, and an invariant of the first set of ADTs; storing the first set of ADTs as a set of second objects; determining a second set of ADTs to represent a behavior of a first protocol used to collect the data; storing the set of second ADTs as a set of third objects; and comparing a first compared object from the set of second objects to at least one second compared object from the set of third objects, where the comparing comprises, determining that a behavior of the first compared object constrains the behavior of the at least one second compared object, determining a type of constraint by the behavior of the first compared object, wherein the type of constraint comprises one of a hyponym, a hypernym, a holonym, a meronym, a behavioral subtype, a behavioral supertype, a subtype, and a supertype, and saving, as a new object in a set of fourth objects, references to the first compared object, the at least one second compared object, the behavior of the first compared object constraining the behavior of the at least one second compared object, and the type of constraint by the behavior of the first compared object.

The method could further include, repeating determining the first set of ADTs for remaining objects in the set of first objects; and adding the first set of ADTs to the set of second objects.

The method could further include, repeating determining the second set of ADTs for remaining protocols in the set of protocols; and adding the second set of ADTs to the set of third objects.

The method could further include, repeating, for remaining objects in a set of second objects, determining that a behavior of the first compared object constrains a behavior of the at least one second compared object; determining the type of constraint the behavior of the first compared object, wherein the type of constraint comprises a hyponym, a hypernym, a holonym, a meronym, a behavioral subtype, a behavioral supertype, a subtype, and a supertype; and saving, as a new object in the set of fourth objects, references to the first compared object, the at least one second compared object, the behavior of the first compared object constraining the behavior of the at least one second compared object, and the type of constraint the behavior of the first compared object.

The method could further include, repeating, for a group of two or more objects in the set of second objects, determining that a behavior of the first compared object constrains a behavior of the at least one second compared object; and saving, as a new object in the set of fourth objects, references to the group of two or more objects in the set of second objects, the at least one compared second object, and the behavior of the first compared object that constrains the behavior of the group of two or more objects.

The method could further include, wherein determining the first set of ADTs comprises: mapping an object in the set of first objects that is incapable of being mapped to an object in a set of seventh objects to a set of nineteenth objects; mapping objects in the set of nineteenth objects to at least one model element in a set of fifth objects; mapping the at least one model element in the set of fifth objects to an object in a set of sixth objects; instantiating the object in the set of sixth objects as an object in a set of seventh objects; and comparing each object in the set of seventh objects to a corresponding object in the set of first objects, wherein the comparing comprises determining whether the object in the set of seventh objects and the corresponding object in the set of first objects have identical behavior, and saving results of the determining into metadata associated with the object in the set of seventh objects.

The method could further include, wherein determining the first set of ADTs comprises: mapping each object in the set of second objects to an object of a set of fifth objects, wherein each object in the set of fifth objects corresponds to a model element defined in the information model; adding first metadata to each object in the set of fifth objects, wherein the first metadata defines the mapping from the object in the set of fifth objects to one or more objects in the set of second objects; mapping each object in a set of fifth objects to an object in a set of sixth objects; and adding second metadata to each object in the set of sixth objects, wherein the second metadata defines the mapping from the object in the set of sixth objects to at least one object in the set of fifth objects.

The method could further include, instantiating and saving a reference to each object in the set of sixth objects in a set of seventh objects; comparing each object in the set of seventh objects to a corresponding object in the set of first objects, wherein the comparing comprises, determining whether the object in the set of seventh objects and the corresponding object in the set of first objects have identical behavior; and saving results of comparing each object in third metadata associated with objects in the set of seventh objects.

The method could further include, wherein collecting the data further comprises: determining a set of pre-processing algorithms from the first data model in the data model list to transform the data collected into a form preferred by an application using the data collected; determining a second set of dependencies between the data collected and the set of pre-processing algorithms; and collecting the data utilizing the set of pre-processing algorithms in accordance with the second set of dependencies, wherein the second set of dependencies constrains pre-processing algorithms used to transform the data.

The method could further include, wherein forming the dependency list comprises: determining a third set of ADTs to represent a behavior of a first pre-processing algorithm to transform the data collected into a form preferred by the application using the data collected; storing the third set of ADTs as a set of eleventh objects; and comparing a first compared object from the set of second objects to the at least one second compared object in the set of eleventh objects, wherein the comparing comprises, determining that the behavior of the first compared object constrains the behavior of the at least one second compared object, determining the type of constraint by the behavior of the first compared object, wherein the type of constraint comprises a hyponym, a hypernym, a holonym, a meronym, a behavioral subtype, a behavioral supertype, a subtype, and a supertype, and saving, as a new object in a set of fourth objects, references to the first compared object, the at least one second compared object, the behavior of the first compared object constraining the behavior of the at least one second compared object, and the type of constraint by the behavior of the first compared object.

The method could further include, repeating determining the third set of ADTs to represent the behavior for remaining pre-processing algorithms in the set of eleventh objects; and adding the set of third ADTs to a set of second objects.

The method could further include, repeating comparing the first compared object from the set of second objects to the at least one second compared object in the set of eleventh objects for remaining objects in a set of second objects.

The method could further include, wherein determining the first data model in the data model list in accordance with the dependency list and the subset of the information model comprises: mapping each object in a set of eleventh objects to a fourth concrete data structure in a set of eighth objects; storing the fourth concrete data structure in a set of eighth objects; defining an association between an object in a set of second objects and an object in the set of eleventh objects as a fifth concrete data structure in the set of eighth objects; storing the fifth concrete data structure in the set of eighth objects; and using a set of first concrete data structures, the set of fourth concrete data structures, and the set of fifth concrete data structures to add the first data model to the data model list.

The method could further include, wherein determining the set of pre-processing algorithms comprises: defining a set of candidate pre-processing algorithms as a set of twelfth objects, wherein the set of twelfth objects is a subset of a set of sixth objects; determining, for each object in the set of twelfth objects, whether the object is capable of operating on a subset of objects in the set of sixth objects and a subset of objects in a set of ninth objects without adversely affecting the behavior of at least one of the set of sixth objects and the set of ninth objects; and eliminating the objects that are not capable from the set of twelfth objects.

The method could further include, wherein forming the dependency list comprises: determining a fourth set of ADTs to represent a behavior of a first post-processing algorithm to transform the data collected into a form preferred by the application using the data collected; storing the fourth set of ADTs as a set of thirteenth objects; and comparing a first compared object from a set of second objects to the at least one second compared object in the set of thirteenth objects, wherein the comparing comprises, determining that a behavior of the first compared object constrains a behavior of the at least one second compared object, determining the type of constraint by the behavior of the first compared object, wherein the type of constraint comprises a hyponym, a hypernym, a holonym, a meronym, a behavioral subtype, a behavioral supertype, a subtype, and a supertype, and saving, as a new object in a set of fourth objects, references to the first compared object, the at least one second compared object, and the type of constraint by the behavior of the first compared object.

The method could further include, repeating determining of the fourth set of ADTs to represent the behavior for remaining post-processing algorithms in the set of thirteenth objects; and adding the fourth set of ADTs to a set of second objects.

The method could further include, repeating comparing the first compared object from the set of second objects to the at least one second compared object in the set of thirteenth objects for remaining objects in a set of second objects.

The method could further include, wherein determining the first data model in the data model list in accordance with the dependency list and the subset of the information model comprises: mapping each object in a set of thirteenth objects to a sixth concrete data structure in a set of eighth objects; storing the sixth concrete data structure in the set of eighth objects; defining an association between an object in a set of second objects and an object in the set of thirteenth objects as a seventh concrete data structure in the set of eighth objects; storing the seventh concrete data structure in the set of eighth objects; and using a set of first concrete data structures, the set of sixth concrete data structures, and the set of seventh concrete data structures to add the first data model to the data model list.

The method could further include, wherein determining the set of post-processing algorithms comprises: defining a set of candidate post-processing algorithms as a set of fourteenth objects, wherein the set of fourteenth objects is a subset of a set of sixth objects; determining, for each object in the set of fourteenth objects, whether the object is capable of operating on a subset of objects in the set of sixth objects and a subset of objects in a set of ninth objects without adversely affecting the behavior of at least one of the set of sixth objects and the set of ninth objects; and eliminating the objects that are not capable from the set of fourteenth objects.

The method could further include, wherein forming a dependency list comprises: determining a fifth set of ADTs to represent a behavior of a first pre-storage algorithm that is used to store the data collected before the data collected has been completely processed and delivered to the application using the data collected; storing the fifth set of ADTs as a set of fifteenth objects; and comparing a first compared object from the set of second objects to the at least one second compared object in the set of fifteenth objects, wherein the comparing comprises, determining that a behavior of the first compared object constrains a behavior of the at least one second compared object, determining the type of constraint by the behavior of the first compared object, wherein the type of constraint comprises a hyponym, a hypernym, a holonym, a meronym, a behavioral subtype, a behavioral supertype, subtype, and a supertype, and saving, as a new object in a set of fourth objects, references to the first compared object, the at least one second compared object, and the type of constraint by the behavior of the first compared object.

The method could further include, repeating determining the fifth set of ADTs to represent the behavior for remaining pre-storage algorithms in the set of fifteenth objects; and adding the fifth set of ADTs to a set of second objects.

The method could further include, repeating comparing the first compared object from the set of second objects to the at least one second compared object in the set of fifteenth objects for remaining objects in a set of second objects.

The method could further include, wherein determining the first data model in the data model list in accordance with the dependency list and the subset of the information model comprises: mapping each object in a set of fifteenth objects to an eighth concrete data structure in a set of eighth objects; storing the eighth concrete data structure in the set of eighth objects; defining an association between an object in a set of second objects and an object in the set of fifteenth objects as a ninth concrete data structure in the set of eighth objects; storing the ninth concrete data structure in the set of eighth objects; and using a set of first concrete data structures, the set of eighth concrete data structures, and the set of ninth concrete data structures to add the first data model to the data model list.

The method could further include, wherein determining the set of pre-storage algorithms comprises: defining a set of candidate pre-storage algorithms as a set of sixteenth objects, wherein the set of sixteenth objects is a subset of a set of sixth objects; determining, for each object in the set of sixteenth objects, whether the object is capable of operating on a subset of objects in the set of sixth objects and a subset of a set of ninth objects without adversely affecting the behavior of at least one of the set of sixth objects and the set of ninth objects; and eliminating the objects that are not capable from the set of sixteenth objects.

The method could further include, wherein forming a dependency list comprises: determining a sixth set of ADTs to represent a behavior of a first post-storage algorithm that is used to store the data collected after the data collected has been completely processed and delivered to the application using the data collected; storing the sixth set of ADTs as a set of seventeenth objects; and comparing a first compared object from the set of second objects to the at least one second compared object in the set of seventeenth objects, wherein the comparing comprises, determining that a behavior of the first compared object constrains a behavior of the at least one second compared object, determining the type of constraint by the behavior of the first compared object, wherein the type of constraint comprises a hyponym, a hypernym, a holonym, a meronym, a behavioral subtype, a behavioral supertype, a subtype, and a supertype, and saving, as a new object in a set of fourth objects, references to the first compared object, the at least one second compared object, and the type of constraint by the behavior of the first compared object.

The method could further include, repeating determining the sixth set of ADTs to represent the behavior for remaining post-storage algorithms in the set of seventeenth objects; and adding the sixth set of ADT to a set of second objects.

The method could further include, repeating comparing the first compared object from the set of second objects to the at least one second compared object in the set of seventeenth objects for remaining objects in a set of second objects.

The method could further include, wherein determining the first data model in the data model list in accordance with the dependency list and the information model comprises: mapping each object in a set of seventeenth objects to a tenth concrete data structure in a set of eighth objects; storing the tenth concrete data structure in the set of eighth objects; defining an association between an object in a set of second objects and an object in the set of seventeenth objects as an eleventh concrete data structure in the set of eighth objects; storing the eleventh concrete data structure in the set of eighth objects; and using a set of first concrete data structures, the set of tenth concrete data structures, and the set of eleventh concrete data structures to add the first data model to the data mode list.

The method could further include, wherein determining the set of post-storage algorithms comprises: defining a set of candidate post-storage algorithms as a set of eighteenth objects, wherein the set of eighteenth objects is a subset of a set of sixth objects; determining, for each object in the set of eighteenth objects, whether the object is capable of operating on a subset of objects in the set of sixth objects and a subset of objects in a set of ninth objects without adversely affecting the behavior of at least one of the set of sixth objects and the set of ninth objects; and eliminating the objects that are not capable from the set of eighteenth objects.

Advantageous features of example embodiments may include: a management entity comprising: a receiver configured to receive a request to collect data for an entity in a communications system; and a processor operatively coupled to the receiver, the processor configured to collect the data for the entity utilizing a set of protocols selected using knowledge defined by a first data model of a data model list derived from an information model of the communications system, and to save the data collected.

The management entity could further include, wherein the processor is configured to save references to objects in the data collected as a set of first objects, to determine a first set of Abstract Data Types (ADTs) to represent a behavior of an object in the set of first objects, wherein the first set of ADTs comprises a specification of at least one of a functionality, an axiom, a pre-condition, a post-condition, and an invariant of the first set of ADTs, to store the first set of ADTs as a set of second objects, to determine a second set of ADTs to represent a behavior of a first protocol used to collect the data, to store the set of second ADTs as a set of third objects, and to compare a first compared object from the set of second objects to at least one second compared object from the set of third objects, wherein the processor is configured to determine that a behavior of the first compared object constrains the behavior of the at least one second compared object, to determine a type of constraint by the behavior of the first compared object, wherein the type of constraint comprises one of a hyponym, a hypernym, a holonym, a meronym, a behavioral subtype, a behavioral supertype, a subtype, and a supertype, and to save, as a new object in a set of fourth objects, references to the first compared object, the at least one second compared object, the behavior of the first compared object constraining the behavior of the at least one second compared object, and the type of constraint by the behavior of the first compared object.

The management entity could further include, wherein the processor is configured to map a first object in a set of second objects to a first concrete data structure, to store, in a set of eighth objects, a reference to the first concrete data structure, to map each object in a set of third objects to a second concrete data structure, to store the second concrete data structure in the set of eighth objects, to determine an association between objects in the set of second objects and objects in the set of third objects as a third concrete data structure, to store the third concrete data structure in the set of eighth objects, and to use the first concrete data structure, the second concrete data structure, and the third concrete data structure to select the first data model.

The management entity could further include, wherein the processor is configured to determine a set of pre-processing algorithms from the first data model in the data model list to transform the data collected into a form preferred by an application using the data collected, to determine a second set of dependencies between the data collected and the set of pre-processing algorithms, and to collect the data utilizing the set of pre-processing algorithms in accordance with the second set of dependencies, wherein the second set of dependencies constrains pre-processing algorithms used to transform the data.

The management entity could further include, wherein the processor is configured to determine a third set of ADTs to represent a behavior of a first pre-processing algorithm to transform the data collected into a form preferred by the application using the data collected, to store the third set of ADTs as a set of eleventh objects, and to compare a first compared object from the set of second objects to the at least one second compared object in the set of eleventh objects, wherein the processor is configured to determine that the behavior of the first compared object constrains the behavior of the at least one second compared object, to determine the type of constraint by the behavior of the first compared object, wherein the type of constraint comprises a hyponym, a hypernym, a holonym, a meronym, a behavioral subtype, a behavioral supertype, a subtype, and a supertype, and to save, as a new object in a set of fourth objects, references to the first compared object, the at least one second compared object, the behavior of the first compared object constraining the behavior of the at least one second compared object, and the type of constraint by the behavior of the first compared object.

The management entity could further include, wherein the processor is configured to determine a set of post-processing algorithms from the first data model in the data model list that is used to transform the data collected into a form preferred by an application using the collected data, to determine a third set of dependencies between the data collected and the set of post-processing algorithms, and to collect the data utilizing the set of post-processing algorithms in accordance with the third set of dependencies, wherein the third set of dependencies constrains post-processing algorithms used to transform the data.

The management entity could further include, wherein the processor is configured to determine a set of pre-storage algorithms from the first data model in the data model list to store the data collected prior to the data collected being completely processed and delivered to an application using the data collected, to determine a fourth set of dependencies between the data collected and the set of pre-storage algorithms, and to collect the data utilizing the set of pre-storage algorithms in accordance with the fourth set of dependencies, wherein the fourth set of dependencies constrains pre-storage algorithms used to store the data.

The management entity could further include, wherein the processor is configured to determine a set of post-storage algorithms from the first data model in the data model list to store the data collected after the data collected has been completely processed and delivered to an application using the data collected, to determine a fifth set of dependencies between the data collected and the set of post-storage algorithms, and to collect the data utilizing the set of post-storage algorithms in accordance with the fifth set of dependencies, wherein the fifth set of dependencies constrains the post-storage algorithms used to store the data.

Advantageous features of example embodiments may include: a method for management entity operations, the method comprising: receiving, by a management entity, a request to collect data for an entity in a communications system; collecting, by the management entity, data for the entity utilizing a set of protocols selected using knowledge defined by a first data model of a data model list derived from an information model of the communications system; detecting, by the management entity, that the data collected includes an object that cannot be recognized; replacing, by the management entity, the unrecognizable object in the data collected with an equivalent recognizable object thereby producing revised data collected; and saving, by the management entity, the revised data collected.

The method could further include, wherein the determining that the first object in the set of first objects cannot be instantiated from the set of fourth objects comprises: instantiating objects in the set of fourth objects as objects in a set of fifth objects, wherein metadata associated with the set of fifth objects includes mapping information from objects in the set of fourth objects to objects in the set of fifth objects; comparing objects in the set of first objects to objects in the set of fifth objects; and verifying that there is additional functionality and behavior of objects in the set of first objects not present in the objects in the set of fifth objects.

The method could further include, repeating the determining that the first object in the set of first objects cannot be instantiated from the set of fourth objects for each object in the set of first objects that cannot be recognized.

The method could further include, repeating the determining that the first object in the set of first objects cannot be instantiated from the set of fourth objects for each object in the set of first objects that cannot be recognized.

The method could further include, wherein the replacing comprises: synthesizing an ADT a second object to represent at least one of a characteristic and a behavior of the unrecognizable object; generating a new third object as a new first model element in the information model in accordance with the ADT; generating a new fourth object as a new second model element in the data model in accordance with the new first model element; instantiating a new fifth object for the new second model element in accordance with the new second model element; verifying that the new fifth object provides the same characteristics and behavior as the object in the set of first objects; adding and saving the second object to a set of second objects, the third object to a set of third objects, the fourth object to a set of fourth objects, and the fifth object to a set of fifth objects; and updating the metadata of the fifth object, wherein metadata associated with the fifth object includes mapping information from objects in the set of third objects to objects in the set of fourth objects, and mapping information from objects in the set of fourth objects to objects in the set of fifth objects.

Advantageous features of example embodiments may include: a management entity comprising: a receiver configured to receive a request to collect data for an entity in a communications system; and a processor operatively coupled to the receiver, the processor configured to collect data for the entity utilizing a set of protocols selected using knowledge defined by a first data model of a data model list derived from an information model of the communications system, to detect that the data collected includes an object that cannot be recognized, to replace the unrecognizable object in the data collected with an equivalent recognizable object thereby producing revised data collected, and to save the revised data collected.

The management entity could further include, wherein the processor is configured to determine that an ADT in a set of second objects has at least the same first set of behaviors as the object in the set of first objects, to map a second set of behaviors of the ADT in the set of second objects to a model element in a set of third objects, to map the model element in the set of third objects to a model element in a set of fourth objects, to instantiate an object from the set of fourth objects to an object in the set of fifth objects, to compare the object in the set of fifth objects to the object in the set of first objects, to determine that the result of the comparison is an equality, to update the metadata of objects in the set of second objects, objects in the set of third objects, objects in the set of fourth objects, and objects in the set of fifth objects that were used to produce a new object whose behavior is the same as the first object in the set of first objects, and to replace and save the object from the set of first objects with the object from the set of fifth objects.

The management entity could further include, wherein the processor is configured to form and save a set of first references to each object in the data collected as a set of first objects, to form and save a set of second references to each object having an Abstract Data Type (ADT) defined by the information model as a set of second objects, to form and save a set of third references to each model element defined by the information model as a set of third objects in accordance with each object in the set of second objects, wherein metadata associated with the set of third objects includes mapping information from objects in the set of third objects to objects in the set of second objects, to form and save a set of fourth references to each model element defined by the data model as a set of fourth objects in accordance with each object in the set of third objects, wherein metadata associated with the set of fourth objects includes mapping information from objects in the set of fourth objects to objects in the set of third objects, to determine that a first object in the set of first objects cannot be instantiated from the set of fourth objects, and to save the first object in a set of sixth objects.

The management entity could further include, wherein the processor is configured to instantiate objects in the set of fourth objects as objects in a set of fifth objects, wherein metadata associated with the set of fifth objects includes mapping information from objects in the set of fourth objects to objects in the set of fifth objects, to compare objects in the set of first objects to objects in the set of fifth objects, and to verify that there is additional functionality and behavior of objects in the set of first objects not present in the objects in the set of fifth objects.

The management entity could further include, wherein the processor is configured to synthesize an ADT a second object to represent at least one of a characteristic and a behavior of the unrecognizable object, to generate a new third object as a new first model element in the information model in accordance with the ADT, to generate a new fourth object as a new second model element in the data model in accordance with the new first model element, to instantiate a new fifth object for the new second model element in accordance with the new second model element, to verify that the new fifth object provides the same characteristics and behavior as the object in the set of first objects, to add and save the second object to a set of second objects, the third object to a set of third objects, the fourth object to a set of fourth objects, and the fifth object to a set of fifth objects, and to update the metadata of the fifth object, wherein metadata associated with the fifth object includes mapping information from objects in the set of third objects to objects in the set of fourth objects, and mapping information from objects in the set of fourth objects to objects in the set of fifth objects.

The management entity could further include, wherein the processor is configured to retrieve a set of pre-calculated weighted n-gram statistics for each data type defined by a set of ADTs in the set of second objects, where n is a value optimized for a set of expected data types, to assign each n-gram found in the data collected a data type from a set of known data types defined by the set of ADTs in the set of second objects, to apply the assigned data type to the unrecognizable object, thereby generating a new recognizable object, to verify that the new recognizable object has equivalent functionality and behavior to the originally unrecognizable object, to replace the unrecognizable object with the newly created recognizable object, and to save a reference to the data collected including the recognizable object.

The management entity could further include, wherein the processor is configured to select a data type from the set of known data types, to transform an object in the set of first objects using a transformation function and the selected data type to produce a new object, to save the new object in the set of sixth objects, to verify that an object in the set of fifth objects contains the behavior of the new object in the set of sixth objects, to save the transformation function and a relationship between the new object and the object in the set of fifth objects as metadata in the new object, and to save a reference to the new object in the set of fifth objects.

The management entity could further include, wherein the processor is configured to determine a number of elements present in the new object, wherein the element includes a model element derived from the set of fourth objects, to store the model element in a set of seventh objects, and to write, in each object in the set of seventh objects, metadata defining which data type is used to make the new object recognizable, which element was recognized by applying the data type, which object of the set of fourth objects matches the element, and which object in the set of first objects is used to derive the new object.

The management entity could further include, wherein the processor is configured to determine that there is an object, where a first subset of the elements of the object is now recognizable and a second subset of the elements of the object is still unrecognizable, to apply a second data type from the set of data types to an unrecognizable element in the second subset of elements, thereby making the unrecognizable element recognizable, to record the second data type used to make the unrecognizable element recognizable and from which object the unrecognizable element is contained by updating the metadata for the object in the set of sixth objects, and to store, in a set of seventh objects, each object in the first subset of elements of the object with its associated elements.

The management entity could further include, wherein the processor is configured to use at least one of feature-based matching, structure-based matching, behavior-based matching, and semantic relatedness matching to identify the element contained in the object in the set of first objects, to record an algorithm used to make the object recognizable and the object from the set of first objects used to derive the new object by updating metadata for objects in the set of seventh objects, and to save a reference to the element successfully recognized in the set of seventh objects.

Advantageous features of example embodiments may include: a method for management entity operations, the method comprising: receiving, by a management entity, a request to collect data for an entity in a communications system; collecting, by the management entity, data for the entity; detecting, by the management entity, that the data collected contains an object that cannot be recognized; determining, by the management entity, that the unrecognizable object is a new object not previously known to the management entity; defining, by the management entity, a new Abstract Data Type (ADT) to represent the behavior of the unrecognizable object; mapping, by the management entity, the new ADT to a new model element in an information model; mapping, by the management entity, the new model element in the information model to a new model element in a data model; and saving, by the management entity, the new model element in the information model.

The method could further include, attaching an annotation to at least one of the collecting, the detecting, the determining, the defining, the mapping the new ADT, the mapping the new model element, and the saving.

The method could further include, wherein the detecting comprises: translating the data collected into a first reference to a first object in a set of first objects; forming and saving a set of second references to each ADT defined by the information model as a set of second objects; forming and saving a set of third references to a model element defined by the information model as a set of third objects, wherein the set of third references includes metadata containing mapping information from a first object in a set of second objects to an object in the set of third objects; forming and saving a set of fourth references to a model element defined by the data model as a set of fourth objects, wherein the set of fourth references includes metadata containing mapping information from a second object in the set of third objects to an object in the set of fourth objects; forming and saving a set of fifth references to an object instantiated by the model element in the set of fourth objects as a set of fifth objects, wherein the set of fifth references includes metadata containing mapping information from each object in the set of fourth objects to each object in the set of fifth objects; comparing the first object in the set of first objects to objects in the set of fifth objects; and logging the result of the comparing in response to determining that the comparing resulted in an inequality.

The method could further include, wherein the comparing comprises: determining whether objects in the set of fifth objects have at least the same characteristics and behavior than the first object in the set of first objects; and saving the results of the comparison into metadata of objects in the set of fifth objects.

The method could further include, repeating the comparing and the logging for remaining objects in the set of first objects; updating the metadata of the set of first objects; and storing the results of the comparing in a set of sixth objects, wherein the set of sixth objects includes metadata containing mapping information that defines a reference to objects in the set of first objects that had additional behavior not present in the objects in the set of fifth objects.

The method could further include, detecting an unrecognizable second object in the set of first objects; determining that the unrecognizable second object in the set of first objects includes at least one element; verifying that the at least one element matches an existing model element from the set of third objects; and verifying that part of the unrecognizable second object in the set of first objects is still unrecognized.

The method could further include, repeating the determining that the unrecognizable second object in the set of first objects includes at least one element for remaining objects in the set of first objects.

The method could further include, using at least one of feature-based matching, structure-based matching, behavior-based matching, and semantic relatedness matching to identify the at least one element contained in the unrecognizable second object as a model element in the set of third objects.

The method could further include, repeating the using for remaining model elements in the set of third objects.

The method could further include, wherein the determining comprises verifying that a first object in the set of first objects has more behavior than the object in the set of fifth objects.

The method could further include, wherein the defining the new ADT comprises: comparing an object in the set of first objects to an object in the set of fifth objects; determining that no object in the set of fifth objects provide the same characteristics and behavior as the first object in the set of first objects; constructing a new ADT in the set of second objects that specifies identical behavior as the compared object in the set of first objects; constructing a new model element in the set of third objects that specifies identical behavior as the compared object in the set of first objects in accordance with the new ADT in the set of second objects; constructing a first new model element in the set of fourth objects that specifies identical behavior as the compared object in the set of first objects in accordance with the new model element in the set of third objects; instantiating a new object instance from the first new model element in the set of fourth objects, and storing the new object instance in the set of fifth objects; mapping the new ADT in the set of second objects to the new model element in the set of third objects, the new model element in the set of third objects to the first new model element in the set of fourth objects, and the first new model element in the set of fourth objects to a new object instance in the set of fifth objects; adding metadata to define the mapping to the new ADT in the set of second objects, the mapping to the new model element in the set of third objects, the mapping to the first new model element in the set of fourth objects, and the mapping to the object instance in the set of fifth objects; and storing the new ADT in the set of second objects, the new model element to the information model in the set of third objects, the new model element to the data model in the set of fourth objects, and the object instance of the data model to the set of fifth objects.

The method could further include, wherein the constructing the new model element in the data model comprises: applying a data type to a previously unrecognizable object in the set of first objects to generate a newly transformed object in the set of first objects; determining that the applying the data type does not alter the syntax and the semantics of the newly transformed object in the set of first objects; generating a second new model element in the set of fourth objects having the same characteristics and behavior as the newly transformed object when instantiated; instantiating an object instance in the set of fifth objects in accordance with the second new model element in the set of fourth objects; verifying that the object instance has the same characteristics and behavior as the newly transformed object; updating the metadata to contain generation and mapping information for the second new model element in the set of fourth objects; updating the metadata to contain the generation and mapping information for the new object instance in the set of fifth objects; storing a reference to the second new model element in the set of fourth objects; and storing the reference to the new object instance in the set of fifth objects.

The method could further include, applying a data type to a previously unrecognizable object in the set of first objects to generate a newly transformed object in the set of first objects; determining that the applying the data type does not alter the syntax of the newly transformed object in the set of first objects; determining that the applying the data type does alter the semantics of the newly transformed object in the set of first objects; generating a third new model element in the set of fourth objects having the same characteristics as the newly transformed object when instantiated; matching the semantics of the newly transformed object to a relationship between an existing model element in the set of fourth objects and the third new model element in the set of fourth objects; instantiating an object instance in the set of fifth objects in accordance with the third new model element in the set of fourth objects; instantiating two additional object instances that represent the semantics of the newly transformed object, wherein the two additional object instances correspond to instantiating the relationship and the existing model element connected by the relationship to the new model element; verifying that the combination of the first object instance and the two additional object instances has the same characteristics and behavior as the newly transformed object; updating the metadata to contain generation and mapping information for the third new model element in the set of fourth objects, the relationship between the third new model element in the set of fourth objects and the existing model element in the set of fourth objects, and the existing model element in the set of fourth objects; storing a reference for the third new model element in the set of fourth objects, the relationship between the third new model element in the set of fourth objects and the existing model element in the set of fourth objects, and the existing model element in the set of fourth objects; and storing the reference to the new object instance in the set of fifth objects.

The method could further include, applying a data type to a previously unrecognizable object in the set of first objects to generate a newly transformed object in the set of first objects; determining that the applying the data type does alter the syntax of the newly transformed object in the set of first objects; determining that the applying the data type does not alter the semantics of the newly transformed object in the set of first objects; generating a fourth new model element in the set of fourth objects having the same behavior as the newly transformed object when instantiated; matching the syntax of the newly transformed object to a relationship between an existing model element in the set of fourth objects and the fourth new model element in the set of fourth objects; instantiating an object instance in the set of fifth objects in accordance with the fourth new model element in the set of fourth objects; instantiating two additional object instances that represent the syntax of the newly transformed object, wherein the two additional object instances correspond to instantiating a second object in the set of fourth objects and the relationship between the existing model element connected by the relationship to the fourth new model element in the set of fourth objects; verifying that the combination of the first object instance and the two additional object instances has the same characteristics and behavior as the newly transformed object; updating the metadata to contain generation and mapping information for the fourth new model element in the set of fourth objects, the relationship between the fourth new model element in the set of fourth objects and the existing model element in the set of fourth objects, and the existing model element in the set of fourth objects; storing a reference for the fourth new model element in the set of fourth objects, the relationship between the fourth new model element in the set of fourth objects and the existing model element in the set of fourth objects, and the existing model element in the set of fourth objects; and storing the reference to the new object instance in the set of fifth objects.

The method could further include, applying a data type to a previously unrecognizable object in the set of first objects to generate a newly transformed object in the set of first objects; determining that the applying the data type does alter both the syntax and the semantics of the newly transformed object in the set of first objects; generating a fifth new model element in the set of fourth objects having the same characteristics as the newly transformed object when instantiated; matching the syntax of the newly transformed object to a relationship between a first existing model element in the set of fourth objects and the fifth new model element in the set of fourth objects; generating a sixth new model element in the set of fourth objects having the same behavior as the newly transformed object when instantiated; matching the semantics of the newly transformed object to a relationship between a second existing model element in the set of fourth objects and the sixth new model element in the set of fourth objects; instantiating a first object instance in the set of fifth objects in accordance with the fifth new model element in the set of fourth objects; instantiating a first two additional object instances that represents the syntax of the newly transformed object, wherein the first two additional object instances correspond to instantiating a first instantiated object in the set of fourth objects and the relationship between the first model element connected by the relationship to the fifth new model element; instantiating a second object in the set of fifth objects in accordance with the sixth new model element in the set of fourth objects; instantiating a second two additional object instances that represents the semantics of the newly transformed object, wherein the second two additional object instances correspond to instantiating a second instantiated object in the set of fourth objects and the relationship between the second model element connected by the relationship to the sixth new model element; verifying that the combination of the first object instance, the first two additional object instances, the second object, and the second two additional object instances has the same characteristics and behavior as the newly transformed object; updating the metadata to contain generation and mapping information for the fifth new model element in the set of fourth objects, the existing model element in the set of fourth objects representing the syntax of the newly transformed object, the relationship between the fifth new model element in the set of fourth objects and the existing model element in the set of fourth objects representing the syntax of the newly transformed object, the sixth new model element in the set of fourth objects, the existing model element in the set of fourth objects representing the semantics of the newly transformed object, and the relationship between the sixth new model element in the set of fourth objects and the existing model element in the set of fourth objects representing the semantics of the newly transformed object; storing a reference to the fifth new model element in the set of fourth objects, the existing model element in the set of fourth objects representing the syntax of the newly transformed object, the relationship between the fifth new model element in the set of fourth objects and the existing model element in the set of fourth objects representing the syntax of the newly transformed object, the sixth new model element in the set of fourth objects, the existing model element in the set of fourth objects representing the semantics of the newly transformed object, and the relationship between the sixth new model element and the existing model element in the set of fourth objects representing the semantics of the newly transformed object; and storing the reference to the new object instance in the set of fifth objects.

The method could further include, repeating the applying to remaining objects in the set of first objects.

The method could further include, wherein the determining that no object in the set of second objects comprises using at least one of feature-based matching, structure-based matching, behavior-based matching, and semantic relatedness matching to verify that the object in the set of first objects does not match any object in the set of second objects.

The method could further include, wherein the determining that no object in the set of fifth objects comprises: comparing an object in the set of first objects to objects in the set of second objects, wherein each comparison includes verifying that the syntax and semantics of each ADT in the set of second objects does not match the syntax and semantics of the objects in the set of first objects, and determining that no metadata exists defining extensions or interpretations that would enable the previous verification of the syntax and semantics to be equal; and updating the metadata of all compared ADTs in the set of second objects to denote the above conclusions.

The method could further include, repeating the comparing for remaining objects in a set of first objects.

Advantageous features of example embodiments may include: a management entity comprising: a receiver configured to receive a request to collect data for an entity in a communications system; and a processor operatively coupled to the receiver, the processor configured to collect data for the entity, to detect that the data collected contains an object that cannot be recognized, to determine that the unrecognizable object is a new object not previously known to the management entity, to define a new Abstract Data Type (ADT) to represent the behavior of the unrecognizable object, to map the new ADT to a new model element in an information model, to map the new model element in the information model to a new model element in a data model, and to save the new model element in the information model.

The management entity could further include, wherein the processor is configured to attach an annotation to at least one of the collecting, the detecting, the determining, the defining, the mapping the new ADT, the mapping the new model element, and the saving.

The management entity could further include, wherein the processor is configured to translate the data collected into a first reference to a first object in a set of first objects, to form and save a set of second references to each ADT defined by the information model as a set of second objects, to form and save a set of third references to a model element defined by the information model as a set of third objects, wherein the set of third references includes metadata containing mapping information from a first object in a set of second objects to an object in the set of third objects, to form and save a set of fourth references to a model element defined by the data model as a set of fourth objects, wherein the set of fourth references includes metadata containing mapping information from a second object in the set of third objects to an object in the set of fourth objects, to form and save a set of fifth references to an object instantiated by the model element in the set of fourth objects as a set of fifth objects, wherein the set of fifth references includes metadata containing mapping information from each object in the set of fourth objects to each object in the set of fifth objects, to compare the first object in the set of first objects to objects in the set of fifth objects, and to log the result of the comparing in response to determining that the comparing resulted in an inequality.

The management entity could further include, wherein the processor is configured to detect an unrecognizable second object in the set of first objects, to determine that the unrecognizable second object in the set of first objects includes at least one element, to verify that the at least one element matches an existing model element from the set of third objects, and to verify that part of the unrecognizable second object in the set of first objects is still unrecognized.

The management entity could further include, wherein the processor is configured to compare an object in the set of first objects to an object in the set of fifth objects, to determine that no object in the set of fifth objects provide the same characteristics and behavior as the first object in the set of first objects, to construct a new ADT in the set of second objects that specifies identical behavior as the compared object in the set of first objects, to construct a new model element in the set of third objects that specifies identical behavior as the compared object in the set of first objects in accordance with the new ADT in the set of second objects, to construct a first new model element in the set of fourth objects that specifies identical behavior as the compared object in the set of first objects in accordance with the new model element in the set of third objects, to instantiate a new object instance from the first new model element in the set of fourth objects, and storing the new object instance in the set of fifth objects, to map the new ADT in the set of second objects to the new model element in the set of third objects, the new model element in the set of third objects to the first new model element in the set of fourth objects, and the first new model element in the set of fourth objects to a new object instance in the set of fifth objects, to add metadata to define the mapping to the new ADT in the set of second objects, the mapping to the new model element in the set of third objects, the mapping to the first new model element in the set of fourth objects, and the mapping to the object instance in the set of fifth objects, and to store the new ADT in the set of second objects, the new model element to the information model in the set of third objects, the new model element to the data model in the set of fourth objects, and the object instance of the data model to the set of fifth objects.

The management entity could further include, wherein the processor is configured to apply a data type to a previously unrecognizable object in the set of first objects to generate a newly transformed object in the set of first objects, to determine that the applying the data type does not alter the syntax and the semantics of the newly transformed object in the set of first objects, to generate a second new model element in the set of fourth objects having the same characteristics and behavior as the newly transformed object when instantiated, to instantiate an object instance in the set of fifth objects in accordance with the second new model element in the set of fourth objects, to verify that the object instance has the same characteristics and behavior as the newly transformed object, to update the metadata to contain generation and mapping information for the second new model element in the set of fourth objects, to update the metadata to contain the generation and mapping information for the new object instance in the set of fifth objects, to store a reference to the second new model element in the set of fourth objects, and to store the reference to the new object instance in the set of fifth objects.

The management entity could further include, wherein the processor is configured to apply a data type to a previously unrecognizable object in the set of first objects to generate a newly transformed object in the set of first objects, to determine that the applying the data type does not alter the syntax of the newly transformed object in the set of first objects, to determine that the applying the data type does alter the semantics of the newly transformed object in the set of first objects, to generate a third new model element in the set of fourth objects having the same characteristics as the newly transformed object when instantiated, to match the semantics of the newly transformed object to a relationship between an existing model element in the set of fourth objects and the third new model element in the set of fourth objects, to instantiate an object instance in the set of fifth objects in accordance with the third new model element in the set of fourth objects, to instantiate two additional object instances that represent the semantics of the newly transformed object, wherein the two additional object instances correspond to instantiating the relationship and the existing model element connected by the relationship to the new model element, to verify that the combination of the first object instance and the two additional object instances has the same characteristics and behavior as the newly transformed object, to update the metadata to contain generation and mapping information for the third new model element in the set of fourth objects, the relationship between the third new model element in the set of fourth objects and the existing model element in the set of fourth objects, and the existing model element in the set of fourth objects, to store a reference for the third new model element in the set of fourth objects, the relationship between the third new model element in the set of fourth objects and the existing model element in the set of fourth objects, and the existing model element in the set of fourth objects, and to store the reference to the new object instance in the set of fifth objects.

The management entity could further include, wherein the processor is configured to apply a data type to a previously unrecognizable object in the set of first objects to generate a newly transformed object in the set of first objects, to determine that the applying the data type does alter the syntax of the newly transformed object in the set of first objects, to determine that the applying the data type does not alter the semantics of the newly transformed object in the set of first objects, to generate a fourth new model element in the set of fourth objects having the same behavior as the newly transformed object when instantiated, to match the syntax of the newly transformed object to a relationship between an existing model element in the set of fourth objects and the fourth new model element in the set of fourth objects; to instantiate an object instance in the set of fifth objects in accordance with the fourth new model element in the set of fourth objects, to instantiate two additional object instances that represent the syntax of the newly transformed object, wherein the two additional object instances correspond to instantiating a second object in the set of fourth objects and the relationship between the existing model element connected by the relationship to the fourth new model element in the set of fourth objects, to verify that the combination of the first object instance and the two additional object instances has the same characteristics and behavior as the newly transformed object, to update the metadata to contain generation and mapping information for the fourth new model element in the set of fourth objects, the relationship between the fourth new model element in the set of fourth objects and the existing model element in the set of fourth objects, and the existing model element in the set of fourth objects, to store a reference for the fourth new model element in the set of fourth objects, the relationship between the fourth new model element in the set of fourth objects and the existing model element in the set of fourth objects, and the existing model element in the set of fourth objects, and to store the reference to the new object instance in the set of fifth objects.

The management entity could further include, wherein the processor is configured to apply a data type to a previously unrecognizable object in the set of first objects to generate a newly transformed object in the set of first objects, to determine that the applying the data type does alter both the syntax and the semantics of the newly transformed object in the set of first objects, to generate a fifth new model element in the set of fourth objects having the same characteristics as the newly transformed object when instantiated, to match the syntax of the newly transformed object to a relationship between a first existing model element in the set of fourth objects and the fifth new model element in the set of fourth objects, to generate a sixth new model element in the set of fourth objects having the same behavior as the newly transformed object when instantiated, to match the semantics of the newly transformed object to a relationship between a second existing model element in the set of fourth objects and the sixth new model element in the set of fourth objects, to instantiate a first object instance in the set of fifth objects in accordance with the fifth new model element in the set of fourth objects, to instantiate a first two additional object instances that represents the syntax of the newly transformed object, wherein the first two additional object instances correspond to instantiating a first instantiated object in the set of fourth objects and the relationship between the first model element connected by the relationship to the fifth new model element, to instantiate a second object in the set of fifth objects in accordance with the sixth new model element in the set of fourth objects, to instantiate a second two additional object instances that represents the semantics of the newly transformed object, wherein the second two additional object instances correspond to instantiating a second instantiated object in the set of fourth objects and the relationship between the second model element connected by the relationship to the sixth new model element, to verify that the combination of the first object instance, the first two additional object instances, the second object, and the second two additional object instances has the same characteristics and behavior as the newly transformed object, to updating the metadata to contain generation and mapping information for the fifth new model element in the set of fourth objects, the existing model element in the set of fourth objects representing the syntax of the newly transformed object, the relationship between the fifth new model element in the set of fourth objects and the existing model element in the set of fourth objects representing the syntax of the newly transformed object, the sixth new model element in the set of fourth objects, the existing model element in the set of fourth objects representing the semantics of the newly transformed object, and the relationship between the sixth new model element in the set of fourth objects and the existing model element in the set of fourth objects representing the semantics of the newly transformed object, to store a reference to the fifth new model element in the set of fourth objects, the existing model element in the set of fourth objects representing the syntax of the newly transformed object, the relationship between the fifth new model element in the set of fourth objects and the existing model element in the set of fourth objects representing the syntax of the newly transformed object, the sixth new model element in the set of fourth objects, the existing model element in the set of fourth objects representing the semantics of the newly transformed object, and the relationship between the sixth new model element and the existing model element in the set of fourth objects representing the semantics of the newly transformed object, and to store the reference to the new object instance in the set of fifth objects.

The management entity could further include, wherein the processor is configured to compare an object in the set of first objects to objects in the set of second objects, with each comparison, the processor is configured to verify that the syntax and semantics of each ADT in the set of second objects does not match the syntax and semantics of the objects in the set of first objects, and to determine that no metadata exists defining extensions or interpretations that would enable the previous verification of the syntax and semantics to be equal, and the processor is configured to update the metadata of all compared ADTs in the set of second objects to denote the above conclusions.

Although the present disclosure and its advantages have been described in detail, it should be understood that various changes, substitutions and alterations can be made herein without departing from the spirit and scope of the disclosure as defined by the appended claims.

What is claimed is:

1. A method for management entity operations, the method comprising:
   receiving, by a management entity, a request to collect data for an entity in a communications system;
   collecting, by the management entity, the data for the entity utilizing a set of protocols selected using knowledge defined by a first data model of a data model list derived from a technology-neutral information model of the communications system that does not use platform-specific definitions, language-specific definitions, or protocol-specific definitions, wherein each data model in the data model list uses at least one of the platform-specific definitions, the language-specific definitions, or the protocol-specific definitions; and
   saving, by the management entity, the data collected;
   wherein collecting the data comprises forming a dependency list from the request to collect data, wherein forming the dependency list comprises saving references to objects in the data collected as a set of first objects, determining a first set of Abstract Data Types (ADTs) to represent a behavior of an object in the set of first objects, and storing the first set of ADTs as a set of second objects, and wherein the first set of ADTs comprises a specification of at least one of a functionality, an axiom, a pre-condition, a post-condition, or an invariant of the first set of ADTs.

2. The method of claim 1, wherein the data comprises operational, administrative, management, and performance data.

3. The method of claim 1, further comprising attaching an annotation to at least one of the receiving, the collecting, and the saving.

4. The method of claim 1, further comprising executing a set of pre-processing algorithms selected using knowledge defined by the first data model of the data model list.

5. The method of claim 1, further comprising executing a set of post-processing algorithms selected using knowledge defined by the first data model of the data model list.

6. The method of claim 1, wherein saving the data collected comprises storing the data collected in a storage type selected using knowledge defined by the first data model of the data model list.

7. The method of claim 6, wherein storing the data collected in the storage type selected using knowledge defined by the first data model comprises:
defining a set of candidate repositories as a set of tenth objects, wherein each object in the set of tenth objects is defined by a subset of a set of sixth objects; and
removing, from the set of tenth objects, a candidate repository incapable of at least one protocol of the set of protocols.

8. The method of claim 1, wherein collecting the data further comprises:
determining the first data model in the data model list in accordance with the dependency list and a subset of the information model used to represent the data collected;
determining the set of protocols from the first data model;
determining a first set of dependencies between the data collected and the set of protocols; and
collecting the data utilizing the set of protocols in accordance with the first set of dependencies, wherein the first set of dependencies constrains a protocol used to collect the data.

9. The method of claim 8, wherein determining the first data model in the data model list in accordance with the dependency list and the subset of the information model comprises:
mapping a first object in a set of second objects to a first concrete data structure;
storing, in a set of eighth objects, a reference to the first concrete data structure;
mapping each object in a set of third objects to a second concrete data structure;
storing the second concrete data structure in the set of eighth objects;
determining an association between objects in the set of second objects and objects in the set of third objects as a third concrete data structure;
storing the third concrete data structure in the set of eighth objects; and
using the first concrete data structure, the second concrete data structure, and the third concrete data structure to select the first data model.

10. The method of claim 9, further comprising repeating, for remaining objects in the set of second objects not contained in the set of eighth objects, mapping of the remaining objects in the set of second objects and storing, in the set of eighth objects, the reference.

11. The method of claim 8, wherein determining the set of protocols from the first data model comprises:
defining a set of candidate protocols as a set of ninth objects, wherein the set of ninth objects is a subset of a set of sixth objects;
determining, for each object in the set of ninth objects, whether the object is capable of transmitting and receiving a subset of the set of sixth objects without adversely affecting a behavior of the set of sixth objects; and
eliminating the objects that are not capable from the set of ninth objects.

12. The method of claim 8, further comprising retrieving the information model.

13. The method of claim 8, wherein collecting the data further comprises:
determining a set of pre-processing algorithms from the first data model in the data model list to transform the data collected into a form preferred by an application using the data collected;
determining a second set of dependencies between the data collected and the set of pre-processing algorithms; and
collecting the data utilizing the set of pre-processing algorithms in accordance with the second set of dependencies, wherein the second set of dependencies constrains pre-processing algorithms used to transform the data.

14. The method of claim 8, wherein collecting the data comprises:
determining a set of post-processing algorithms from the first data model in the data model list that is used to transform the data collected into a form preferred by an application using the collected data;
determining a third set of dependencies between the data collected and the set of post-processing algorithms; and
collecting the data utilizing the set of post-processing algorithms in accordance with the third set of dependencies, wherein the third set of dependencies constrains post-processing algorithms used to transform the data.

15. The method of claim 8, wherein collecting the data further comprises:
determining a set of pre-storage algorithms from the first data model in the data model list to store the data collected prior to the data collected being completely processed and delivered to an application using the data collected;
determining a fourth set of dependencies between the data collected and the set of pre-storage algorithms; and
collecting the data utilizing the set of pre-storage algorithms in accordance with the fourth set of dependencies, wherein the fourth set of dependencies constrains pre-storage algorithms used to store the data.

16. The method of claim 8, wherein collecting the data comprises:
determining a set of post-storage algorithms from the first data model in the data model list to store the data collected after the data collected has been completely processed and delivered to an application using the data collected;
determining a fifth set of dependencies between the data collected and the set of post-storage algorithms; and collecting the data utilizing the set of post-storage algorithms in accordance with the fifth set of dependencies, wherein the fifth set of dependencies constrains the post-storage algorithms used to store the data.

17. The method of claim 8, further comprising determining a set of repositories for storing the data collected in accordance with at least one of an ADT used to represent characteristics and behavior required by the data collected, an ADT used to represent characteristics and behavior required by at least one protocol used to collect the data collected, an ADT used to represent characteristics and behavior of a protocol used by a repository, and an ADT used to represent characteristics and behavior of the repository with respect to its ability to store, retrieve, edit, and provide management of the data collected without adversely affecting the data collected.

18. The method of claim 17, further comprising determining the set of repositories for storing the data collected in accordance with at least one ADT used to represent characteristics and behavior required by a first integer number of pre-processing functions, an ADT used to represent characteristics and behavior required by a second integer number of post-processing functions, an ADT used to represent characteristics and behavior required by a third integer number of pre-storage functions, and an ADT used to represent characteristics and behavior required by a fourth integer number of post-storage functions, wherein the first integer number, the second integer number, the third integer number, and the fourth integer number is equal to 0 or greater.

19. The method of claim 1, wherein forming the dependency list further comprises:
   determining a second set of ADTs to represent a behavior of a first protocol used to collect the data;
   storing the set of second ADTs as a set of third objects; and
   comparing a first compared object from the set of second objects to at least one second compared object from the set of third objects, where the comparing comprises,
      determining that a behavior of the first compared object constrains the behavior of the at least one second compared object,
      determining a type of constraint by the behavior of the first compared object, wherein the type of constraint comprises one of a hyponym, a hypernym, a holonym, a meronym, a behavioral subtype, a behavioral supertype, a subtype, and a supertype, and
      saving, as a new object in a set of fourth objects, references to the first compared object, the at least one second compared object, the behavior of the first compared object constraining the behavior of the at least one second compared object, and the type of constraint by the behavior of the first compared object.

20. A management entity comprising:
   a receiver configured to receive a request to collect data for an entity in a communications system;
   a processor operatively coupled to the receiver; and
   a non-transitory computer readable storage medium storing programming for execution by the processor, the programming including instructions to collect the data for the entity utilizing a set of protocols selected using knowledge defined by a first data model of a data model list derived from a technology-neutral information model of the communications system that does not use platform-specific definitions, language-specific definitions, or protocol-specific definitions, and to save the data collected, wherein each data model in the data model list uses at least one of the platform-specific definitions, the language-specific definitions, or the protocol-specific definitions, wherein the instructions to collect the data include instructions to form a dependency list from the request to collect data, wherein the instructions to form the dependent list include instructions to save references to objects in the data collected as a set of first objects, to determine a first set of Abstract Data Types (ADTs) to represent a behavior of an object in the set of first objects, and to store the first set of ADTs as a set of second objects, and wherein the first set of ADTs comprises a specification of at least one of a functionality, an axiom, a pre-condition, a post-condition, or an invariant of the first set of ADTs.

21. The management entity of claim 20, wherein the processor is configured to store the data collected in a storage type selected using knowledge defined by the first data model of the data model list.

22. The management entity of claim 21, wherein the processor is configured to define a set of candidate repositories as a set of tenth objects, wherein each object in the set of tenth objects is defined by a subset of a set of sixth objects, and to remove, from the set of tenth objects, a candidate repository incapable of at least one protocol of the set of protocols.

23. The management entity of claim 20, wherein the processor is configured to determine the first data model in the data model list in accordance with the dependency list and a subset of the information model used to represent the data collected, to determine the set of protocols from the first data model, to determine a first set of dependencies between the data collected and the set of protocols, and to collect the data utilizing the set of protocols in accordance with the first set of dependencies, wherein the first set of dependencies constrains a protocol used to collect the data.

24. The management entity of claim 20, further comprising a memory operatively coupled to the processor and to the receiver, the memory configured to store the data collected.

25. A management system comprising:
   a managed entity; and
   a management entity operatively coupled to the managed entity, the management entity including a receiver configured to receive a request to collect data for the managed entity in a communications system, a processor operatively coupled to the receiver, and a non-transitory computer readable storage medium storing programming for execution by the processor, the programming including instructions to collect the data for the managed entity utilizing a set of protocols selected using knowledge defined by a first data model of a data model list derived from a technology-neutral information model of the communications system that does not use platform-specific definitions, language-specific definitions, or protocol-specific definitions, and to save the data collected, wherein each data model in the data model list uses at least one of the platform-specific definitions, the language-specific definitions, or the protocol-specific definitions, wherein the instructions to collect the data include instructions to form a dependency list from the request to collect data, wherein the instructions to form the dependent list include instructions to save references to objects in the data collected as a set of first objects, to determine a first set of Abstract Data Types (ADTs) to represent a behavior of an object in the set of first objects, and to store the first set of ADTs as a set of second objects, and wherein the first set of ADTs comprises a specification of at least one of a functionality, an axiom, a pre-condition, a post-condition, or an invariant of the first set of ADTs.

26. The management system of claim 25, further comprising the communications system including the managed entity.

27. A method for management entity operations, the method comprising:
    receiving, by a management entity, a request to collect data for an entity in a communications system;
    collecting, by the management entity, data for the entity utilizing a set of protocols selected using knowledge defined by a first data model of a data model list derived from a technology-neutral information model of the communications system that does not use platform-specific definitions, language-specific definitions, or protocol-specific definitions, wherein each data model in the data model list uses at least one of the platform-specific definitions, the language-specific definitions, or the protocol-specific definitions;
    wherein collecting the data comprises forming a dependency list from the request to collect data, wherein forming a dependency list comprises saving a set of first references to each object in the data collected as a set of first objects, determining a first set of Abstract Data Types (ADTs) to represent a behavior of an object in the set of first objects, and storing the first set of ADTs as a set of second objects, and wherein the first set of ADTs comprises a specification of at least one of a functionality, an axiom, a pre-condition, a post-condition, or an invariant of the first set of ADTs;
    detecting, by the management entity, that the data collected includes an object that cannot be recognized;
    replacing, by the management entity, the unrecognizable object in the data collected with an equivalent recognizable object thereby producing revised data collected; and
    saving, by the management entity, the revised data collected.

28. The method of claim 27, wherein the revised data collected comprises operational, administrative, management, and performance data.

29. The method of claim 27, further comprising attaching an annotation to at least one of the receiving, the collecting, and the saving.

30. The method of claim 27, wherein the replacing comprises:
    determining that an ADT in a set of sixth objects has at least the same first set of behaviors as the object in the set of first objects;
    mapping a second set of behaviors of the ADT in the set of sixth objects to a model element in a set of third objects;
    mapping the model element in the set of third objects to a model element in a set of fourth objects;
    instantiating an object from the set of fourth objects to an object in a set of fifth objects;
    comparing the object in the set of fifth objects to the object in the set of first objects;
    determining that a result of the comparison is an equality;
    updating metadata of objects in the set of sixth objects, objects in the set of third objects, objects in the set of fourth objects, and objects in the set of fifth objects that were used to produce a new object whose behavior is the same as a first object in the set of first objects; and
    replacing and saving the object from the set of first objects with the object from the set of fifth objects.

31. The method of claim 30, further comprising repeating the replacing for remaining objects in the set of first objects.

32. The method of claim 27, wherein the detecting comprises:
    forming and saving a set of second references to each object having an ADT defined by the information model as a set of eighth objects;
    forming and saving a set of third references to each model element defined by the information model as a set of third objects in accordance with each object in the set of eighth objects, wherein metadata associated with the set of third objects includes mapping information from objects in the set of third objects to objects in the set of eighth objects;
    forming and saving a set of fourth references to each model element defined by the data model as a set of fourth objects in accordance with each object in the set of third objects, wherein metadata associated with the set of fourth objects includes mapping information from objects in the set of fourth objects to objects in the set of third objects;
    determining that a first object in the set of first objects cannot be instantiated from the set of fourth objects; and
    saving the first object in a set of sixth objects.

33. The method of claim 32, wherein a plurality of objects including the first object is detected as being unrecognizable, and wherein the method further comprises repeating the replacing for each object in the plurality of objects.

34. The method of claim 32, wherein the determining that the first object in the set of first objects cannot be instantiated from the set of fourth objects comprises:
    retrieving a set of pre-calculated weighted n-gram statistics for each data type defined by a set of ADTs in the set of eighth objects, where n is a value optimized for a set of expected data types;
    assigning each n-gram found in the data collected a data type from a set of known data types defined by the set of ADTs in the set of eighth objects;
    applying the assigned data type to the unrecognizable object, thereby generating a new recognizable object;
    verifying that the new recognizable object has equivalent functionality and behavior to the originally unrecognizable object;
    replacing the unrecognizable object with the new recognizable object; and
    saving a reference to the data collected including the recognizable object.

35. The method of claim 34, wherein the unrecognizable object is related to an optional plurality of objects that is detected and identified.

36. The method of claim 35, wherein the unrecognizable object is related to the optional plurality of objects by one of an object in the set of eighth objects, an object in the set of third objects, and zero or more relationships in a set of relationships, wherein a relationship includes one of a hyponym, a hypernym, a meronym, a holonym, a composition, an aggregation, and a dependency.

37. The method of claim 36, wherein the set of relationships to check is applied to one of Unified Modeling Language (UML)-like models, Entity Relationship Diagrams (ERD)-like models, and linguistic models.

38. The method of claim 34, wherein the assigning each n-gram comprises applying a similarity measure, wherein the similarity measure uses at least one of feature-based matching, structure-based matching, behavior-based matching, and semantic relatedness matching.

39. The method of claim 34, wherein applying the assigned data type comprises:
selecting a data type from the set of known data types;
transforming an object in the set of first objects using a transformation function and the selected data type to produce a new object;
saving the new object in the set of sixth objects;
verifying that an object in a set of fifth objects contains the behavior of the new object in the set of sixth objects;
saving the transformation function and a relationship between the new object and the object in the set of fifth objects as metadata in the new object; and
saving a reference to the new object in the set of fifth objects.

40. The method of claim 39, further comprising repeating the transforming for remaining objects in the set of first objects.

41. The method of claim 39, wherein the transformation function comprises multiple functions, and wherein the transforming comprises using multiple applications of the multiple functions to transform the first object in the set of first objects.

42. The method of claim 39, wherein the transforming comprises:
determining a number of elements present in the new object, wherein the elements include a model element derived from the set of fourth objects;
storing the model element in a set of seventh objects; and
writing, in each object in the set of seventh objects, metadata defining which data type is used to make the new object recognizable, which element was recognized by applying the data type, which object of the set of fourth objects matches the element, and which object in the set of first objects is used to derive the new object.

43. The method of claim 42, wherein the determining the number of elements comprises:
determining that there is an object, where a first subset of the elements of the object is now recognizable and a second subset of the elements of the object is still unrecognizable;
applying a second data type from the set of data types to an unrecognizable element in the second subset of the elements, thereby making the unrecognizable element recognizable;
recording the second data type used to make the unrecognizable element recognizable and from which object the unrecognizable element is contained by updating the metadata for the object in the set of sixth objects; and
storing, in a set of seventh objects, each object in the first subset of the elements of the object with its associated elements.

44. The method of claim 43, further comprising:
repeating the applying the second data type from the set of data types to any element in the second subset of the elements until all objects are recognizable.

45. The method of claim 42, wherein determining the number of elements comprises:
using at least one of feature-based matching, structure-based matching, behavior-based matching, and semantic relatedness matching to identify the element contained in the object in the set of first objects;
recording an algorithm used to make the object recognizable and the object from the set of first objects used to derive the new object by updating metadata for objects in the set of seventh objects; and saving a reference to the element successfully recognized in the set of seventh objects.

46. A management entity comprising:
a receiver configured to receive a request to collect data for an entity in a communications system;
a processor operatively coupled to the receiver; and
a non-transitory computer readable storage medium storing programming for execution by the processor, the programming including instructions to collect data for the entity utilizing a set of protocols selected using knowledge defined by a first data model of a data model list derived from a technology-neutral information model of the communications system that does not use platform-specific definitions, language-specific definitions, or protocol-specific definitions, wherein each data model in the data model list uses at least one of the platform-specific definitions, the language-specific definitions, or the protocol-specific definitions, to detect that the data collected includes an object that cannot be recognized, to replace the unrecognizable object in the data collected with an equivalent recognizable object thereby producing revised data collected, and to save the revised data collected, wherein the instructions to collect the data include instructions to form a dependency list from the request to collect data, wherein the instructions to form the dependent list include instructions to save references to objects in the data collected as a set of first objects, to determine a first set of Abstract Data Types (ADTs) to represent a behavior of an object in the set of first objects, and to store the first set of ADTs as a set of second objects, wherein the first set of ADTs comprises a specification of at least one of a functionality, an axiom, a pre-condition, a post-condition, or an invariant of the first set of ADTs.

47. The management entity of claim 46, wherein the processor is configured to determine that an ADT in a set of sixth objects has at least the same first set of behaviors as the object in the set of first objects, to map a second set of behaviors of the ADT in the set of sixth objects to a model element in a set of third objects, to map the model element in the set of third objects to a model element in a set of fourth objects, to instantiate an object from the set of fourth objects to an object in a set of fifth objects, to compare the object in the set of fifth objects to the object in the set of first objects, to determine that a result of the comparison is an equality, to update metadata of objects in the set of sixth objects, objects in the set of third objects, objects in the set of fourth objects, and objects in the set of fifth objects that were used to produce a new object whose behavior is the same as a first object in the set of first objects, and to replace and save the object from the set of first objects with the object from the set of fifth objects.

48. The management entity of claim 46, wherein the processor is configured to form and save a set of first references to each object in the data collected as a set of first objects, to form and save a set of second references to each object having an ADT defined by the information model as a set of seventh objects, to form and save a set of third references to each model element defined by the information model as a set of third objects in accordance with each object in the set of seventh objects, wherein metadata associated with the set of third objects includes mapping information from objects in the set of third objects to objects in the set of seventh objects, to form and save a set of fourth references to each model element defined by the data model as a set of fourth objects in accordance with each object in the set of third objects, wherein metadata associated with the set of fourth objects includes mapping information from objects in the set of fourth objects to objects in the set of third objects, to determine that a first object in the set of first objects cannot be instantiated from the set of fourth objects, and to save the first object in a set of sixth objects.

* * * * *